(12) United States Patent
Pauletti et al.

(10) Patent No.: US 11,877,106 B2
(45) Date of Patent: **\*Jan. 16, 2024**

(54) MONITORING CIRCUIT FOR PHOTOVOLTAIC MODULE

(71) Applicant: Texas Instruments Incorporated, Dallas, TX (US)

(72) Inventors: Timothy Patrick Pauletti, Dallas, TX (US); Suheng Chen, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,619

(22) Filed: Apr. 29, 2022

(65) Prior Publication Data

US 2022/0256259 A1 Aug. 11, 2022

Related U.S. Application Data

(62) Division of application No. 16/819,562, filed on Mar. 16, 2020, now Pat. No. 11,350,186.

(Continued)

(51) Int. Cl.
*G01K 1/024* (2021.01)
*H04Q 9/00* (2006.01)
(Continued)

(52) U.S. Cl.
CPC .............. *H04Q 9/00* (2013.01); *G01K 1/024* (2013.01); *G01K 7/00* (2013.01); *H02S 50/00* (2013.01);
(Continued)

(58) Field of Classification Search
None
See application file for complete search history.

(56) References Cited

U.S. PATENT DOCUMENTS

| 4,749,992 A | 6/1988 | Fitzemeyer et al. |
| 5,669,987 A | 9/1997 | Takehara |

(Continued)

OTHER PUBLICATIONS

"SunSpec® Rapid Shutdown Transmit and Receive Reference Design" Texas Instruments, TI Designs: TIDA-060001, TIDUE68-May 2018, 39 pages.

(Continued)

*Primary Examiner* — Curtis A Kuntz
*Assistant Examiner* — Jerold B Murphy
(74) *Attorney, Agent, or Firm* — John R. Pessetto; Frank D. Cimino

(57) ABSTRACT

A monitoring circuit for a photovoltaic module includes a measurement conditioning circuit, a microcontroller circuit, and a transmitter circuit. The measurement conditioning circuit includes a voltage sense terminal, a voltage reference terminal, and a digital measurement data output. The microcontroller circuit includes a digital measurement data input coupled with the digital measurement data output, a modulation clock input, a measurement data stream output, and a transmit select output. The transmitter circuit includes a measurement data stream input coupled with the measurement data stream output, a modulation clock output coupled with the modulation clock input, a transmit select input coupled with the transmit select output, and positive and negative output communication terminals.

14 Claims, 21 Drawing Sheets

Related U.S. Application Data

(60) Provisional application No. 62/821,054, filed on Mar. 20, 2019.

(51) Int. Cl.
*H02S 50/00* (2014.01)
*G01K 7/00* (2006.01)

(52) U.S. Cl.
CPC ..... *H04Q 2209/10* (2013.01); *H04Q 2209/82* (2013.01)

(56) References Cited

U.S. PATENT DOCUMENTS

| | | | |
|---|---|---|---|
| 7,884,278 B2 | 2/2011 | Powell et al. | |
| 8,013,472 B2 | 9/2011 | Adest et al. | |
| 8,035,249 B2 | 10/2011 | Shaver, II et al. | |
| 8,271,599 B2 | 9/2012 | Eizips et al. | |
| 8,274,172 B2 | 9/2012 | Hadar et al. | |
| 8,325,059 B2 | 12/2012 | Rozenboim | |
| 8,410,950 B2 | 4/2013 | Takehara | |
| 8,427,009 B2 | 4/2013 | Shaver, II et al. | |
| 8,531,005 B2 | 9/2013 | Whitfield et al. | |
| 8,587,151 B2 | 11/2013 | Adest et al. | |
| 8,653,689 B2 | 2/2014 | Rozenboim | |
| 8,669,675 B2 | 3/2014 | Capp et al. | |
| 8,816,535 B2 | 8/2014 | Adest et al. | |
| 8,823,218 B2 | 9/2014 | Hadar et al. | |
| 8,854,193 B2 | 10/2014 | Makhota et al. | |
| 8,933,321 B2 | 1/2015 | Hadar et al. | |
| 8,947,194 B2 | 2/2015 | Sella et al. | |
| 9,007,210 B2 | 4/2015 | Avrutsky et al. | |
| 9,112,379 B2 | 8/2015 | Sella et al. | |
| 9,124,139 B2 | 9/2015 | Eizips et al. | |
| 9,143,036 B2 | 9/2015 | Avrutsky | |
| 9,184,794 B1 | 11/2015 | Ibrahim et al. | |
| 9,184,967 B1 | 11/2015 | Brahim et al. | |
| 9,235,228 B2 | 1/2016 | Gazit | |
| 9,258,829 B1 | 2/2016 | Ibrahim et al. | |
| 9,377,765 B2 | 6/2016 | Makhota et al. | |
| 9,401,599 B2 | 6/2016 | Har-Shai et al. | |
| 9,397,612 B2 | 7/2016 | Hadar et al. | |
| 9,438,035 B2 | 9/2016 | Capp et al. | |
| 9,590,526 B2 | 3/2017 | Adest et al. | |
| 9,960,667 B2 | 5/2018 | Adest et al. | |
| 11,350,186 B2* | 5/2022 | Pauletti | G01K 7/00 |
| 2006/0162772 A1 | 7/2006 | Presher, Jr. | |
| 2010/0207592 A1 | 8/2010 | Hester et al. | |
| 2011/0032734 A1 | 2/2011 | Melanson | |
| 2011/0140774 A1 | 6/2011 | Kaya et al. | |
| 2012/0049816 A1 | 3/2012 | Hester | |
| 2012/0049818 A1 | 3/2012 | Hester | |
| 2012/0093198 A1 | 4/2012 | Dabak et al. | |
| 2012/0126624 A1 | 5/2012 | Hester et al. | |
| 2012/0139345 A1 | 6/2012 | Ye et al. | |
| 2012/0314744 A1 | 12/2012 | Vedantham et al. | |
| 2012/0320931 A1 | 12/2012 | Vedantham et al. | |
| 2012/0320932 A1 | 12/2012 | Xu et al. | |
| 2012/0320995 A1 | 12/2012 | Dabak et al. | |
| 2012/0320996 A1 | 12/2012 | Dabak et al. | |
| 2012/0324322 A1 | 12/2012 | Vedantham et al. | |
| 2012/0327770 A1 | 12/2012 | Vijayasankar et al. | |
| 2012/0327987 A1 | 12/2012 | Dabak et al. | |
| 2013/0051268 A1 | 2/2013 | Nassar et al. | |
| 2013/0051320 A1 | 2/2013 | Pande et al. | |
| 2013/0051446 A1 | 2/2013 | Vijayasankar et al. | |
| 2013/0051482 A1 | 2/2013 | Nassar et al. | |
| 2013/0089124 A1 | 4/2013 | Kim et al. | |
| 2013/0101055 A1 | 4/2013 | Pande et al. | |
| 2013/0121425 A1 | 5/2013 | Pande et al. | |
| 2013/0181736 A1 | 7/2013 | Gostein et al. | |
| 2013/0223457 A1 | 8/2013 | Pande et al. | |
| 2013/0254615 A1 | 9/2013 | Vijayasankar et al. | |
| 2013/0266081 A1 | 10/2013 | Pande et al. | |
| 2013/0279515 A1 | 10/2013 | Vijayasankar et al. | |
| 2013/0294531 A1 | 11/2013 | Vedantham et al. | |
| 2013/0301649 A1 | 11/2013 | Vijayasankar et al. | |
| 2013/0322554 A1 | 12/2013 | Vijayasankar et al. | |
| 2013/0343403 A1 | 12/2013 | Vijayasankar et al. | |
| 2013/0343404 A1 | 12/2013 | Vijayasankar et al. | |
| 2014/0105313 A1 | 5/2014 | Kim et al. | |
| 2014/0146900 A1 | 5/2014 | Dabak et al. | |
| 2014/0229748 A1 | 8/2014 | Li et al. | |
| 2015/0043596 A1 | 2/2015 | Lin et al. | |
| 2015/0071077 A1 | 3/2015 | Vijayasankar et al. | |
| 2015/0071306 A1 | 3/2015 | Lin et al. | |
| 2015/0071364 A1 | 3/2015 | Batra et al. | |
| 2015/0098569 A1 | 4/2015 | Vijayasankar et al. | |
| 2015/0180539 A1 | 6/2015 | Vedantham et al. | |
| 2015/0180680 A1 | 6/2015 | Vijayasankar et al. | |
| 2015/0236753 A1 | 8/2015 | Pande et al. | |
| 2015/0341084 A1 | 11/2015 | Kim et al. | |
| 2015/0349844 A1 | 12/2015 | Vijayasankar et al. | |
| 2015/0381355 A1 | 12/2015 | Vijayasankar et al. | |
| 2016/0043773 A1 | 2/2016 | Pande et al. | |
| 2016/0050045 A1 | 2/2016 | Vijayasankar et al. | |
| 2016/0079761 A1 | 3/2016 | Pilawa-Podgurski et al. | |
| 2016/0094373 A1 | 3/2016 | Ibrahim et al. | |
| 2016/0112548 A1 | 4/2016 | Dabak et al. | |
| 2016/0119028 A1 | 4/2016 | Vijayasankar et al. | |
| 2016/0127056 A1 | 5/2016 | Soman et al. | |
| 2016/0233923 A1 | 8/2016 | Vedantham et al. | |
| 2016/0323132 A1 | 11/2016 | Ibrahim et al. | |
| 2016/0330213 A1 | 11/2016 | Vijayasankar et al. | |
| 2016/0344450 A1 | 11/2016 | Pande et al. | |
| 2017/0093279 A1 | 3/2017 | Hezar et al. | |
| 2017/0195228 A1 | 7/2017 | Vijayasankar et al. | |
| 2017/0317803 A1 | 11/2017 | Lin et al. | |
| 2017/0366230 A1 | 12/2017 | Pande et al. | |
| 2018/0219480 A1 | 8/2018 | Hezar et al. | |
| 2018/0234526 A1 | 8/2018 | Xu et al. | |
| 2018/0294840 A1 | 10/2018 | Vijayasankar et al. | |
| 2019/0052313 A1 | 2/2019 | Kim et al. | |
| 2019/0140693 A1 | 5/2019 | Kim et al. | |
| 2019/0173643 A1 | 6/2019 | Lin et al. | |

OTHER PUBLICATIONS

"Communication Signal for Rapid Shutdown SunSpec Interoperability Specification" SunSpec Alliance, Approved, Version 34, Aug. 21, 2017, 25 pages.

"Communication Signal for Rapid Shutdown SunSpec Interoperability Specification" SunSpec Alliance, Test, Version 28, Oct. 28, 2016, 24 pages.

D. Shmilovitz, "On the control of photovoltaic maximum power point tracker via output parameters" IEEE Proc.-Electr. Power Appl., vol. 152, No. 2, Mar. 2005, pp. 239-248.

Robert C.N. Pilawa-Podgurski et al., "Submodule Integrated Distributed Maximum Power Point Tracking for Solar Photovoltaic Applications" IEEE Transactions on Power Electronics, vol. 28, No. 6, Jun. 2013, pp. 2957-2967.

Qin et al.., "A Distributed Approach to Maximum Power Point Tracking for Photovoltaic Submodule Differential Power Processing" IEEE Transactions on Power Electronics, vol. 30, No. 4, Apr. 2015, pp. 2024-2040.

Shenoy et al., "Differential Power Processing for Increased Energy Production and Reliability of Photovoltaic Systems" IEEE Transactions on Power Electronics, vol. 28, No. 6, Jun. 2013, pp. 2968-2979.

Robert C.N. Pilawa-Podgurski et al., "Integrated CMOS Energy Harvesting Converter With Digital Maximum Power Point Tracking for a Portable Thermophotovoltaic Power Generator" IEEE Journal of Emerging and Selected Topics in Power Electronics, vol. 3, No. 4, Jun. 2015, pp. 1021-1035.

Pilawa-Podgurski, R.C.N. et al. "Low-power Maximum Power Point Tracker with Digital Control for Thermophotovoltaic Generators." Applied Power Electronics Conference and Exposition (APEC), 2010 Twenty-Fifth Annual IEEE. 2010. 961-967. Copyright © 2010, IEEE, pp. 961-967.

(56) References Cited

OTHER PUBLICATIONS

R.C.N. Pilawa-Podgurski, W. Li, I. Celanovic, D.J. Perreault "Integrated CMOS DC-DC Converter with Digital Maximum Power Point Tracking for a Portable Thermophotovoltaic Power Generator," IEEE Energy Conversion Congress and Exposition, 2011, pp. 197-204.

Intertek, Standard Update Notice (SUN), Issued: Aug. 14, 2018, 7 pgs.

Maxim Integrated, "Enable Flexible PV System Design with Cell-String Optimizers", Aug. 29, 2016, 9 pages.

Rick Ivins, "2014 NEC 690.12 Rapid Shutdown for String Inverters on Flat Roofs", Aug. 16, 2016, https://www.purepower.com/blog/NEC-690-12-rapid-shutdown-of-pv-systems-on-buildings/, downloaded May 22, 2019, 5 pages.

Rick Ivins, "2017 NEC 690.12 Rapid Shutdown—Important Changes", https://www.purepower.com/blog/2017-nec-690.12-rapid-shutdown-important-changes/, downloaded May 22, 2019, 5 pages.

"SmartPSB2000L Smart PV Safety Box Quick Guide", Issue: 05, Part No. 31509508, Date: Aug. 22, 2018, Huawei Technologies Col, Ltd., 12 pages.

Solar Edge Safety Functions Firefighting, "Firefighting & PV Systems—Risks and Solutions", https://www.solaredge.com/sites/default/files/firefighting_and_pv_systems_risks_and_solutions_eng.pdf, downloaded May 22, 2019, 26 pages.

Texas Instruments, "Solar Power Optimizer", http://www.ti.com/solution/solar_micro_converter_dc_do_power_optimizer/, downloaded May 22, 2019, 2 pages.

Tigo® Flex MLPE, "Smart Module Platform", TS4, PV Module Integrated Platform, PV 2.0, Tigo Energy Inc., Sep. 10, 2018, 4 pages.

PCT Search Report dated Jun. 18, 2020.

\* cited by examiner

MONITORING CIRCUIT FOR PHOTOVOLTAIC MODULE

CROSS-REFERENCE TO RELATED APPLICATIONS

This application is a division of U.S. patent application Ser. No. 16/819,562, filed Mar. 16, 2020, which claims priority to, and the benefit of, U.S. Provisional Patent Application Ser. No. 62/821,054, entitled "Integrated Module Level Monitoring for Photovoltaic Modules," filed Mar. 20, 2019, the entirety of both the applications is hereby incorporated by reference.

BACKGROUND

Monitoring the health of a photovoltaic (PV) system is currently performed at the system level. This can determine the health of a string of PV modules. The health of an individual PV module cannot be determined. Existing health monitoring techniques would require a monitoring system that operates independently of the PV system. Moreover, monitoring the health of an individual PV module using commercial off-the-shelf products is prohibitively expensive and power intensive.

SUMMARY

According to one aspect, a monitoring circuit for a PV module includes a measurement conditioning circuit, a microcontroller circuit, and a transmitter circuit. The measurement conditioning circuit has a voltage sense terminal, a voltage reference terminal, and a digital measurement data output. The microcontroller circuit has a digital measurement data input coupled with the digital measurement data output, a modulation clock input, an input communication data stream input, a measurement data stream output, and a transmit select output. The transmitter circuit has: a measurement data stream input coupled with the measurement data stream output; a modulation clock output coupled with the modulation clock input; a transmit select input coupled with the transmit select output; and positive and negative output communication terminals. The transmitter circuit is configured to provide a communication signal at its positive and negative output communication terminals responsive to a transmit select signal at its transmit select input. The microcontroller circuit is configured to provide the transmit select signal responsive to detecting, for a time period, an absence of modulated data in an input communication data stream at its input communication data stream input.

In another aspect, a method for monitoring a PV module includes receiving a sensed voltage signal at a voltage sense terminal of a measurement conditioning circuit from a string of PV sub-modules associated with the PV module. The method also includes receiving a voltage reference signal at a voltage reference terminal of the measurement conditioning circuit from the string of PV sub-modules. The method also includes generating digital measurement data at a digital measurement data output of the measurement conditioning circuit based on the sensed voltage signal in reference to the voltage reference signal such that the sensed voltage signal is represented within the digital measurement data. The method also includes generating a modulation clock signal at a modulation clock output of a transmitter circuit. The method also includes generating a measurement data stream at a measurement data stream output of a microcontroller circuit based on the digital measurement data at a digital measurement data input and the modulation clock signal at a modulation clock input such that the sensed voltage signal is represented within the measurement data stream. The method also includes generating an output communication signal at the transmitter circuit based on the modulation clock signal and the measurement data stream at a measurement data stream input such that the sensed voltage signal is represented within the output communication signal. The method also includes generating a transmit select signal at a transmit select output of the microcontroller circuit based on the measurement data stream. The method also includes transmitting the output communication signal from the transmitter circuit to a communication interface circuit via positive and negative output communication terminals in response to the transmit select signal at a transmit select input of the transmitter circuit.

In another aspect, a PV module includes a communication interface circuit, a first PV sub-module, a second PV sub-module, a third PV sub-module, and a monitoring circuit. The communication interface circuit has positive and negative input communication terminals and an external interface. The first PV sub-module has positive and negative DC power terminals. The second PV sub-module has a positive DC power terminal coupled with the negative DC power terminal of the first PV sub-module and has a negative DC power terminal. The third PV sub-module has a positive DC power terminal coupled with the negative DC power terminal of the second PV sub-module and has a negative DC power terminal. The monitoring circuit has positive and negative output communication terminals coupled with the positive and negative input communication terminals, has a voltage sense terminal coupled with the positive DC power terminal of the first PV sub-module, has a voltage reference terminal coupled with the negative DC power terminal of the third PV sub-module, and has a transmit select input and an input communication data stream input. The monitoring circuit is configured to provide a communication signal at its positive and negative output communication terminals responsive to a transmit select signal at its transmit select input and to provide the transmit select signal responsive to detecting, for a time period, an absence of modulated data in an input communication data stream at its input communication data stream input.

DETAILED DESCRIPTION

Figure 1:
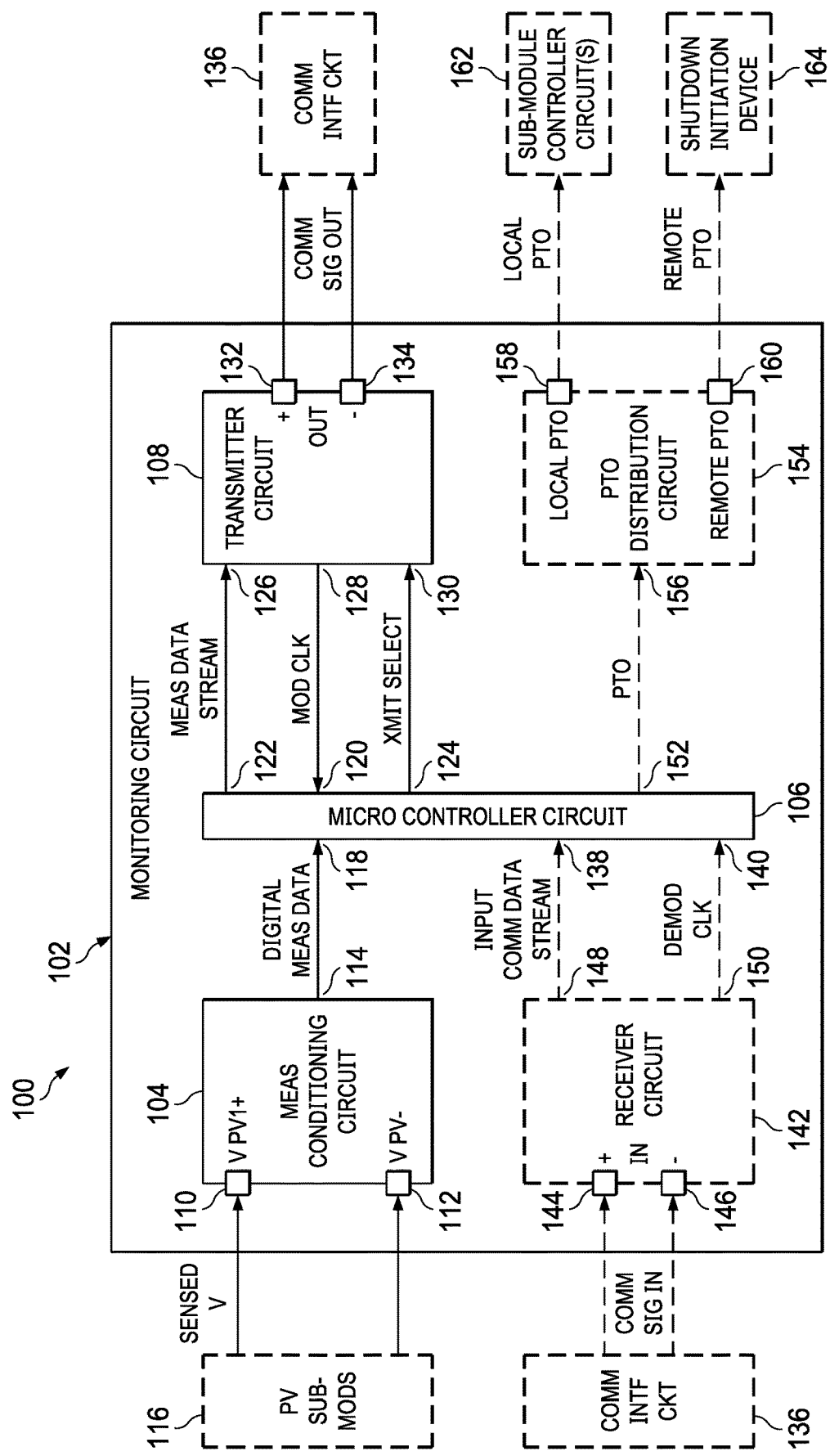
FIG. 1 is a schematic diagram of an example of a monitoring circuit for a PV module.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner like the term "comprising", and thus should be interpreted to mean "including, but not limited to." Also, the terms "couple" or "couples" or "coupled" includes indirect or direct electrical or mechanical connection or combinations thereof. For example, if a first device couples to or is coupled with a second device, that connection may be through a direct electrical connection, or through an indirect electrical connection via one or more intervening devices and connections. One or more operational characteristics of various circuits, systems and/or components are hereinafter described in the context of functions which in some cases result from configuration and/or interconnection of various structures when circuitry is powered and operating.

FIG. 1 shows an example of a PV module 100 and an example of a monitoring circuit 102 for the PV module 100. The monitoring circuit 102 includes a measurement conditioning circuit 104, a microcontroller circuit 106, and a transmitter circuit 108. The measurement conditioning circuit 104 includes a voltage sense terminal 110, a voltage reference terminal 112, and a digital measurement data output 114. The microcontroller circuit 106 includes a digital measurement data input 118 coupled with the digital measurement data output 114, a modulation clock input 120, a measurement data stream output 122, and a transmit select output 124. The transmitter circuit 108 includes a measurement data stream input 126 coupled with the measurement data stream output 122, a modulation clock output 128 coupled with the modulation clock input 120, a transmit select input 130 coupled with the transmit select output 124, and positive and negative output communication terminals 132, 134.

The measurement conditioning circuit 104 receives a sensed voltage signal SENSED V at the voltage sense terminal 110 from a string of PV sub-modules 116 associated with the PV module 100. The measurement conditioning circuit 104 receives a voltage reference signal at the voltage reference terminal 112 from the string of PV sub-modules 116. The measurement conditioning circuit 104 generates digital measurement data DIG MEAS DATA at the digital measurement data output 114 based on the sensed voltage signal SENSED V at the voltage sense terminal 110 in reference to the voltage reference signal at the voltage reference terminal 112 such that the sensed voltage signal SENSED V is represented within the digital measurement data DIG MEAS DATA.

The microcontroller circuit 106 generates a measurement data stream MEAS DATA STREAM at the measurement data stream output 122 based on the digital measurement data DIG MEAS DATA at the digital measurement data input 118 and a modulation clock signal MOD CLK at the modulation clock input 120 such that the sensed voltage signal SENSED V is represented within the measurement data stream MEAS DATA STREAM. The microcontroller circuit 106 generates a transmit select signal XMIT SELECT at the transmit select output 124 based on the measurement data stream MEAS DATA STREAM. The transmitter circuit 108 generates the modulation clock signal MOD CLK at the modulation clock output 128. The transmitter circuit 108 generates an output communication signal COMM SIG OUT based on the modulation clock signal MOD CLK and the measurement data stream MEAS DATA STREAM at the measurement data stream input 126 such that the sensed voltage signal SENSED V is represented within the output communication signal COMM SIG OUT. The transmitter circuit 108 transmits the output communication signal COMM SIG OUT to a communication interface circuit 136 via the positive and negative output communication terminals 132, 134 in response to the transmit select signal XMIT SELECT at the transmit select input 130.

In one example, the measurement conditioning circuit 104, microcontroller circuit 106, and transmitter circuit 108 are included in an integrated circuit (IC). In another example, the PV module 100 includes the monitoring circuit 102.

Figure 17:
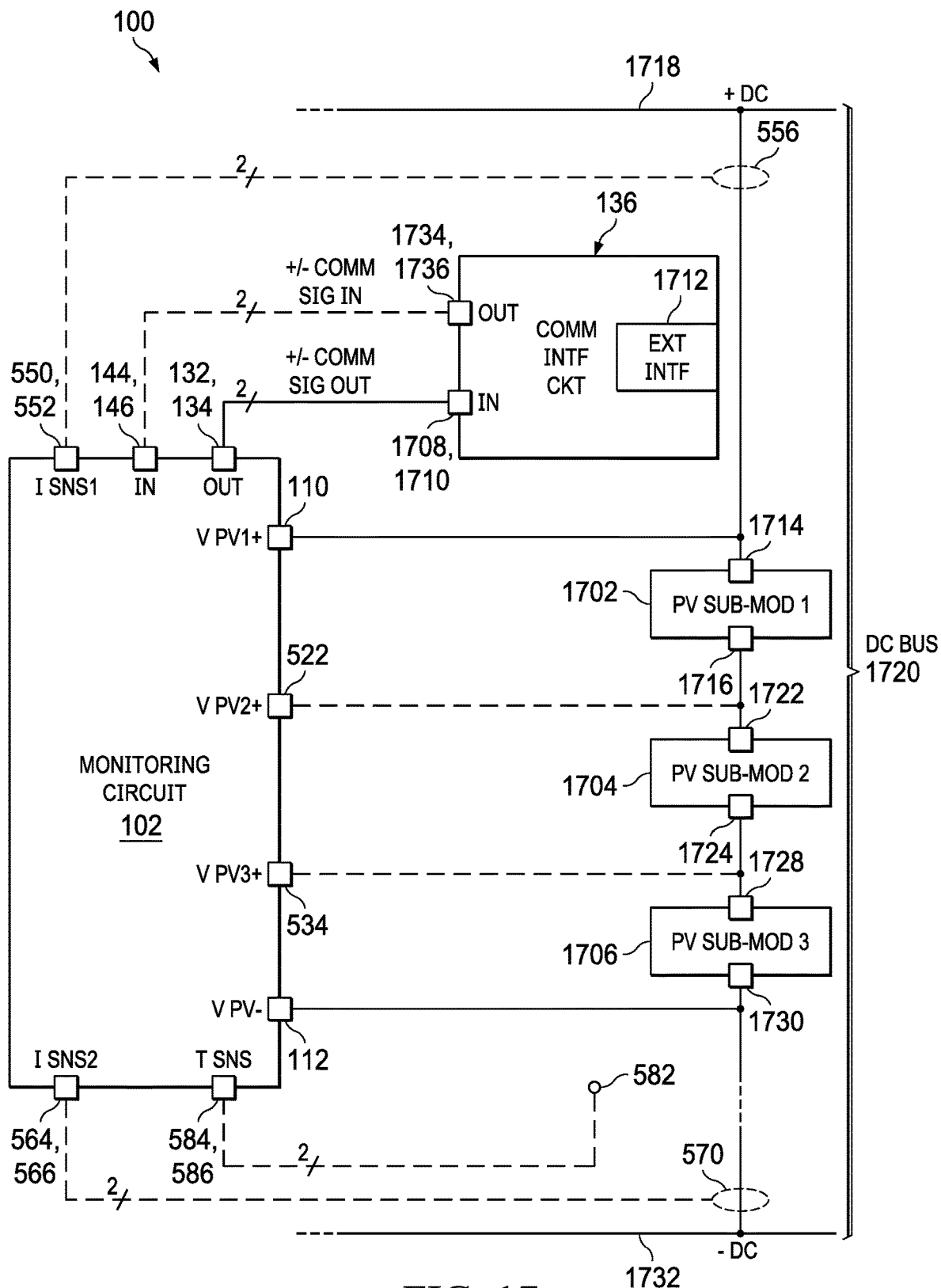
FIG. 17 is a schematic diagram of an example of a PV module.

In another example, the string of PV sub-modules 116 includes first and second PV sub-modules 1702, 1704/1706 (e.g., FIG. 17). In one implementation, the first PV sub-module 1702 includes the monitoring circuit 102. In another implementation, the second PV sub-module 1704/1706 includes the monitoring circuit 102. In another implementation, the first PV sub-module 1702 includes a positive DC power terminal 1714 and the second PV sub-module 1704/1706 includes a negative DC power terminal 1724/1730. The measurement conditioning circuit 104 is receives the sensed voltage signal SENSED V from the positive DC power terminal 1714 of the first PV sub-module 1702 via the voltage sense terminal 110. The measurement conditioning circuit 104 receives the voltage reference signal from the negative DC power terminal 1724/1730 of the second PV sub-module 1704/1706 via the voltage reference terminal 112.

In another example, the measurement data stream MEAS DATA STREAM includes a first representation of the digital measurement data DIG MEAS DATA in data burst form for a first frequency of a spread frequency shift keying (S-FSK) modulation scheme and a second representation of the digital measurement data DIG MEAS DATA in data burst form for a second frequency of the S-FSK modulation scheme. In one implementation, the output communication signal COMM SIG OUT carries modulated data representing the first and second representations of the digital measurement data DIG MEAS DATA using the first and second frequencies of the S-FSK modulation scheme. In one example, the output communication signal COMM SIG OUT is compliant with PLC protocol requirements of SunSpec Interoperability Specification, Communication Signal for Rapid Shutdown, Version 34. The microcontroller circuit 106 and the transmitter circuit 108 are integrated to transmit the output communication signal COMM SIG OUT carrying modulated data representing the digital measurement data DIG MEAS DATA during a zero energy period of a repetitive data frame specified in the PLC protocol requirements of the SunSpec Interoperability Specification.

In another example, the microcontroller circuit 106 uses the modulation clock signal MOD CLK to sample the digital measurement data DIG MEAS DATA to form the measurement data stream MEAS DATA STREAM. In another example, the transmitter circuit 108 uses the modulation clock signal MOD CLK to sample the measurement data stream MEAS DATA STREAM to form the output communication signal COMM SIG OUT.

In another example, the monitoring circuit 102 of FIG. 1 also includes a receiver circuit 142. The microcontroller circuit 106 also includes an input communication data stream input 138 and a demodulation clock input 140. The receiver circuit 142 includes positive and negative input communication terminals 144, 146, an input communication data stream output 148 coupled with the input communication data stream input 138, and a demodulation clock output 150 coupled with the demodulation clock input 140. The receiver circuit 142 receives an input communication signal COMM SIG IN at the positive and negative input communication terminals 144, 146 from the communication interface circuit 136. The receiver circuit 142 generates a demodulation clock signal DEMOD CLK at the demodulation clock output 150. The receiver circuit 142 generates an input communication data stream INPUT COMM DATA STREAM at the input communication data stream output 148 based on the input communication signal COMM SIG IN at the positive and negative input communication terminals 144, 146 and the demodulation clock signal DEMOD CLK. The microcontroller circuit 106 receives the input communication data stream INPUT COMM DATA STREAM from the receiver circuit 142 at the input communication data stream input 138. The microcontroller circuit 106 receives the demodulation clock signal DEMOD CLK from the receiver circuit 142 at the demodulation clock input 140. The microcontroller circuit 106 processes the input communication data stream INPUT COMM DATA STREAM using the demodulation clock signal DEMOD CLK to detect modulated data carried by the input communication signal COMM SIG IN and represented within the input communication data stream INPUT COMM DATA STREAM. The microcontroller circuit 106 generates the transmit select signal XMIT SELECT in response to detecting, for a predetermined time, an absence of the modulated data in the input communication data stream INPUT COMM DATA STREAM representing the input communication signal COMM SIG IN. In another example, the measurement conditioning circuit 104, microcontroller circuit 106, transmitter circuit 108, and receiver circuit 142 are included in an integrated circuit.

In another example, the input communication signal COMM SIG IN is based on a power line communication (PLC) signal associated with the PV module 100. The communication interface circuit 136 receives the PLC signal from a remote transmitter circuit 1806 via a DC bus 1720 (e.g., FIG. 17) associated with the PV module 100. The input communication signal COMM SIG IN is based on data carried by the PLC signal transmitted via the DC bus 1720. In one implementation, the PLC signal is a spread frequency shift keying waveform. In one example, the S-FSK waveform is compliant with the PLC protocol requirements of SunSpec Interoperability Specification, Communication Signal for Rapid Shutdown, Version 34, and the data carried by the PLC signal during an active period of a repetitive data frame includes commands compliant with code requirements of the SunSpec Interoperability Specification.

In another example, the input communication signal COMM SIG IN is based on a wireless communication signal associated with the PV module 100. The communication interface circuit 136 receives the wireless communication signal from a remote transmitter circuit 1904 (e.g., FIG. 19). The input communication signal COMM SIG IN is based on data carried by the wireless communication signal.

In another example, the input communication signal COMM SIG IN is based on a wired control line communication signal associated with the PV module 100. The communication interface circuit 136 receives the wired control line communication signal from a remote receiver/transmitter circuit 2006 (e.g., FIG. 20) via a wired control line. The input communication signal COMM SIG IN is based on data carried by the wired control line communication signal.

In another example, the receiver circuit 142 uses the demodulation clock signal DEMOD CLK to sample the input communication signal COMM SIG IN to form the input communication data stream INPUT COMM DATA STREAM. In another example, the microcontroller circuit 106 uses the demodulation clock signal DEMOD CLK to demodulate data carried by the input communication data stream INPUT COMM DATA STREAM.

In another example, the monitoring circuit of FIG. 1 also includes a PTO distribution circuit 154. The microcontroller circuit 106 also includes a PTO output 152. The PTO distribution circuit 154 includes a PTO input 156 coupled with the PTO output 152, a local PTO output terminal 158, and a remote PTO output terminal 160. The microcontroller circuit 106 generates a PTO signal PTO at the PTO output 152 in response to detecting a presence of modulated data carried by the input communication signal COMM SIG IN and represented within the input communication data stream INPUT COMM DATA STREAM that represents a keep alive command associated with the PV module 100. The PTO distribution circuit 154 generates a local PTO signal LOCAL PTO at the local PTO output terminal 158 based on the PTO signal PTO at the PTO input 156. The PTO distribution circuit 154 generates a remote PTO signal REMOTE PTO at the remote PTO output terminal 160 based on the PTO signal PTO. In another example, the measurement conditioning circuit 104, microcontroller circuit 106, transmitter circuit 108, receiver circuit 142, and PTO distribution circuit 154 are included in an integrated circuit.

In another example, the string of PV modules includes a PV sub-module 1702 (e.g., FIG. 17). The PTO distribution circuit 154 provides the local PTO signal LOCAL PTO to a sub-module controller circuit 162 associated with the PV sub-module 1702. In another example, the PTO distribution circuit 154 provides the remote PTO signal REMOTE PTO to a shutdown initiation device 164 associated with the PV module 100. In another example, the input communication signal COMM SIG IN is based on a PLC signal associated with the PV module 100 that is compliant with the PLC protocol requirements of SunSpec Interoperability Specification, Communication Signal for Rapid Shutdown, Version 34, and the modulated data representing the keep alive command is compliant with permission to operate code requirements of the SunSpec Interoperability Specification.

Figure 2:
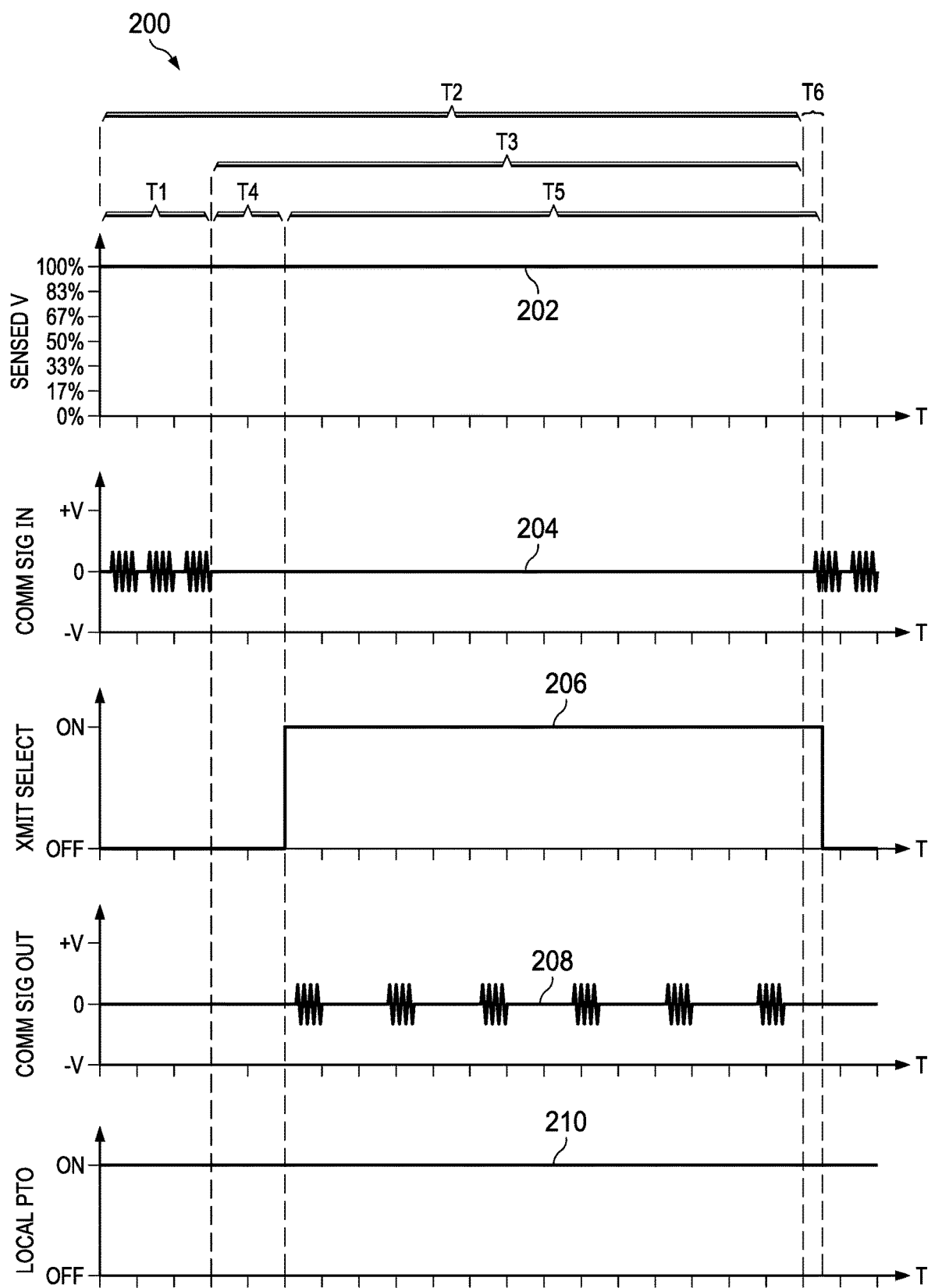
FIG. 2 is a timing diagram of an example of the timing of select signals shown in FIG. 1.

FIG. 2 shows a timing diagram 200 of an example of the timing of select signals in FIG. 1 in relation to operation of the monitoring circuit 102. The timing diagram 200 reflects a simplified scenario for a PV module 100 that is stationary during which the signals are stable and reflect normal conditions. The monitoring circuit 102 and PV sub-modules 116 generally experience this scenario during daylight hours with minor day-to-day and seasonal changes based on actual environmental conditions. In other examples, the amount of light received by the PV sub-modules 116 during daylight hours may vary based on dust, dirt, debris, snow, ice, rain, clouds, shade, or other conditions that cause a portion of light that would otherwise reach one or more of the PV sub-modules 116 to be filtered or blocked. In other examples, the PV module 100 tracks the sun or is otherwise adjusted to follow the sun in relation to a daily cycle. In these examples, the select signals would be different but react to environmental conditions in a similar manner to that described herein for the stationary PV sub-module.

A curve 202 shows an example of the sensed voltage signal SENSED V received by the measurement conditioning circuit 104 from the string of PV sub-modules 116. The sensed voltage signal SENSED V is shown at 100 percent to reflect a condition during daylight hours with full exposure of the to the PV sub-modules 116 to light. For example, the 100 percent level may represent 60 volts DC. In one implementation, the sensed voltage signal SENSED V varies over daylight hours due to numerous factors (e.g., rain, clouds, etc.) and may exhibit curves and smooths transitions rather than the linear signal shown in FIG. 2. In other examples, the sensed voltage signal SENSED V may be lower when the PV sub-modules 116 are not fully exposed to the sun. For example, the sensed voltage signal SENSED V drops to zero (0) percent after sunset until sunrise.

A curve 204 shows an example of the input communication signal COMM SIG IN received by the receiver circuit 142 from the communication interface circuit 136. In this example, the input communication signal COMM SIG IN includes a waveform with modulated input data during an active period T1 of a repetitive data frame T2. The repetitive data frame T2 also includes a zero energy period T3 during which no data is modulated on the input communication signal COMM SIG IN. In one example, the modulated input data includes a command associated with operation of the PV module 100. The command being compliant with code requirements of a predetermined command protocol. In one implementation, the input communication signal COMM SIG IN may include a residual noise level and the waveform and modulated data may exhibit curves and smooth transitions rather than the linear portions and sharp transitions. In another example, the PV system may be experiencing conditions that result in the absence of the modulated input data during the active period T1.

A curve 206 shows an example of the transmit select signal XMIT SELECT generated by the microcontroller circuit 106 and provided to the transmitter circuit 108. The transmit select signal XMIT SELECT is a digital signal that varies between "OFF" and "ON" conditions. The microcontroller circuit 106 varies the transmit select signal XMIT SELECT between the "OFF" and "ON" conditions to form a pulsed signal. The microcontroller circuit 106 transitions the transmit select signal XMIT SELECT from the "OFF" condition to the "ON" condition in response to detecting, for a predetermined time T4, an absence of modulated data in the input communication data stream INPUT COMM DATA STREAM representing the input communication signal COMM SIG IN. The period T5 of time the transmit select signal XMIT SELECT is "ON" overlaps most of the zero energy period of the data frame T2. The predetermined time T4 associated with detecting the absence of modulated data reflects a lag between the start of the zero energy period T3 and the start of the period T5 when the transmit select signal XMIT SELECT is "ON." The microcontroller circuit 106 transitions the transmit select signal XMIT SELECT from the "ON" condition to the "OFF" condition in response to detecting modulated data in the input communication data stream INPUT COMM DATA STREAM representing the input communication signal COMM SIG IN. The period T6 of time the transmit select signal XMIT SELECT is "ON" that overlaps the active period T1 of the next data frame T2 reflects a lag between the start of the next active period T1 and the start of the next period when the transmit select signal XMIT SELECT is "OFF." In one implementation, the transmit select signal XMIT SELECT includes a residual noise level and may exhibit curves and smooth transitions rather than the linear portions with sharp transitions.

A curve 208 shows an example of the output communication signal COMM SIG OUT generated by the transmitter circuit 108 and provided to the communication interface circuit 136. In this example, the output communication signal COMM SIG IN includes a waveform with modulated output data during the period T5 when the transmit select signal XMIT SELECT is "ON." In one example, the modulated output data includes data bursts associated with the sensed voltage signal SENSED V. The data bursts being compliant with code requirements of a predetermined data protocol. In one implementation, the output communication signal COMM SIG OUT may include a residual noise level and the waveform and modulated data may exhibit curves and smooth transitions rather than the linear portions and sharp transitions. In other examples, there may be less data bursts or more data bursts during the period T5 when the transmit select signal XMIT SELECT is "ON."

A curve 210 shows an example of the local PTO signal LOCAL PTO generated by the PTO distribution circuit 154 and provided to one or more sub-module controller circuits 162 associated with the string of PV sub-modules 116. The local PTO signal LOCAL PTO is a digital signal that varies between "OFF" and "ON" conditions. The PTO distribution circuit 154 generates the local PTO signal LOCAL PTO based on the PTO signal PTO received from the microcontroller circuit 106. The microcontroller circuit 106 generates the PTO signal PTO in response to detecting a presence of modulated input data carried by the input communication signal COMM SIG IN and represented within the input communication data stream INPUT COMM DATA STREAM. In one example, the modulated input data detected by the microcontroller circuit 106 represents a keep alive command associated with the PV module 100. The command being compliant with code requirements of a predetermined command protocol. For example, if the microcontroller circuit 106 detects the keep alive command during the active period T1 of repetitive data frames T2, the PTO signal PTO is activated and the local PTO signal LOCAL PTO signal remains in the "ON" condition. If the microcontroller circuit 106 detects the absence of the keep alive command for a predetermined amount of data frames T2, the PTO signal PTO is deactivated and the local PTO signal LOCAL PTO signal transitions from the "ON" condition to the "OFF" condition. In one implementation, the local PTO signal LOCAL PTO signal may include a residual noise level and may exhibit curves and smooth transitions rather than the linear portion shown in FIG. 2.

Figure 3:
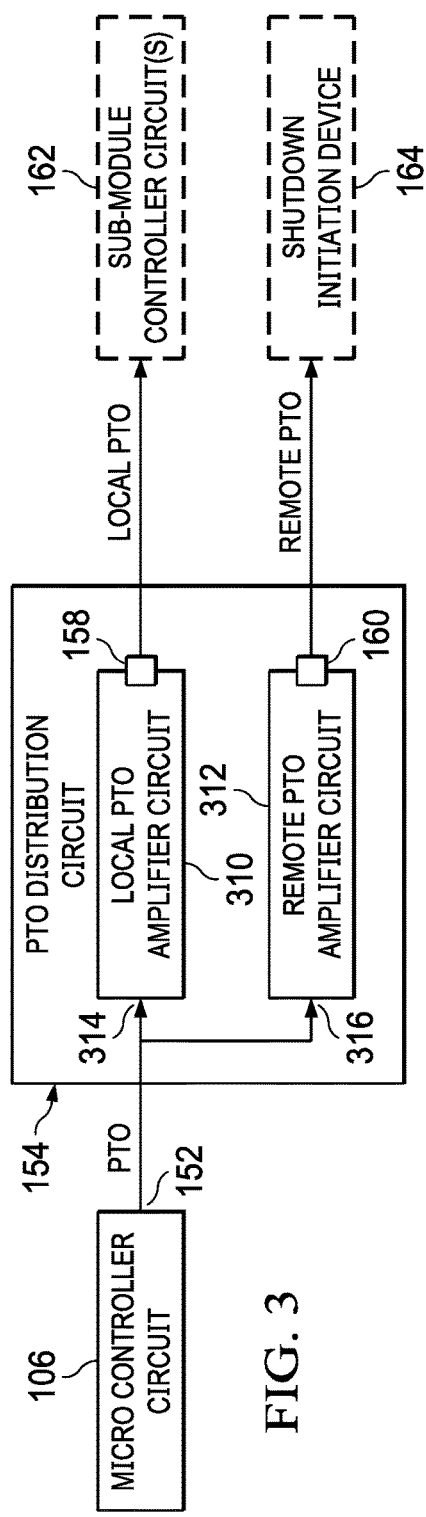
FIG. 3 is a schematic diagram of an example of a permission to operate (PTO) distribution circuit.

FIG. 3 shows an example of the PTO distribution circuit 154. The PTO distribution circuit 154 includes a local PTO amplifier circuit 310 and a remote PTO amplifier circuit 312. The local PTO amplifier circuit 310 includes a first PTO input 314 coupled with the PTO output 152 and the local PTO output terminal 158 of the PTO distribution circuit 154. The remote PTO amplifier circuit 312 includes a second PTO input 316 coupled with the PTO output 152 and the remote PTO output terminal 160 of the PTO distribution circuit 154. The local PTO amplifier circuit 310 generates the local PTO signal LOCAL PTO at the local PTO output terminal 158 based on the PTO signal PTO at the first PTO input 314. The remote PTO amplifier circuit 312 generates the remote PTO signal REMOTE PTO at the remote PTO output terminal 160 based on the PTO signal PTO at the second PTO input 316. The PTO input 156 of the PTO distribution circuit 154 includes the first and second PTO inputs 314, 316.

Figure 4:
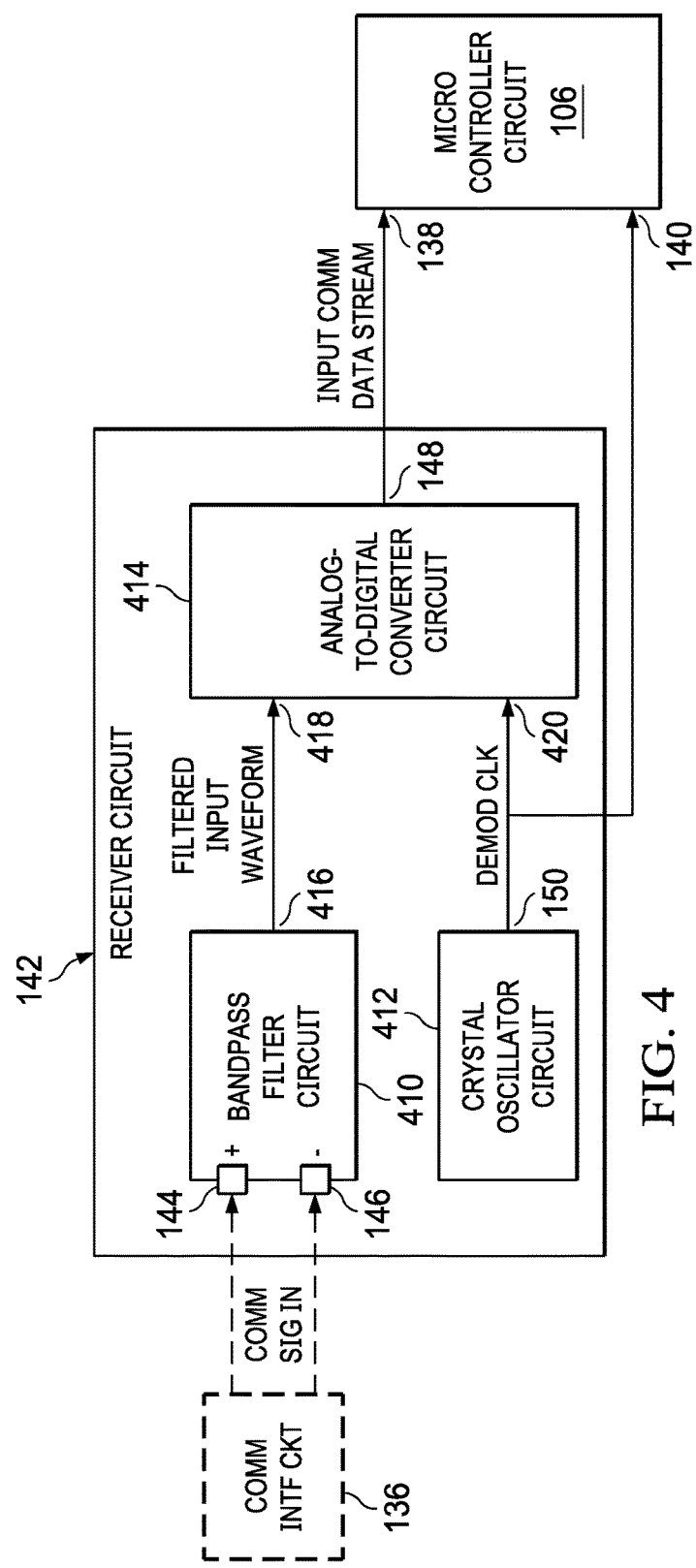
FIG. 4 is a schematic diagram of an example of a receiver circuit.

FIG. 4 shows an example of the receiver circuit 142. The receiver circuit 142 includes a bandpass filter circuit 410, a crystal oscillator circuit 412, and an analog-to-digital converter circuit 414. The bandpass filter circuit 410 includes the positive and negative input communication terminals 144, 146 of the receiver circuit 142 and a filtered input communication output 416. The crystal oscillator circuit 412 includes the demodulation clock output 150 of the receiver circuit 142. The analog-to-digital converter circuit 414 includes a filtered input communication input 418 coupled with the filtered input communication output 416, a second demodulation clock input 420 coupled with the demodulation clock output 150, and the input communication data stream output 148 of the receiver circuit 142. The bandpass filter circuit 410 generates a filtered input waveform FILTERED INPUT WAVEFORM at the filtered input communication output 416 based on the input communication signal COMM SIG IN at the positive and negative input communication terminals 144, 146. The crystal oscillator circuit 412 generates the demodulation clock signal DEMOD CLK at the demodulation clock output 150. The analog-to-digital converter circuit 414 generates the input communication data stream INPUT COMM DATA STREAM at the input communication data stream output 148 based on the filtered input waveform FILTERED INPUT WAVEFORM at the filtered input communication input 418 in response to the demodulation clock signal DEMOD CLK at the second demodulation clock input 420. In another example, the analog-to-digital converter circuit 414 uses the demodulation clock signal DEMOD CLK to sample the filtered input waveform FILTERED INPUT WAVEFORM to form the input communication data stream INPUT COMM DATA STREAM. In another example, the bandpass filter circuit 410 receives the input communication signal COMM SIG IN from the communication interface circuit 136.

Figure 5:
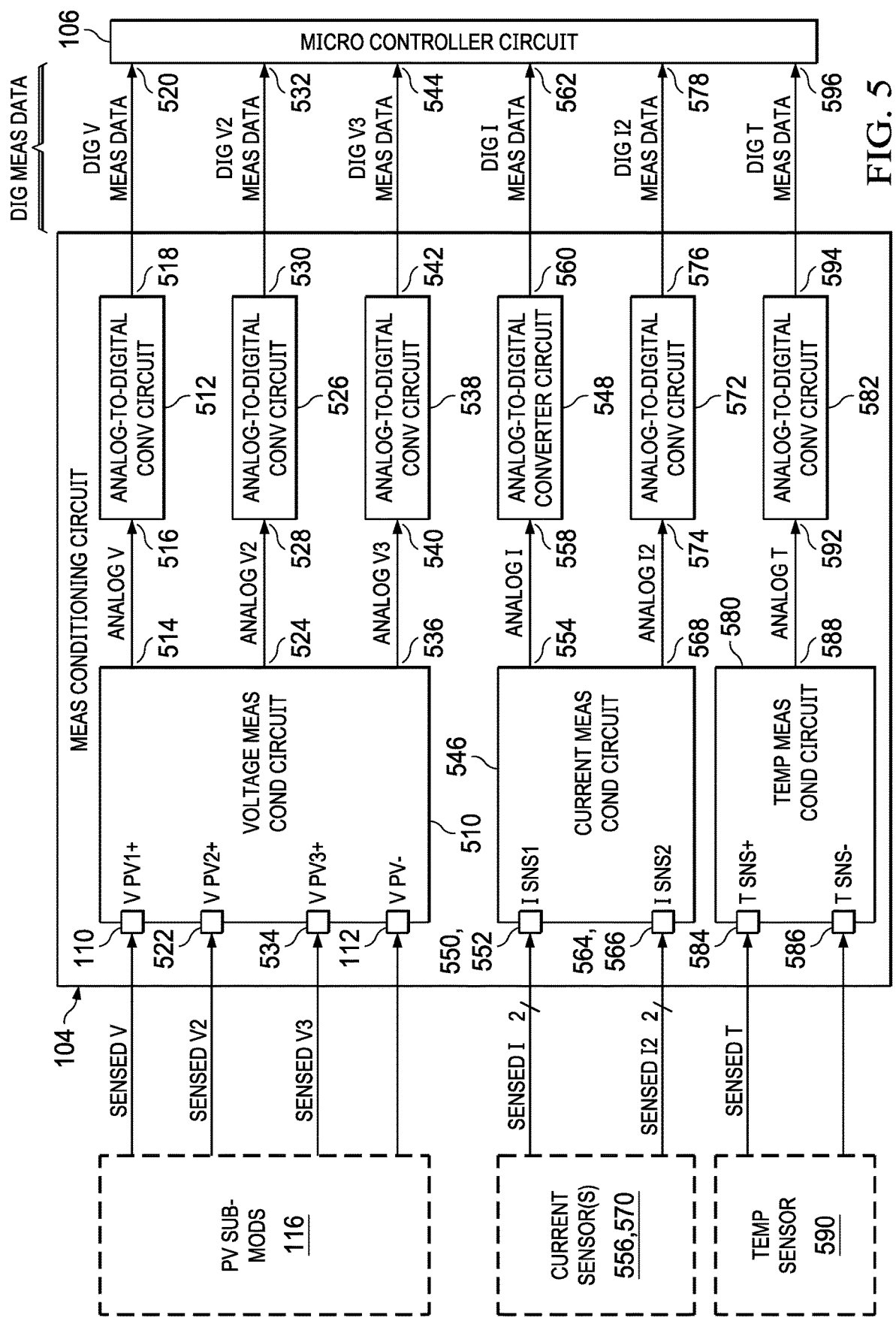
FIG. 5 is a schematic diagram of an example of a measurement conditioning circuit.

FIG. 5 shows an example of the measurement conditioning circuit 104. The measurement conditioning circuit 104 includes a voltage measurement conditioning circuit 510 and an analog-to-digital converter circuit 512. The voltage measurement conditioning circuit 510 includes the voltage sense terminal 110 of the measurement conditioning circuit 104, the voltage reference terminal 112 of the measurement conditioning circuit 104, and an analog voltage output 514. The analog-to-digital converter circuit 512 includes an analog voltage input 516 coupled with the analog voltage output 514 and a digital voltage measurement output 518 coupled with a digital voltage measurement input 520 of the microcontroller circuit 106. The voltage measurement conditioning circuit 510 receives the sensed voltage signal SENSED V at the voltage sense terminal 110 from the string of PV sub-modules 116. The voltage measurement conditioning circuit 510 receives the voltage reference signal at the voltage reference terminal 112 from the string of PV sub-modules 116. The voltage measurement conditioning circuit 510 generates an analog voltage signal ANALOG V at the analog voltage output 514 based on the sensed voltage signal SENSED V at the voltage sense terminal 110 in reference to the voltage reference signal at the voltage reference terminal 112. The analog-to-digital converter circuit 512 generates digital voltage measurement data DIG V MEAS DATA at the digital voltage measurement output 518 based on the analog voltage signal ANALOG V at the analog voltage input 516 such that the sensed voltage signal SENSED V is represented within the digital voltage measurement data DIG V MEAS DATA. The digital measurement data output 114 of the measurement conditioning circuit 104 includes the digital voltage measurement output 518 and the digital measurement data DIG MEAS DATA generated by the measurement conditioning circuit 104 includes the digital voltage measurement data DIG V MEAS DATA. The digital measurement data input 118 of the microcontroller circuit 106 includes the digital voltage measurement input 520. In one implementation, the string of PV sub-modules 116 includes first and second PV sub-modules 1702, 1704/1706 (e.g., FIG. 17). The first PV sub-module 1702 includes a positive DC power terminal 1714 and the second PV sub-module 1704/1706 includes a negative DC power terminal 1724/1730. The voltage measurement conditioning circuit 510 receives the sensed voltage signal SENSED V from the positive DC power terminal 1714 of the first PV sub-module 1702 via the voltage sense terminal 110. The voltage measurement conditioning circuit 510 receives the voltage reference signal from the negative DC power terminal 1724/1730 of the second PV sub-module 1704/1706 via the voltage reference terminal 112.

In another example, the voltage measurement conditioning circuit 510 also includes a second voltage sense terminal 522 and a second analog voltage output 524 and the measurement conditioning circuit 104 also includes a second analog-to-digital converter circuit 526. The second analog-to-digital converter circuit 526 includes a second analog voltage input 528 coupled with the second analog voltage output 524 and a second digital voltage measurement output 530 coupled with a second digital voltage measurement input 532 of the microcontroller circuit 106. The voltage measurement conditioning circuit 510 receives a second sensed voltage signal SENSED V2 at the second voltage sense terminal 522 from the string of PV sub-modules 116. The voltage measurement conditioning circuit 510 generates a second analog voltage signal ANALOG V2 at the second analog voltage output 524 based on the second sensed voltage signal SENSED V2 at the second voltage sense terminal 522 in reference to the voltage reference signal at the voltage reference terminal 112. The second analog-to-digital converter circuit 526 generates second digital voltage measurement data DIG V2 MEAS DATA at the second digital voltage measurement output 530 based on the second analog voltage signal ANALOG V2 at the second analog voltage input 528 such that the second sensed voltage signal SENSED V2 is represented within the second digital voltage measurement data DIG V2 MEAS DATA. The digital measurement data output 114 of the measurement conditioning circuit 104 includes the second digital voltage measurement output 530 and the digital measurement data DIG MEAS DATA generated by the measurement conditioning circuit 104 includes the second digital voltage measurement data DIG V2 MEAS DATA. The digital measurement data input 118 of the microcontroller circuit 106 includes the second digital voltage measurement input 532.

In one implementation, the string of PV sub-modules 116 includes first and second PV sub-modules 1702, 1704/1706 (e.g., FIG. 17). The first PV sub-module 1702 includes a positive DC power terminal 1714 and the second PV sub-module 1704/1706 includes a positive DC power terminal 1722/1728 and a negative DC power terminal 1724/1730. The voltage measurement conditioning circuit 510 receives the sensed voltage signal SENSED V from the positive DC power terminal 1714 of the first PV sub-module 1702 via the voltage sense terminal 110. The voltage measurement conditioning circuit 510 receives the second sensed voltage signal SENSED V2 from the positive DC power terminal 1722/1728 of the second PV sub-module 1704/1706 via the second voltage sense terminal 522. The voltage measurement conditioning circuit 510 receives the voltage reference signal from the negative DC power terminal 1724/1730 of the second PV sub-module 1704/1706 via the voltage reference terminal 112.

In another example, the voltage measurement conditioning circuit 510 also includes a third voltage sense terminal 534 and a third analog voltage output 536 and the measurement conditioning circuit 104 also includes a third analog-to-digital converter circuit 538. The third analog-to-digital converter circuit 538 includes a third analog voltage input 540 coupled with the third analog voltage output 536 and a third digital voltage measurement output 542 coupled with a third digital voltage measurement input 544 of the microcontroller circuit 106. The voltage measurement conditioning circuit 510 receives a third sensed voltage signal SENSED V3 at the third voltage sense terminal 534 from the string of PV sub-modules 116. The voltage measurement conditioning circuit 510 generates a third analog voltage signal ANALOG V3 at the third analog voltage output 536 based on the third sensed voltage signal SENSED V3 at the third voltage sense terminal 534 in reference to the voltage reference signal at the voltage reference terminal 112. The third analog-to-digital converter circuit 538 generates third digital voltage measurement data DIG V3 MEAS DATA at the third digital voltage measurement output 542 based on the third analog voltage signal ANALOG V3 at the third analog voltage input 540 such that the third sensed voltage signal SENSED V3 is represented within the third digital voltage measurement data DIG V3 MEAS DATA. The digital measurement data output 114 of the measurement conditioning circuit 104 includes the third digital voltage measurement output 542 and the digital measurement data DIG MEAS DATA generated by the measurement conditioning circuit 104 includes the third digital voltage measurement data DIG V3 MEAS DATA. The digital measurement data input 118 of the microcontroller circuit 106 includes the third digital voltage measurement input 544.

In one implementation, the string of PV sub-modules 116 includes first, second, and third PV sub-modules 1702, 1704, 1706 (FIG. 17). The first PV sub-module 1702 includes a positive DC power terminal 1714, the second PV sub-module 1704 includes a positive DC power terminal 1722, and the third PV sub-module 1706 includes a positive DC power terminal 1728 and a negative DC power terminal 1730. The voltage measurement conditioning circuit 510 receives the sensed voltage signal SENSED V from the positive DC power terminal 1714 of the first PV sub-module 1702 via the voltage sense terminal 110. The voltage measurement conditioning circuit 510 receives the second sensed voltage signal SENSED V2 from the positive DC power terminal 1722 of the second PV sub-module 1704 via the second voltage sense terminal 522. The voltage measurement conditioning circuit 510 receives the third sensed voltage signal SENSED V3 from the positive DC power terminal 1728 of the third PV sub-module 1706 via the third voltage sense terminal 534. The voltage measurement conditioning circuit 510 receives the voltage reference signal from the negative DC power terminal 1730 of the third PV sub-module 1706 via the voltage reference terminal 112. In another implementation, the analog-to-digital converter circuit 512 includes the second and third analog-to-digital converter circuits 526, 538.

In another example, the measurement conditioning circuit 104 also includes a current measurement conditioning circuit 546 and a second analog-to-digital converter circuit 548. The current measurement conditioning circuit 546 includes positive and negative current sense terminals 550, 552 and an analog current output 554. The second analog-to-digital converter circuit 548 includes an analog current input 558 coupled with the analog current output 554 and a digital current measurement output 560 coupled with a digital current measurement input 562 of the microcontroller circuit 106. The current measurement conditioning circuit 546 receives a sensed current signal SENSED I at the positive current sense terminal 550 from a current sensor 556 associated with the string of PV sub-modules 116. The current measurement conditioning circuit 546 receives a current reference signal at the negative current sense terminal 552 from the current sensor 556. The current measurement conditioning circuit 546 generates an analog current signal ANALOG I at the analog current output 554 based on the sensed current signal SENSED I at the positive current sense terminal 550 in reference to the current reference signal at the negative current sense terminal 552. The second analog-to-digital converter circuit 548 generates digital current measurement data DIG I MEAS DATA at the digital current measurement output 560 based on the analog current signal ANALOG I at the analog current input 558 such that the sensed current signal SENSED I is represented within the digital current measurement data DIG I MEAS DATA. The digital measurement data output 114 of the measurement conditioning circuit 104 includes the digital current measurement output 560 and the digital measurement data DIG MEAS DATA generated by the measurement conditioning circuit 104 includes the digital current measurement data DIG I MEAS DATA. The digital measurement data input 118 of the microcontroller circuit 106 includes the digital current measurement input 562.

In another example, the string of PV sub-modules 116 includes a positive DC power terminal 1714 (FIG. 17) coupled with a positive DC power line 1718 of a DC bus 1720 and a negative DC power terminal 1730 coupled with a negative DC power line 1732 of the DC bus 1720. The current sensor 556 senses current passing through the string of PV sub-modules 116 between the positive DC power line 1718 and the negative DC power line 1732. The current sensor 556 generates the sensed current signal SENSED I based on the sensed current. The current sensor 556 includes positive and negative terminals. The positive current sense terminal 550 of the current measurement conditioning circuit 546 is coupled with the positive terminal and the negative current sense terminal 552 of the current measurement conditioning circuit 546 is coupled with the negative terminal. In one implementation, the current sensor 556 senses current passing through the positive DC power line 1718 between the DC bus 1720 and the positive DC power terminal 1714 of the string of PV sub-modules 116. In another implementation, the current sensor 556 senses current passing through the negative DC power line 1732 between the negative DC power terminal 1730 of the string of PV sub-modules 116 and the DC bus 1720.

In another example, the microcontroller circuit 106 generates power measurement data associated with the string of PV sub-modules 116 based on the digital voltage measurement data DIG V MEAS DATA associated with the sensed voltage signal SENSED V and the digital current measurement data DIG I MEAS DATA associated with the sensed current signal SENSED I. The measurement data stream MEAS DATA STREAM is also based on the power measurement data such that the power measurement data is represented within the measurement data stream MEAS DATA STREAM and the output communication signal COMM SIG OUT.

In another example, the current measurement conditioning circuit 546 also includes a second positive current sense terminal 564, a second negative current sense terminal 566, and a second analog current output 568 and the measurement conditioning circuit 104 also includes a third analog-to-digital converter circuit 572. The third analog-to-digital converter circuit 572 includes a second analog current input 574 coupled with the second analog current output 568 and a second digital current measurement output 576 coupled with a second digital current measurement input 578 of the microcontroller circuit 106. The current measurement conditioning circuit 546 receives a second sensed current signal SENSED 12 at the second positive current sense terminal 564 from a second current sensor 570 associated with the string of PV sub-modules 116. The current measurement conditioning circuit 546 receives a second current reference signal at the second negative current sense terminal 566 from the second current sensor 570. The current measurement conditioning circuit 546 generates a second analog current signal ANALOG 12 at the second analog current output 568 based on the second sensed current signal SENSED 12 at the second positive current sense terminal 564 in reference to the second current reference signal at the second negative current sense terminal 566. The third analog-to-digital converter circuit 572 generates second digital current measurement data DIG 12 MEAS DATA at the second digital current measurement output 576 based on the second analog current signal ANALOG 12 at the second analog current input 574 such that the second sensed current signal SENSED 12 is represented within the second digital current measurement data DIG 12 MEAS DATA. The digital measurement data output 114 of the measurement conditioning circuit 104 includes the second digital current measurement output 576 and the digital measurement data DIG MEAS DATA generated by the measurement conditioning circuit 104 includes the second digital current measurement data DIG 12 MEAS DATA. The digital measurement data input 118 of the microcontroller circuit 106 includes the second digital current measurement input 578. In one implementation, the analog-to-digital converter circuit 512 includes the second and third analog-to-digital converter circuits 548, 572.

In another example, the string of PV sub-modules 116 includes a positive DC power terminal 1714 (FIG. 17) coupled with a positive DC power line 1718 of a DC bus 1720 and a negative DC power terminal 1730 coupled with a negative DC power line 1732 of the DC bus 1720. In one implementation, the current sensor 556 includes positive and negative terminals. The positive current sense terminal 550 of the current measurement conditioning circuit 546 is coupled with the positive terminal and the negative current sense terminal 552 of the current measurement conditioning circuit 546 is coupled with the negative terminal. The current sensor 556 senses current passing through the positive DC power line 1718 between the DC bus 1720 and the positive DC power terminal 1714 of the string of PV sub-modules 116. The current sensor 556 generates the sensed current signal SENSED I based on the sensed current. In another implementation, the second current sensor 570 includes second positive and negative terminals. The second positive current sense terminal 564 of the current measurement conditioning circuit 546 is coupled with the second positive terminal and the second negative current sense terminal 566 of the current measurement conditioning circuit 546 is coupled with the second negative terminal. The second current sensor 570 senses current passing through the negative DC power line 1732 between the negative DC power terminal 1730 of the string of PV sub-modules 116 and the DC bus 1720. The second current sensor 570 generates the second sensed current signal SENSED 12 based on the sensed current.

In another example, the measurement conditioning circuit 104 also includes a temperature measurement conditioning circuit 580 and a second analog-to-digital converter circuit 582. The temperature measurement conditioning circuit 580 includes positive and negative temperature sense terminals 584, 586 and an analog temperature output 588. The second analog-to-digital converter circuit 582 includes an analog temperature input 592 coupled with the analog temperature output 588 and a digital temperature measurement output 594 coupled with a digital temperature measurement input 596 of the microcontroller circuit 106. The temperature measurement conditioning circuit 580 receives a sensed temperature signal SENSED T at the positive temperature sense terminal 584 from a temperature sensor 590 associated with the string of PV sub-modules 116. The temperature measurement conditioning circuit 580 receives a temperature reference signal at the negative temperature sense terminal 586 from the temperature sensor 590. The temperature measurement conditioning circuit 580 generates an analog temperature signal ANALOG T at the analog temperature output 588 based on the sensed temperature signal SENSED T at the positive temperature sense terminal 584 in reference to the temperature reference signal at the negative temperature sense terminal 586. The second analog-to-digital converter circuit 582 generates digital temperature measurement data DIG T MEAS DATA at the digital temperature measurement output 594 based on the analog temperature signal ANALOG T at the analog temperature input 592 such that the sensed temperature signal SENSED T is represented within the digital temperature measurement data DIG T MEAS DATA. The digital measurement data output 114 of the measurement conditioning circuit 104 includes the digital temperature measurement output 594 and the digital measurement data DIG MEAS DATA generated by the measurement conditioning circuit 104 includes the digital temperature measurement data DIG T MEAS DATA. The digital measurement data input 118 of the microcontroller circuit 106 includes the digital temperature measurement input 596. In one implementation, the analog-to-digital converter circuit 512 includes the second analog-to-digital converter circuit 582.

The temperature sensor 590 includes positive and negative terminals. The positive temperature sense terminal 584 of the temperature measurement conditioning circuit 580 is coupled with the positive terminal and the negative temperature sense terminal 586 of the temperature measurement conditioning circuit 580 is coupled with the negative terminal. The temperature sensor 590 senses a temperature associated with the PV module 100 and generates the sensed temperature signal SENSED T based on the sensed temperature.

Figure 6:
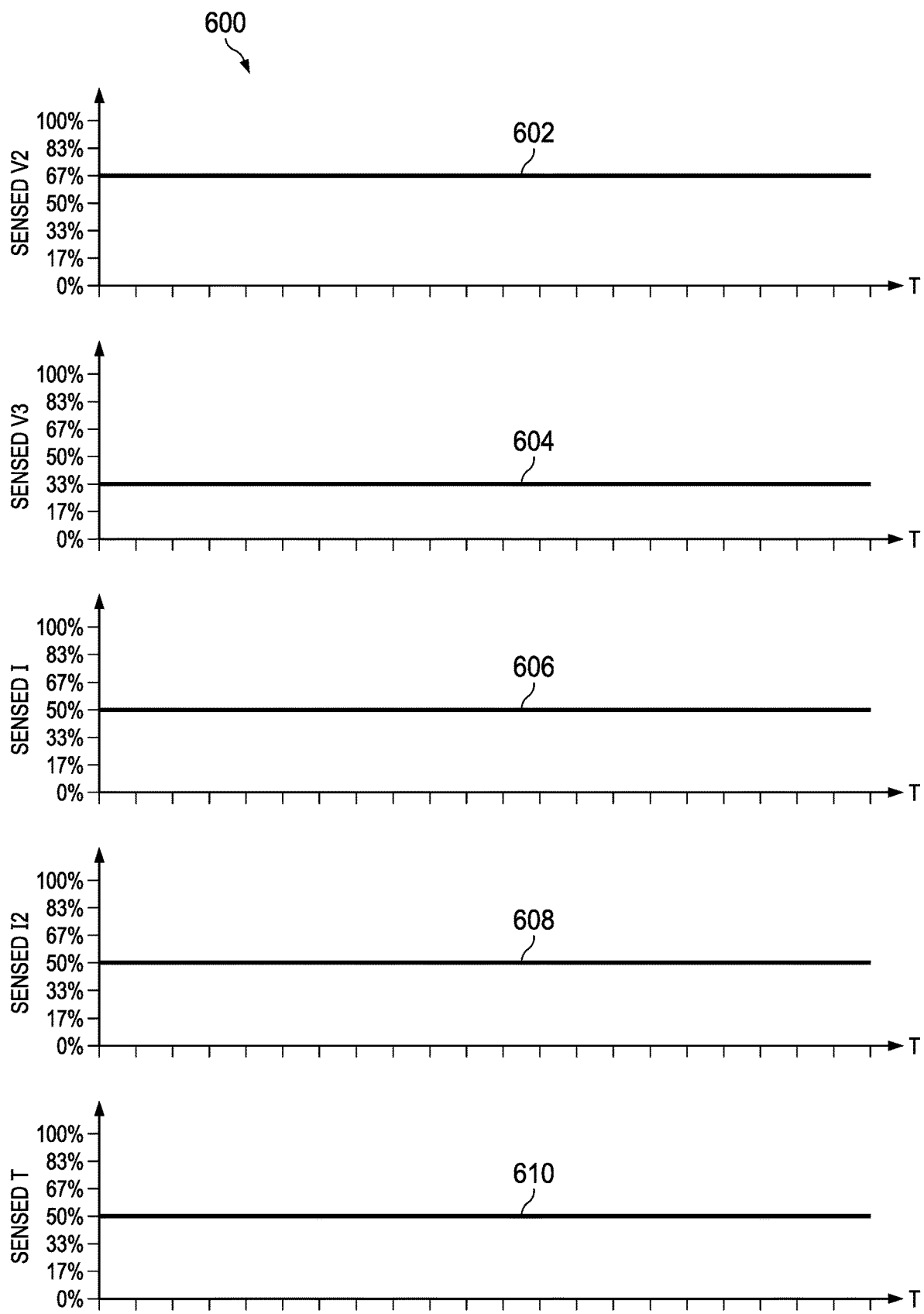
FIG. 6 is a timing diagram of an example of the timing of select signals shown in FIG. 5.

FIG. 6 shows a timing diagram 600 of an example of the timing of select signals in FIG. 5 in relation to operation of the measurement conditioning circuit 104. The timing diagram 600 reflects a simplified scenario for a PV module 100 that is stationary during which the signals are stable and reflect normal conditions. The measurement conditioning circuit 104, PV sub-modules 116, current sensor(s) 556, 570, and temperature sensor 590 generally experience this scenario during daylight hours with minor day-to-day and seasonal changes based on actual environmental conditions. In other examples, the amount of light received by the PV sub-modules 116 during daylight hours may vary based on dust, dirt, debris, snow, ice, rain, clouds, shade, or other conditions that cause a portion of light that would otherwise reach one or more of the PV sub-modules 116 to be filtered or blocked. In other examples, the PV module 100 tracks the sun or is otherwise adjusted to follow the sun in relation to a daily cycle. In these examples, the select signals would be different but react to environmental conditions in a similar manner to that described herein for the stationary PV sub-module.

A curve 602 shows an example of the second sensed voltage signal SENSED V2 received by the voltage measurement conditioning circuit 510 from the string of PV sub-modules 116. The second sensed voltage signal SENSED V2 is shown at 67 percent to reflect a condition during daylight hours with full exposure of the to the PV sub-modules 116 to light. For example, the 67 percent level may represent 40 volts DC. In one implementation, the second sensed voltage signal SENSED V2 varies over daylight hours due to numerous factors (e.g., rain, clouds, etc.) and may exhibit curves and smooths transitions rather than the linear signal shown in FIG. 6. In other examples, the second sensed voltage signal SENSED V2 may be lower when the PV sub-modules 116 are not fully exposed to the sun. For example, the second sensed voltage signal SENSED V2 drops to zero (0) percent after sunset until sunrise.

A curve 604 shows an example of the third sensed voltage signal SENSED V3 received by the voltage measurement conditioning circuit 510 from the string of PV sub-modules 116. The third sensed voltage signal SENSED V3 is shown at 33 percent to reflect a condition during daylight hours with full exposure of the to the PV sub-modules 116 to light. For example, the 33 percent level may represent 20 volts DC. In one implementation, the third sensed voltage signal SENSED V3 varies over daylight hours due to numerous factors (e.g., rain, clouds, etc.) and may exhibit curves and smooths transitions rather than the linear signal shown in FIG. 6. In other examples, the third sensed voltage signal SENSED V3 may be lower when the PV sub-modules 116 are not fully exposed to the sun. For example, the third sensed voltage signal SENSED V3 drops to zero (0) percent after sunset until sunrise.

A curve 606 shows an example of the sensed current signal SENSED I received by the current measurement conditioning circuit 546 from the current sensor 556. The sensed current signal SENSED I is shown at 50 percent to reflect a normal condition during daylight hours with full exposure of the to the PV sub-modules 116 to light. For example, the 50 percent level may represent 7 amps DC. In one implementation, the sensed current signal SENSED I varies over daylight hours due to numerous factors (e.g., rain, clouds, etc.) and may exhibit curves and smooths transitions rather than the linear signal shown in FIG. 6. In other examples, the sensed current signal SENSED I may be higher during degraded or abnormal daylight conditions or lower when the PV sub-modules 116 are not fully exposed to the sun. For example, the sensed current signal SENSED I drops to zero (0) percent after sunset until sunrise.

A curve 608 shows an example of the second sensed current signal SENSED I2 received by the current measurement conditioning circuit 546 from the second current sensor 570. The second sensed current signal SENSED I2 is shown at 50 percent to reflect a normal condition during daylight hours with full exposure of the to the PV sub-modules 116 to light. For example, the 50 percent level may represent 7 amps DC. In one implementation, the second sensed current signal SENSED I2 varies over daylight hours due to numerous factors (e.g., rain, clouds, etc.) and may exhibit curves and smooths transitions rather than the linear signal shown in FIG. 6. In other examples, the second sensed current signal SENSED I2 may be higher during degraded or abnormal daylight conditions or lower when the PV sub-modules 116 are not fully exposed to the sun. For example, the second sensed current signal SENSED I2 drops to zero (0) percent after sunset until sunrise. Under normal operation, the sensed current signal SENSED I and second sensed current signal SENSED I2 are generally the same value within normal tolerances of the sensors 556, 570 and other components.

A curve 610 shows an example of the sensed temperature signal SENSED T received by the temperature measurement conditioning circuit 580 from the temperature sensor 590. The sensed temperature signal SENSED T is shown at 50 percent to reflect a normal condition during daylight hours with full exposure of the to the PV sub-modules 116 to light. In one implementation, the sensed temperature signal SENSED T varies over daylight hours due to numerous factors (e.g., rain, clouds, etc.) and may exhibit curves and smooths transitions rather than the linear signal shown in FIG. 6. In other examples, the sensed temperature signal SENSED T may be higher during degraded or abnormal daylight conditions or lower when the PV sub-modules 116 are not fully exposed to the sun. For example, the sensed temperature signal SENSED T may approach ambient temperature after sunset until sunrise.

Figure 7:
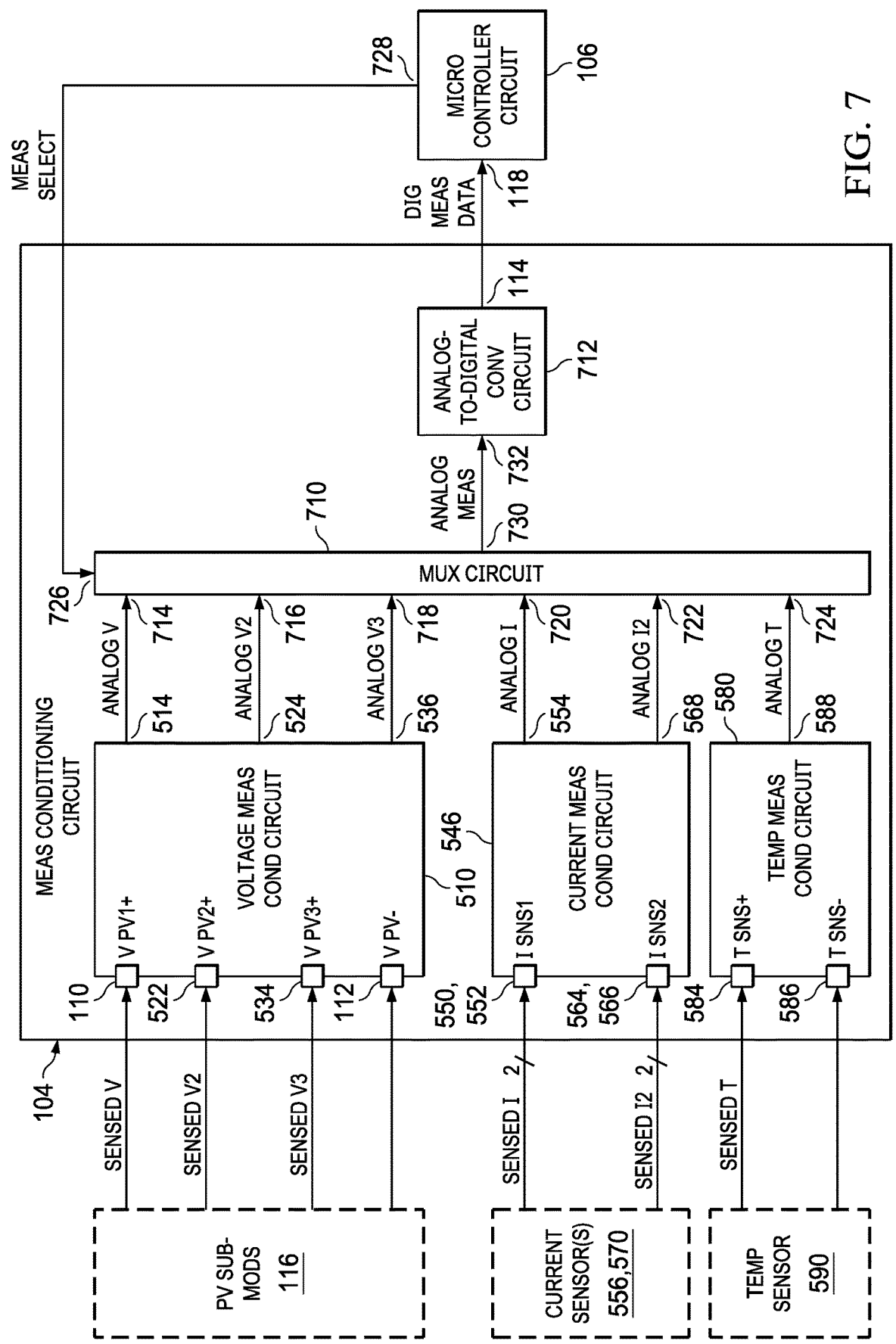
FIG. 7 is a schematic diagram of another example of a measurement conditioning circuit.

FIG. 7 shows another example of the measurement conditioning circuit 104. The measurement conditioning circuit 104 includes a voltage measurement conditioning circuit 510, a current measurement conditioning circuit 546, a temperature measurement conditioning circuit 580, a multiplexer circuit 710, and an analog-to-digital converter circuit 712. The voltage measurement conditioning circuit 510 includes the voltage sense terminal 110 of the measurement conditioning circuit 104, a second voltage sense terminal 522, a third voltage sense terminal 534, the voltage reference terminal 112 of the measurement conditioning circuit 104, an analog voltage output 514, a second analog voltage output 524, and a third analog voltage output 536. The current measurement conditioning circuit 546 includes first positive and negative current sense terminals 550, 552, second positive and negative current sense terminals 564, 566, a first analog current output 554, and a second analog current output 568. The temperature measurement conditioning circuit 580 includes positive and negative temperature sense terminals 584, 586 and an analog temperature output 588. The multiplexer circuit 710 includes an analog voltage input 714 coupled with the analog voltage output 514, a second analog voltage input 716 coupled with the second analog voltage output 524, a third analog voltage input 718 coupled with the third analog voltage output 536, a first analog current input 720 coupled with the first analog current output 554, a second analog current input 722 coupled with the second analog current output 568, an analog temperature input 724 coupled with the analog temperature output 588, a measurement select input 726 coupled with a measurement select output 728 of the microcontroller circuit 106, and an analog measurement output 730. The analog-to-digital converter circuit 712 includes an analog measurement input 732 coupled with the analog measurement output 730 and the digital measurement data output 114 of the measurement conditioning circuit 104 coupled with the digital measurement data input 118.

The voltage measurement conditioning circuit 510 receives the sensed voltage signal SENSED V at the voltage sense terminal 110 from the string of PV sub-modules 116. The voltage measurement conditioning circuit 510 receives a second sensed voltage signal SENSED V2 at the second voltage sense terminal 522 from the string of PV sub-modules 116. The voltage measurement conditioning circuit 510 receives a third sensed voltage signal SENSED V3 at the third voltage sense terminal 534 from the string of PV sub-modules 116. The voltage measurement conditioning circuit 510 receives the voltage reference signal at the voltage reference terminal 112 from the string of PV sub-modules 116. The voltage measurement conditioning circuit 510 generates an analog voltage signal ANALOG V at the analog voltage output 514 based on the sensed voltage signal SENSED V at the voltage sense terminal 110 in reference to the voltage reference signal at the voltage reference terminal 112. The voltage measurement conditioning circuit 510 generates a second analog voltage signal ANALOG V2 at the second analog voltage output 524 based on the second sensed voltage signal SENSED V2 at the second voltage sense terminal 522 in reference to the voltage reference signal at the voltage reference terminal 112. The voltage measurement conditioning circuit 510 generates a third analog voltage signal ANALOG V3 at the third analog voltage output 536 based on the third sensed voltage signal SENSED V3 at the third voltage sense terminal 534 in reference to the voltage reference signal at the voltage reference terminal 112.

The current measurement conditioning circuit 546 receives a first sensed current signal SENSED I at the first positive current sense terminal 550 from a first current sensor 556 associated with the string of PV sub-modules 116. The current measurement conditioning circuit 546 receives a first current reference signal at the first negative current sense terminal 552 from the first current sensor 556. The current measurement conditioning circuit 546 receives a second sensed current signal SENSED I2 at the second positive current sense terminal 564 from a second current sensor 570 associated with the string of PV sub-modules 116. The current measurement conditioning circuit 546 receives a second current reference signal at the second negative current sense terminal 566 from the second current sensor 570. The current measurement conditioning circuit 546 generates a first analog current signal ANALOG 1 at the first analog current output 554 based on the first sensed current signal SENSED 1 at the first positive current sense terminal 550 in reference to the first current reference signal at the first negative current sense terminal 552. The current measurement conditioning circuit 546 generates a second analog current signal ANALOG 12 at the second analog current output 568 based on the second sensed current signal SENSED 12 at the second positive current sense terminal 564 in reference to the second current reference signal at the second negative current sense terminal 566.

The temperature measurement conditioning circuit 580 receives a sensed temperature signal SENSED T at the positive temperature sense terminal 584 from a temperature sensor 590 associated with the string of PV sub-modules 116. The temperature measurement conditioning circuit 580 receives a temperature reference signal at the negative temperature sense terminal 586 from the temperature sensor 590. The temperature measurement conditioning circuit 580 generates an analog temperature signal ANALOG T at the analog temperature output 588 based on the sensed temperature signal SENSED T at the positive temperature sense terminal 584 in reference to the temperature reference signal at the negative temperature sense terminal 586.

The microcontroller circuit 106 generates a measurement select signal MEAS SELECT at the measurement select output 728 to enable selection of a select analog signal from multiple analog signals at multiple analog inputs to the multiplexer circuit 710 for routing the select analog signal to the analog measurement output 730. The multiplexer circuit 710 routes the analog voltage input 714, the second analog voltage input 716, the third analog voltage input 718, the first analog current input 720, the second analog current input 722, or the analog temperature input 724 to the analog measurement output 730 in response to the measurement select signal MEAS SELECT at the measurement select input 726 to provide an analog measurement signal ANALOG MEAS to the analog measurement output 730. The analog-to-digital converter circuit 712 generates the digital measurement data DIG MEAS DATA at the digital measurement data output 114 based on the analog measurement signal ANALOG MEAS at the analog measurement input 732.

In another example, the string of PV sub-modules 116 includes first, second, and third PV sub-modules 1702, 1704, 1706 (FIG. 17). The first PV sub-module 1702 includes a positive DC power terminal 1714, the second PV sub-module 1704 includes a positive DC power terminal 1722, and the third PV sub-module 1706 includes a positive DC power terminal 1728 and a negative DC power terminal 1730. The voltage measurement conditioning circuit 510 receives the sensed voltage signal SENSED V from the positive DC power terminal 1714 of the first PV sub-module 1702 via the voltage sense terminal 110. The voltage measurement conditioning circuit 510 receives the second sensed voltage signal SENSED V2 from the positive DC power terminal 1722 of the second PV sub-module 1704 via the second voltage sense terminal 522. The voltage measurement conditioning circuit 510 receives the third sensed voltage signal SENSED V3 from the positive DC power terminal 1728 of the third PV sub-module via the third voltage sense terminal 534. The voltage measurement conditioning circuit 510 receives the voltage reference signal from the negative DC power terminal 1730 of the third PV sub-module 1706 via the voltage reference terminal 112.

In another example, the microcontroller circuit 106 generates power measurement data associated with the string of PV sub-modules 116 based on the digital measurement data DIG MEAS DATA associated with the sensed voltage signal SENSED V and the digital measurement data DIG MEAS DATA associated with the first sensed current signal SENSED I or the second sensed current signal SENSED 12.

The measurement data stream MEAS DATA STREAM is also based on the power measurement data such that the power measurement data is represented within the measurement data stream MEAS DATA STREAM and the output communication signal COMM SIG OUT.

In another example, the string of PV sub-modules 116 includes a positive DC power terminal 1714 (FIG. 17) coupled with a positive DC power line 1718 of a DC bus 1720 and a negative DC power terminal 1730 coupled with a negative DC power line 1732 of the DC bus 1720. In one implementation, the first current sensor 556 includes positive and negative terminals. The first positive current sense terminal 550 of the current measurement conditioning circuit 546 is coupled with the positive terminal and the first negative current sense terminal 552 of the current measurement conditioning circuit 546 is coupled with the negative terminal. The first current sensor 556 senses current passing through the positive DC power line 1718 between the DC bus 1720 and the positive DC power terminal 1714 of the string of PV sub-modules 116. The first current sensor 556 generates the first sensed current signal SENSED 1 based on the sensed current. In another implementation, the second current sensor 570 includes positive and negative terminals. The second positive current sense terminal 564 of the current measurement conditioning circuit 546 is coupled with the positive terminal and the second negative current sense terminal 566 of the current measurement conditioning circuit 546 is coupled with the negative terminal. The second current sensor 570 senses current passing through the negative DC power line 1732 between the negative DC power terminal 1730 of the string of PV sub-modules 116 and the DC bus 1720. The second current sensor 570 generates the second sensed current signal SENSED 12 based on the sensed current.

In another example, the temperature sensor 590 includes positive and negative terminals. The positive temperature sense terminal 584 of the temperature measurement conditioning circuit 580 is coupled with the positive terminal and the negative temperature sense terminal 586 of the temperature measurement conditioning circuit 580 is coupled with the negative terminal. The temperature sensor 590 senses a temperature associated with the PV module 100 and generates the sensed temperature signal SENSED T based on the sensed temperature.

Figure 8:
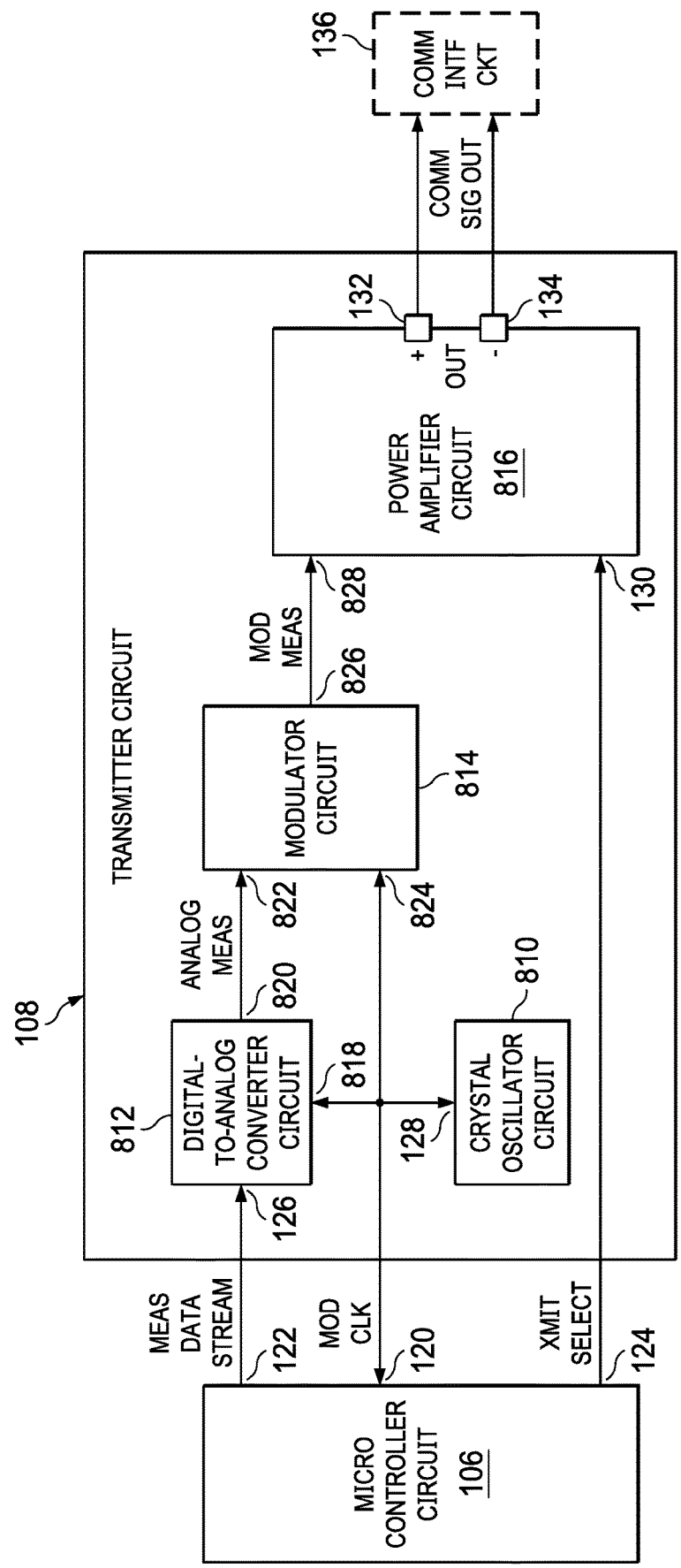
FIG. 8 is a schematic diagram of an example of a transmitter circuit.

FIG. 8 shows an example of the transmitter circuit 108. The transmitter circuit 108 includes a crystal oscillator circuit 810, a digital-to-analog converter circuit 812, a modulator circuit 814, and a power amplifier circuit 816. The crystal oscillator circuit 810 includes the modulation clock output 128 of the transmitter circuit 108 coupled with the modulation clock input 120 of the microcontroller circuit 106. The digital-to-analog converter circuit 812 includes the measurement data stream input 126 of the transmitter circuit 108 coupled with the measurement data stream output 122, a second modulation clock input 818 coupled with the modulation clock output 128, and an analog measurement output 820. The modulator circuit 814 includes an analog measurement input 822 coupled with the analog measurement output 820, a modulation clock input 824 coupled with the modulation clock output 128, and a modulated measurement output 826. The power amplifier circuit 816 includes a third modulated measurement input 828 coupled with the modulated measurement output 826, the transmit select input 130 of the transmitter circuit 108 coupled with the transmit select output 124, and the positive and negative output communication terminals 132, 134 of the transmitter circuit 108. The crystal oscillator circuit 810 generates the modulation clock signal MOD CLK at the modulation clock output 128. The digital-to-analog converter circuit 812 generates an analog measurement signal ANALOG MEAS at the analog measurement output 820 based on the measurement data stream MEAS DATA STREAM at the measurement data stream input 126 in response to the modulation clock signal MOD CLK at the second modulation clock input 818. The modulator circuit 814 generates a modulated measurement signal MOD MEAS at the modulated measurement output 826 based on the analog measurement signal ANALOG MEAS at the analog measurement input 822 in response to the modulation clock signal MOD CLK at the modulation clock input 824. The power amplifier circuit 816 generates the output communication signal COMM SIG OUT based on the modulated measurement signal MOD MEAS at the third modulated measurement input 828. The power amplifier circuit 816 transmits the output communication signal COMM SIG OUT to the communication interface circuit 136 via the positive and negative output communication terminals 132, 134 in response to the transmit select signal XMIT SELECT at the transmit select input 130.

In another example, the communication interface circuit 136 includes a positive DC power terminal 1802 (e.g., FIG. 18) coupled with a positive DC power line 1718 (FIG. 17) of a DC bus 1720 and a negative DC power terminal 1804. The string of PV sub-modules 116 includes a positive DC power line 1718 coupled with the negative DC power terminal 1804 of the communication interface circuit 136 and a negative DC power terminal 1730 coupled with a negative DC power line 1732 of the DC bus 1720. The measurement data stream MEAS DATA STREAM, analog measurement signal ANALOG MEAS, and modulated measurement signal MOD MEAS are formed such that the output communication signal COMM SIG OUT is a power line communication signal. The communication interface circuit 136 is transmits the PLC signal to a remote receiver circuit 1806 via the positive and negative DC power lines 1718, 1732 of the DC bus 1720 by applying the output communication signal COMM SIG OUT received from the power amplifier circuit 816 to the positive and negative DC power terminals 1802, 1804 of the communication interface circuit 136. In one implementation, the PLC signal is a spread frequency shift keying waveform. In one example, the S-FSK waveform is compliant with PLC protocol requirements of SunSpec Interoperability Specification, Communication Signal for Rapid Shutdown, Version 34. The microcontroller circuit 106 and the power amplifier circuit 816 transmit the output communication signal COMM SIG OUT during a zero energy period of a repetitive data frame specified in the PLC protocol requirements of the SunSpec Interoperability Specification.

Figure 19:
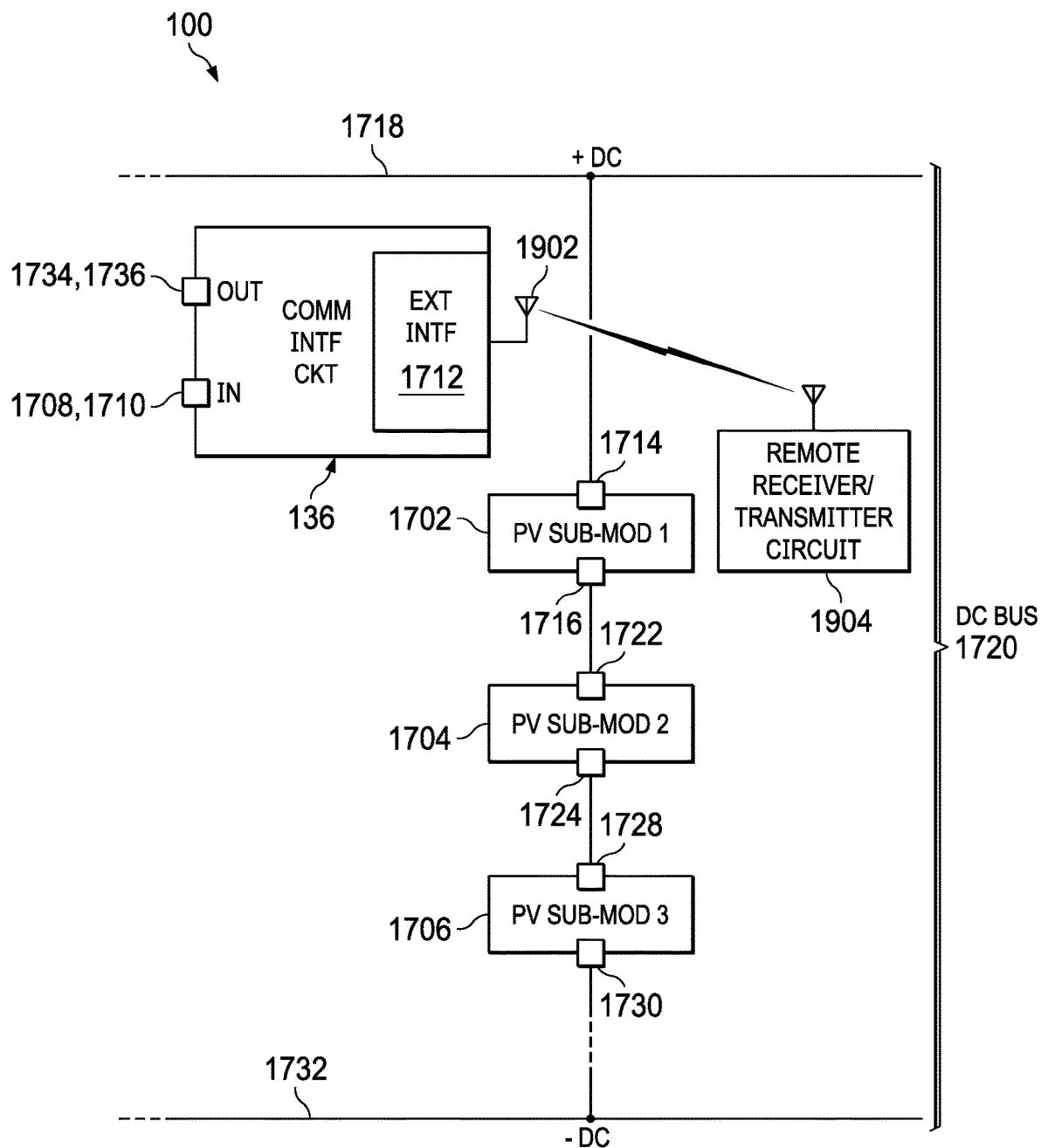
FIG. 19 is a schematic diagram of another example of a PV module.

In another example, the communication interface circuit 136 includes an antenna 1902 (e.g., FIG. 19). The communication interface circuit 136 generates a wireless communication signal based on the output communication signal COMM SIG OUT received from the power amplifier circuit 816. The communication interface circuit 136 transmits the wireless communication signal to a remote receiver circuit 1904 via the antenna 1902. In another example, the communication interface circuit 136 generates a wired control line communication signal based on the output communication signal COMM SIG OUT received from the power amplifier circuit 816. The communication interface circuit 136 transmits the wired control line communication signal to a remote receiver/transmitter circuit 2006 (e.g., FIG. 20) via wired transmission lines coupling the communication interface circuit 136 to the remote receiver/transmitter circuit 2006.

In another example, the digital-to-analog converter circuit 812 uses the modulation clock signal MOD CLK to sample the measurement data stream MEAS DATA STREAM at the measurement data stream input 126 to form the analog measurement signal ANALOG MEAS at the analog measurement output 820. In another example, the modulator circuit 814 uses the modulation clock signal MOD CLK to sample the analog measurement signal ANALOG MEAS at the analog measurement input 822 to form the modulated measurement signal MOD MEAS at the modulated measurement output 826.

Figure 9:
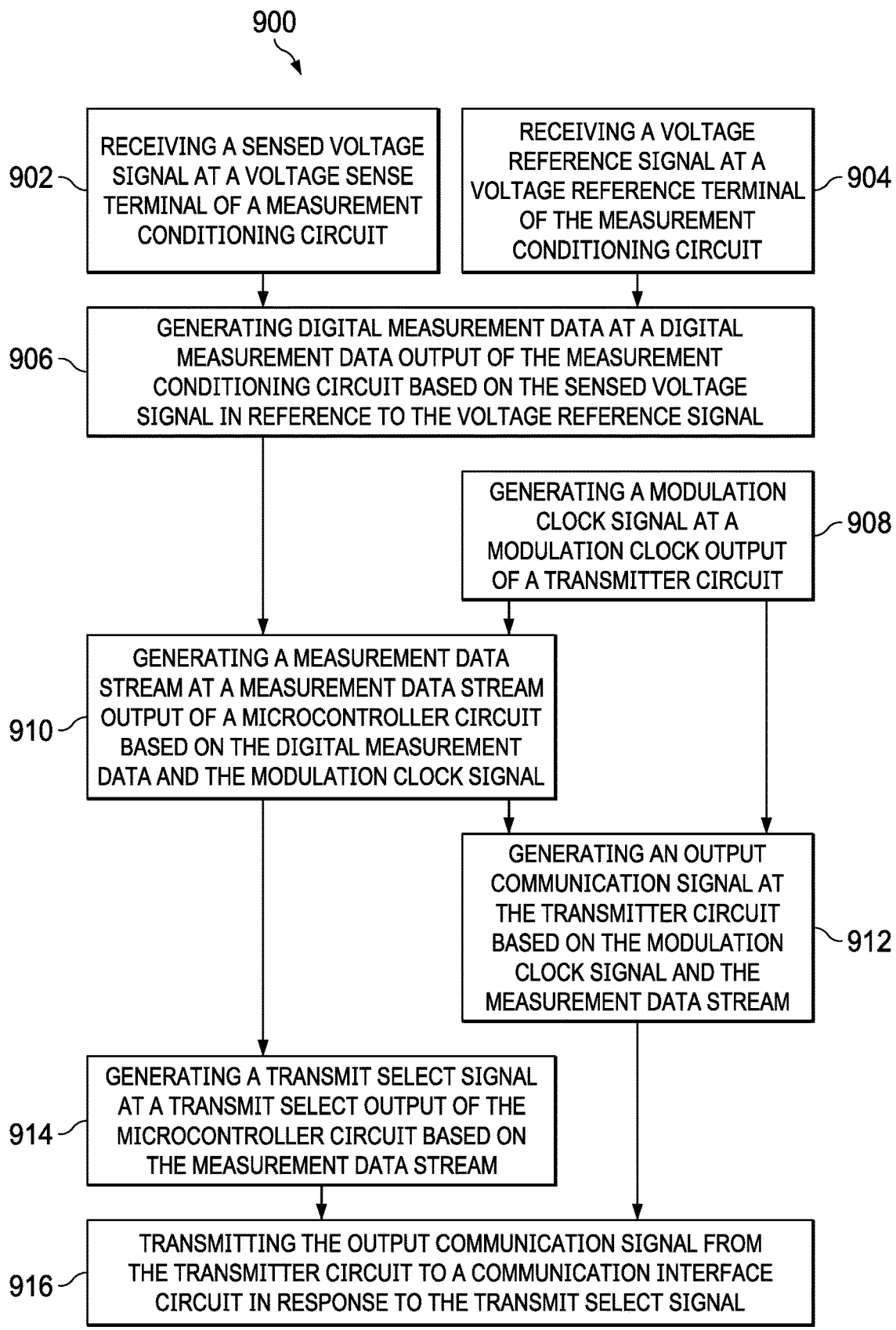
FIG. 9 is a flow chart for an example of a method for monitoring a PV module.

FIG. 9 shows an example of a method 900 for monitoring a PV module 100 (e.g., FIG. 1). In several examples, the monitoring circuit 102 described in FIGS. 1-8 implements the method 900. In FIG. 9, the method 900 begins at 902 with receiving a sensed voltage signal SENSED V at a voltage sense terminal 110 of a measurement conditioning circuit 104 from a string of PV sub-modules 116 associated with the PV module 100. At 904, a voltage reference signal is received at a voltage reference terminal 112 of the measurement conditioning circuit 104 from the string of PV sub-modules 116. At 906, the method 900 also includes generating digital measurement data DIG MEAS DATA at a digital measurement data output 114 of the measurement conditioning circuit 104 based on the sensed voltage signal SENSED V in reference to the voltage reference signal such that the sensed voltage signal SENSED V is represented within the digital measurement data DIG MEAS DATA. At 908, a modulation clock signal MOD CLK is generated at a modulation clock output 128 of a transmitter circuit 108. At 910, the method 900 also includes generating a measurement data stream MEAS DATA STREAM at a measurement data stream output 122 of a microcontroller circuit 106 based on the digital measurement data DIG MEAS DATA at a digital measurement data input 118 and the modulation clock signal MOD CLK at a modulation clock input 120 such that the sensed voltage signal SENSED V is represented within the measurement data stream MEAS DATA STREAM. At 912, an output communication signal COMM SIG OUT is generated at the transmitter circuit 108 based on the modulation clock signal MOD CLK and the measurement data stream MEAS DATA STREAM at a measurement data stream input 126 such that the sensed voltage signal SENSED V is represented within the output communication signal COMM SIG OUT. At 914, the method 900 also includes generating a transmit select signal XMIT SELECT at a transmit select output 124 of the microcontroller circuit 106 based on the measurement data stream MEAS DATA STREAM. At 916, the output communication signal COMM SIG OUT is transmitted from the transmitter circuit 108 to a communication interface circuit 136 via positive and negative output communication terminals 132, 134 in response to the transmit select signal XMIT SELECT at a transmit select input 130 of the transmitter circuit 108. In one implementation, the string of PV sub-modules 116 includes first and second PV sub-modules 1702, 1704/1706 (FIG. 17).

In another example, the first PV sub-module 1702 (FIG. 17) includes a positive DC power terminal 1714 and the second PV sub-module 1704/1706 includes a negative DC power terminal 1724/1730. In this example, the method 900 also includes receiving the sensed voltage signal SENSED V from the positive DC power terminal 1714 of the first PV sub-module 1702 via the voltage sense terminal 110. The method 900 also includes receiving the voltage reference signal from the negative DC power terminal 1724/1730 of the second PV sub-module 1704/1706 via the voltage reference terminal 112.

In another example, the measurement data stream MEAS DATA STREAM includes a first representation of the digital measurement data DIG MEAS DATA in data burst form for a first frequency of a spread frequency shift keying modulation scheme and a second representation of the digital measurement data DIG MEAS DATA in data burst form for a second frequency of the S-FSK modulation scheme. In another example, the output communication signal COMM SIG OUT carries modulated data representative of the first and second representations of the digital measurement data DIG MEAS DATA using the first and second frequencies of the S-FSK modulation scheme. In one implementation, the output communication signal COMM SIG OUT is compliant with PLC protocol requirements of SunSpec Interoperability Specification, Communication Signal for Rapid Shutdown, Version 34. In this implementation, the method 900 also includes transmitting the output communication signal COMM SIG OUT carrying modulated data representative of the digital measurement data DIG MEAS DATA from the transmitter circuit 108 (e.g., FIG. 1) via the positive and negative output communication terminals 132, 134 during a zero energy period of a repetitive data frame specified in the PLC protocol requirements of the SunSpec Interoperability Specification.

In another example, the method 900 also includes using the modulation clock signal MOD CLK at the microcontroller circuit 106 (e.g., FIG. 1) to sample the digital measurement data DIG MEAS DATA to form the measurement data stream MEAS DATA STREAM. In another example, the method 900 also includes using the modulation clock signal MOD CLK at the transmitter circuit 108 to sample the measurement data stream MEAS DATA STREAM to form the output communication signal COMM SIG OUT.

Figure 10:
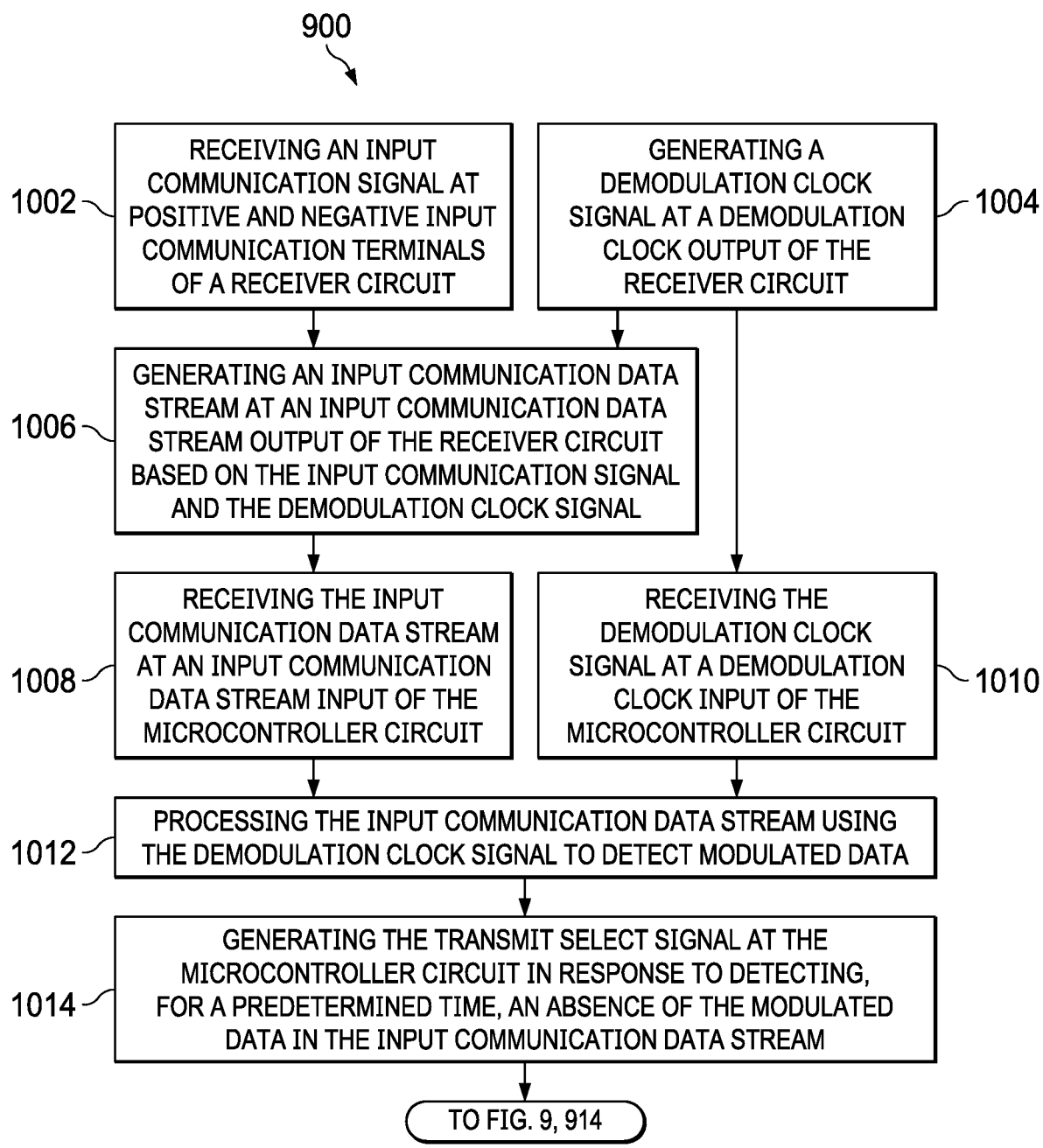
FIG. 10 is a flow chart for another example of a method for monitoring a PV module.

FIGS. 9 and 10 show another example of the method 900 which also includes 1002 where an input communication signal COMM SIG IN is received at positive and negative input communication terminals 144, 146 (FIG. 1) of a receiver circuit 142 from the communication interface circuit 136. At 1004, a demodulation clock signal DEMOD CLK is generated at a demodulation clock output 150 of the receiver circuit 142. At 1006, the method 900 also includes generating an input communication data stream INPUT COMM DATA STREAM at an input communication data stream output 148 of the receiver circuit 142 based on the input communication signal COMM SIG IN at the positive and negative input communication terminals 144, 146 and the demodulation clock signal DEMOD CLK. At 1008, the input communication data stream INPUT COMM DATA STREAM is received from the receiver circuit 142 at an input communication data stream input 138 of the microcontroller circuit 106. At 1010, the method 900 also includes receiving the demodulation clock signal DEMOD CLK from the receiver circuit 142 at a demodulation clock input 140 of the microcontroller circuit 106. At 1012, the input communication data stream INPUT COMM DATA STREAM is processed at the microcontroller circuit 106 using the demodulation clock signal DEMOD CLK to detect modulated data carried by the input communication signal COMM SIG IN and represented within the input communication data stream INPUT COMM DATA STREAM. At 1014, the method 900 also includes generating the transmit select signal XMIT SELECT at the microcontroller circuit 106 in response to detecting, for a predetermined time, an absence of the modulated data in the input communication data stream INPUT COMM DATA STREAM representing the input communication signal COMM SIG IN.

In another example, the input communication signal COMM SIG IN is based on a power line communication signal associated with the PV module 100 (e.g., FIG. 1). In one implementation, the method 900 also includes receiving the PLC signal at the communication interface circuit 136 from a remote transmitter circuit 1806 (FIG. 18) via a DC bus 1720 associated with the PV module 100. The input communication signal COMM SIG IN is based on data carried by the PLC signal transmitted via the DC bus 1720.

In another example, the input communication signal COMM SIG IN is based on a wireless communication signal associated with the PV module 100 (FIG. 1). In one implementation, the method 900 also includes receiving the wireless communication signal at the communication interface circuit 136 from a remote transmitter circuit 1904 (FIG. 19). The input communication signal COMM SIG IN is based on data carried by the wireless communication signal.

In another example, the input communication signal COMM SIG IN is based on a wired control line communication signal associated with the PV module 100 (FIG. 1). In one implementation, the method 900 also includes receiving the wired control line communication signal at the communication interface circuit 136 from a remote receiver/transmitter circuit 2006 (e.g., FIG. 20) via a wired control line. The input communication signal COMM SIG IN is based on data carried by the wired control line communication signal.

In another example, the method 900 also includes using the demodulation clock signal DEMOD CLK at the receiver circuit 142 (FIG. 1) to sample the input communication signal COMM SIG IN to form the input communication data stream INPUT COMM DATA STREAM. In another example, the method 900 also includes using the demodulation clock signal DEMOD CLK at the microcontroller circuit 106 to demodulate data carried by the input communication data stream INPUT COMM DATA STREAM.

Figure 11:
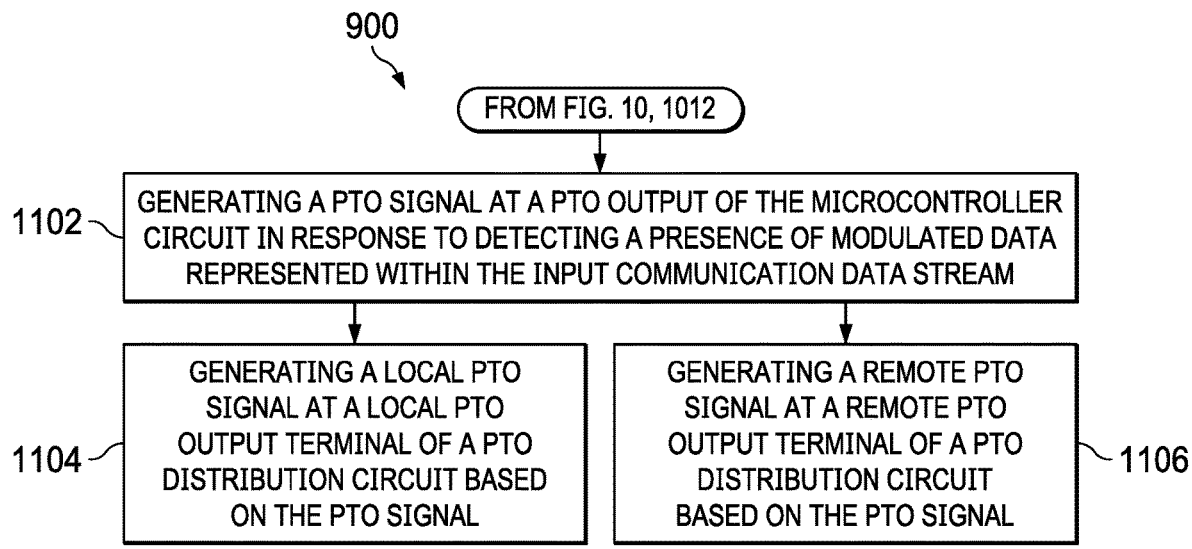
FIG. 11 is a flow chart for another example of a method for monitoring a PV module.
Figure 12:
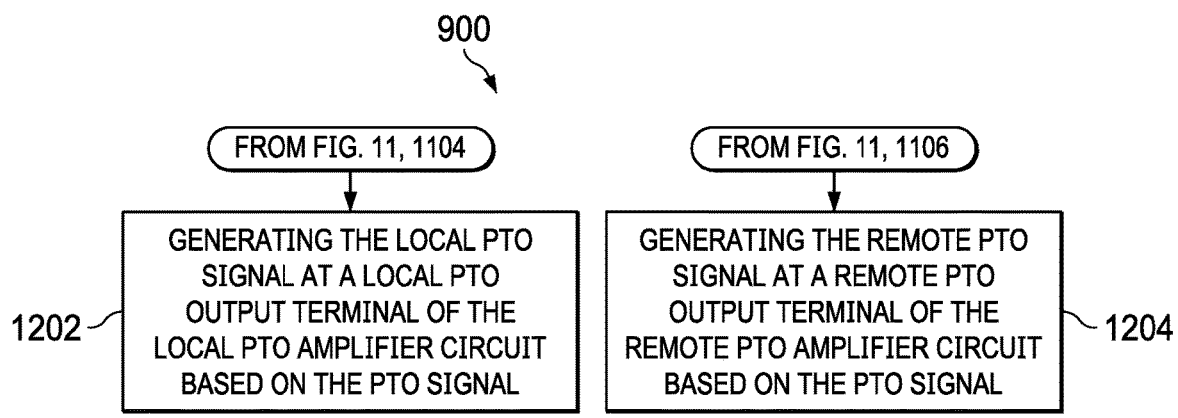
FIG. 12 is a flow chart for another example of a method for monitoring a PV module.

FIGS. 9-11 show another example of the method 900 which also includes 1102 where a PTO signal PTO is generated at a PTO output 152 (FIG. 1) of the microcontroller circuit 106 in response to detecting a presence of modulated data carried by the input communication signal COMM SIG IN and represented within the input communication data stream INPUT COMM DATA STREAM that is representative of a keep alive command associated with the PV module 100. At 1104, a local PTO signal LOCAL PTO is generated at a local PTO output terminal 158 of a PTO distribution circuit 154 based on the PTO signal PTO at a PTO input 156. At 1106, the method 900 also includes generating a remote PTO signal REMOTE PTO at a remote PTO output terminal 160 of a PTO distribution circuit 154 based on the PTO signal PTO. In one implementation, the string of PV modules includes a PV sub-module 1702 (e.g., FIG. 17). In this implementation, the method 900 also includes providing the local PTO signal LOCAL PTO from the PTO distribution circuit 154 to a sub-module controller circuit 162 associated with the PV sub-module 1702. In another implementation, the method 900 also includes providing the remote PTO signal REMOTE PTO from the PTO distribution circuit 154 to a shutdown initiation device 164 associated with the PV module 100.

FIGS. 9-12 show an example of the method 900 in which the PTO distribution circuit 154 (FIG. 1) includes a local PTO amplifier circuit 310 (e.g., FIG. 3) and a remote PTO amplifier circuit 312. In this example, at 1202, the method 900 also includes generating the local PTO signal LOCAL PTO at a local PTO output terminal 158 of the local PTO amplifier circuit 310 based on the PTO signal PTO at a first PTO input 314. At 1204; the remote PTO signal REMOTE PTO is generated at a remote PTO output terminal 160 of the remote PTO amplifier circuit 312 based on the PTO signal PTO at a second PTO input 316. The PTO input 156 of the PTO distribution circuit 154 includes the first and second PTO inputs 314, 316, the local PTO output terminal 158 of the PTO distribution circuit 154 includes the local PTO output terminal 158 of the local PTO amplifier circuit 310, and the remote PTO output terminal 160 of the PTO distribution circuit 154 includes the remote PTO output terminal 160 of the remote PTO amplifier circuit 312.

Figure 13:
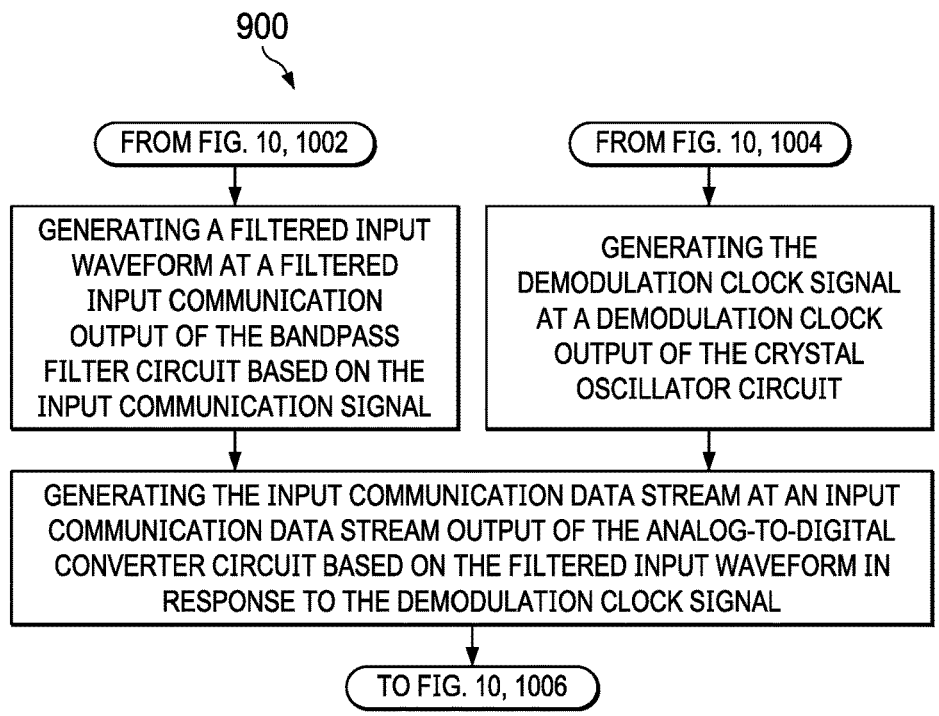
FIG. 13 is a flow chart for another example of a method for monitoring a PV module.

FIGS. 9, 10, and 13 show an example of the method 900 in which the receiver circuit 142 (FIG. 1) includes a bandpass filter circuit 410 (e.g., FIG. 4), a crystal oscillator circuit 412, and an analog-to-digital converter circuit 414. In this example, at 1302, the method 900 also includes generating a filtered input waveform FILTERED INPUT WAVEFORM at a filtered input communication output 416 of the bandpass filter circuit 410 based on the input communication signal COMM SIG IN at positive and negative input communication terminals 144, 146. At 1304, the demodulation clock signal DEMOD CLK is generated at a demodulation clock output 150 of the crystal oscillator circuit 412. At 1306, the method 900 also includes generating the input communication data stream INPUT COMM DATA STREAM at an input communication data stream output 148 of the analog-to-digital converter circuit 414 based on the filtered input waveform FILTERED INPUT WAVEFORM at a filtered input communication input 418 in response to the demodulation clock signal DEMOD CLK at a second demodulation clock input 420. The positive and negative input communication terminals 144, 146 of the receiver circuit 142 include the positive and negative input communication terminals 144, 146 of the bandpass filter circuit 410. The demodulation clock output 150 of the receiver circuit 142 includes the demodulation clock output 150 of the crystal oscillator circuit 412. The input communication data stream output 148 of the receiver circuit 142 includes the input communication data stream output 148 of the analog-to-digital converter circuit 414. In another example, the method 900 also includes using the demodulation clock signal DEMOD CLK at the analog-to-digital converter circuit 414 to sample the filtered input waveform FILTERED INPUT WAVEFORM to form the input communication data stream INPUT COMM DATA STREAM. In another example, the method 900 also includes receiving the input communication signal COMM SIG IN from the communication interface circuit 136 at the bandpass filter circuit 410.

Figure 14:
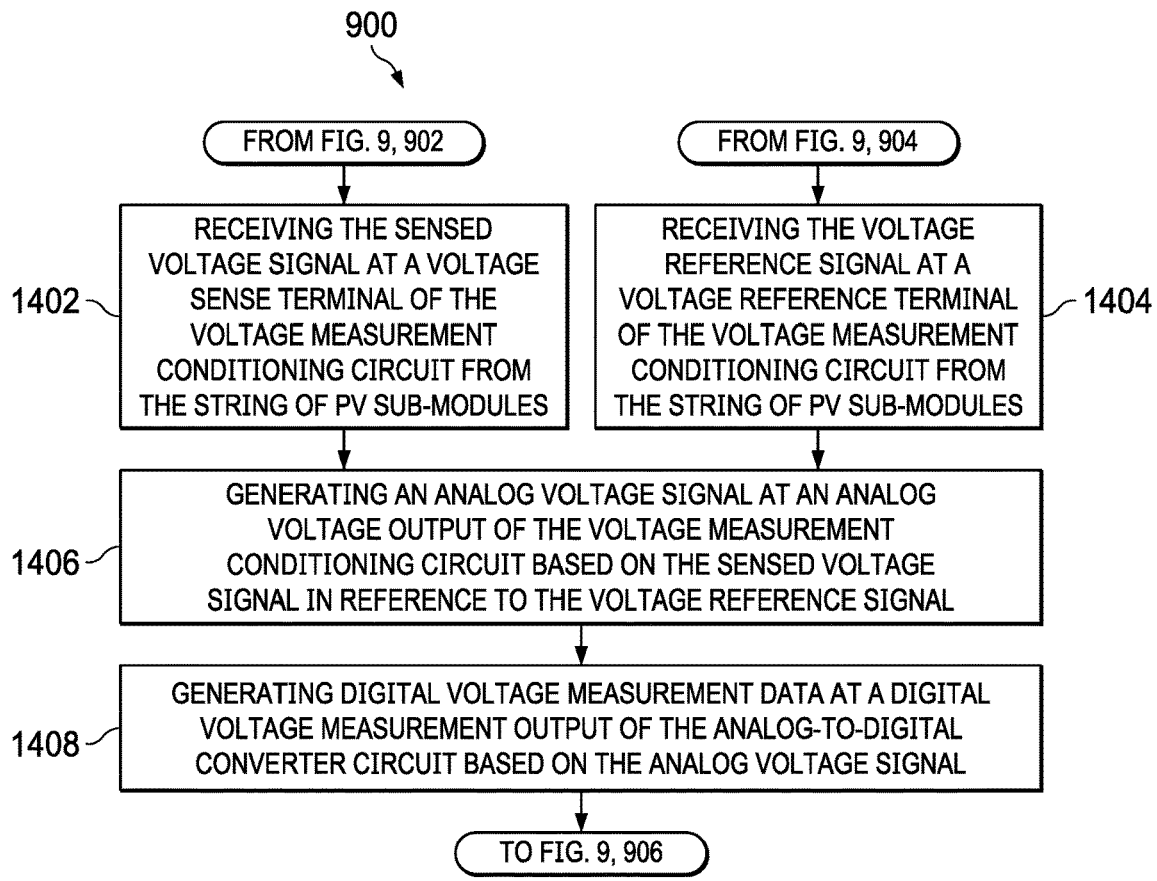
FIG. 14 is a flow chart for another example of a method for monitoring a PV module.

FIGS. 9 and 14 show an example of the method 900 in which the measurement conditioning circuit 104 (e.g., FIG. 1) includes a voltage measurement conditioning circuit 510 (e.g., FIG. 5) and an analog-to-digital converter circuit 512. In this example, at 1402, the method 900 also includes receiving the sensed voltage signal SENSED V at a voltage sense terminal 110 of the voltage measurement conditioning circuit 510 from the string of PV sub-modules 116. At 1404, the voltage reference signal is received at a voltage reference terminal 112 of the voltage measurement conditioning circuit 510 from the string of PV sub-modules 116. At 1406, the method 900 also includes generating an analog voltage signal ANALOG V at an analog voltage output 514 of the voltage measurement conditioning circuit 510 based on the sensed voltage signal SENSED V at the voltage sense terminal 110 in reference to the voltage reference signal at the voltage reference terminal 112. At 1408, digital voltage measurement data DIG V MEAS DATA is generated at a digital voltage measurement output 518 of the analog-to-digital converter circuit 512 based on the analog voltage signal ANALOG V at an analog voltage input 516 such that the sensed voltage signal SENSED V is represented within the digital voltage measurement data DIG V MEAS DATA. The digital measurement data output 114 of the measurement conditioning circuit 104 includes the digital voltage measurement output 518 and the digital measurement data DIG MEAS DATA generated by the measurement conditioning circuit 104 includes the digital voltage measurement data DIG V MEAS DATA. The digital measurement data input 118 of the microcontroller circuit 106 includes a digital voltage measurement input 520 coupled with the digital voltage measurement output 518.

In another example, the string of PV sub-modules 116 (e.g., FIG. 1) includes first and second PV sub-modules 1702, 1704/1706 (e.g., FIG. 17). In this example, the method 900 also includes receiving the sensed voltage signal SENSED V at the voltage sense terminal 110 of the voltage measurement conditioning circuit 510 from a positive DC power terminal 1714 of the first PV sub-module 1702. The method 900 also includes receiving the voltage reference signal at the voltage reference terminal 112 of the voltage measurement conditioning circuit 510 from a negative DC power terminal 1724/1730 of the second PV sub-module 1704/1706.

In another example, the measurement conditioning circuit 104 (e.g., FIG. 1) also includes a second analog-to-digital converter circuit 526 (e.g., FIG. 5). In this example, the method 900 also includes receiving a second sensed voltage signal SENSED V2 at a second voltage sense terminal 522 of the voltage measurement conditioning circuit 510 from the string of PV sub-modules 116. The method 900 also includes generating a second analog voltage signal ANALOG V2 at a second analog voltage output 524 of the voltage measurement conditioning circuit 510 based on the second sensed voltage signal SENSED V2 at the second voltage sense terminal 522 in reference to the voltage reference signal at the voltage reference terminal 112. The method 900 also includes generating second digital voltage measurement data DIG V2 MEAS DATA at a second digital voltage measurement output 530 of the second analog-to-digital converter circuit 526 based on the second analog voltage signal ANALOG V2 at a second analog voltage input 528 such that the second sensed voltage signal SENSED V2 is represented within the second digital voltage measurement data DIG V2 MEAS DATA. The digital measurement data output 114 of the measurement conditioning circuit 104 includes the second digital voltage measurement output 530 and the digital measurement data DIG MEAS DATA generated by the measurement conditioning circuit 104 includes the second digital voltage measurement data DIG V2 MEAS DATA. The digital measurement data input 118 of the microcontroller circuit 106 includes a second digital voltage measurement input 532 coupled with the second digital voltage measurement output 530.

In another example, the string of PV sub-modules 116 (e.g., FIG. 1) includes first and second PV sub-modules 1702, 1704/1706 (e.g., FIG. 17). In this example, the method 900 also includes receiving the sensed voltage signal SENSED V at the voltage sense terminal 110 of the voltage measurement conditioning circuit 510 (e.g., FIG. 5) from a positive DC power terminal 1714 of the first PV sub-module 1702. The method 900 also includes receiving the second sensed voltage signal SENSED V2 at the second voltage sense terminal 522 of the voltage measurement conditioning circuit 510 from a positive DC power terminal 1722/1728 of the second PV sub-module 1704/1706. The method 900 also includes receiving the voltage reference signal at the voltage reference terminal 112 of the voltage measurement conditioning circuit 510 from a negative DC power terminal 1724/1730 of the second PV sub-module 1704/1706.

In another example, the measurement conditioning circuit 104 (e.g., FIG. 1) also includes a third analog-to-digital converter circuit 538 (e.g., FIG. 5). In this example, the method 900 also includes receiving a third sensed voltage signal SENSED V3 at a third voltage sense terminal 534 of the voltage measurement conditioning circuit 510 from the string of PV sub-modules 116. The method 900 also includes generating a third analog voltage signal ANALOG V3 at a third analog voltage output 536 of the voltage measurement conditioning circuit 510 based on the third sensed voltage signal SENSED V3 at the third voltage sense terminal 534 in reference to the voltage reference signal at the voltage reference terminal 112. The method 900 also includes generating third digital voltage measurement data DIG V3 MEAS DATA at a third digital voltage measurement output 542 of the third analog-to-digital converter circuit 538 based on the third analog voltage signal ANALOG V3 at a third analog voltage input 540 such that the third sensed voltage signal SENSED V3 is represented within the third digital voltage measurement data DIG V3 MEAS DATA. The digital measurement data output 114 of the measurement conditioning circuit 104 includes the third digital voltage measurement output 542 and the digital measurement data DIG MEAS DATA generated by the measurement conditioning circuit 104 includes the third digital voltage measurement data DIG V3 MEAS DATA. The digital measurement data input 118 of the microcontroller circuit 106 includes a third digital voltage measurement input 544 coupled with the third digital voltage measurement output 542.

In another example, the string of PV sub-modules 116 (e.g., FIG. 1) includes first, second, and third PV sub-modules 1702, 1704, 1706 (e.g., FIG. 17). In this example, the method 900 also includes receiving the sensed voltage signal SENSED V at the voltage sense terminal 110 of the voltage measurement conditioning circuit 510 from a positive DC power terminal 1714 of the first PV sub-module 1702. The method 900 also includes receiving the second sensed voltage signal SENSED V2 at the second voltage sense terminal 522 of the voltage measurement conditioning circuit 510 from a positive DC power terminal 1722 of the second PV sub-module 1704. The method 900 also includes receiving the third sensed voltage signal SENSED V3 at the third voltage sense terminal 534 of the voltage measurement conditioning circuit 510 from a positive DC power terminal 1728 of the third PV sub-module 1706. The method 900 also includes receiving the voltage reference signal at the voltage reference terminal 112 of the voltage measurement conditioning circuit 510 from a negative DC power terminal 1730 of the third PV sub-module 1706.

In another example, the measurement conditioning circuit 104 (e.g., FIG. 1) also includes a current measurement conditioning circuit 546 (e.g., FIG. 5) and a second analog-to-digital converter circuit 548. In this example, the method 900 also includes receiving a sensed current signal SENSED I at a positive current sense terminal 550 of the current measurement conditioning circuit 546 from a current sensor 556 associated with the string of PV sub-modules 116. The method 900 also includes receiving a current reference signal at a negative current sense terminal 552 of the current measurement conditioning circuit 546 from the current sensor 556. The method 900 also includes generating an analog current signal ANALOG I at an analog current output 554 of the current measurement conditioning circuit 546 based on the sensed current signal SENSED I at the positive current sense terminal 550 in reference to the current reference signal at the negative current sense terminal 552. The method 900 also includes generating digital current measurement data DIG I MEAS DATA ata digital current measurement output 560 of the second analog-to-digital converter circuit 548 based on the analog current signal ANALOG I at an analog current input 558 such that the sensed current signal SENSED I is represented within the digital current measurement data DIG I MEAS DATA. The digital measurement data output 114 of the measurement conditioning circuit 104 includes the digital current measurement output 560 and the digital measurement data DIG MEAS DATA generated by the measurement conditioning circuit 104 includes the digital current measurement data DIG I MEAS DATA. The digital measurement data input 118 of the microcontroller circuit 106 includes a digital current measurement input 562 coupled with the digital current measurement output 560.

In another example, the string of PV sub-modules 116 (e.g., FIG. 1) includes a positive DC power terminal 1714 (e.g., FIG. 17) coupled with a positive DC power line 1718 of a DC bus 1720 and a negative DC power terminal 1730 coupled with a negative DC power line 1732 of the DC bus 1720. In this example, the method 900 also includes sensing current passing through the string of PV sub-modules 116 between the positive DC power line 1718 and the negative DC power line 1732 at the current sensor 556. The method 900 also includes generating the sensed current signal SENSED I at the current sensor 556 based on the sensed current. The current sensor 556 includes positive and negative terminals. The positive current sense terminal 550 of the current measurement conditioning circuit 546 is coupled with the positive terminal and the negative current sense terminal 552 of the current measurement conditioning circuit 546 is coupled with the negative terminal. In one implementation, the method 900 also includes sensing current passing through the positive DC power line 1718 between the DC bus 1720 and the positive DC power terminal 1714 of the string of PV sub-modules 116 at the current sensor 556. In another implementation, the method 900 also includes sensing current passing through the negative DC power line 1732 between the negative DC power terminal 1730 of the string of PV sub-modules 116 and the DC bus 1720 at the current sensor 556.

In another example, the method 900 also includes generating power measurement data associated with the string of PV sub-modules 116 (e.g., FIG. 1) at the microcontroller circuit 106 based on the digital voltage measurement data DIG V MEAS DATA associated with the sensed voltage signal SENSED V and the digital current measurement data DIG I MEAS DATA associated with the sensed current signal SENSED I. The measurement data stream MEAS DATA STREAM is also based on the power measurement data such that the power measurement data is represented within the measurement data stream MEAS DATA STREAM and the output communication signal COMM SIG OUT.

In another example, the measurement conditioning circuit 104 (e.g., FIG. 1) also includes a third analog-to-digital converter circuit 572 (e.g., FIG. 5). In this example, the method 900 also includes receiving a second sensed current signal SENSED I2 at a second positive current sense terminal 564 of the current measurement conditioning circuit 546 from a second current sensor 570 associated with the string of PV sub-modules 116. The method 900 also includes receiving a second current reference signal at a second negative current sense terminal 566 of the current measurement conditioning circuit 546 from the second current sensor 570. The method 900 also includes generating a second analog current signal ANALOG 12 at a second analog current output 568 of the current measurement conditioning circuit 546 based on the second sensed current signal SENSED 12 at the second positive current sense terminal 564 in reference to the second current reference signal at the second negative current sense terminal 566. The method 900 also includes generating second digital current measurement data DIG I2 MEAS DATA at a second digital current measurement output 576 of the third analog-to-digital converter circuit 572 based on the second analog current signal ANALOG 12 at a second analog current input 574 such that the second sensed current signal SENSED 12 is represented within the second digital current measurement data DIG 12 MEAS DATA. The digital measurement data output 114 of the measurement conditioning circuit 104 includes the second digital current measurement output 576 and the digital measurement data DIG MEAS DATA generated by the measurement conditioning circuit 104 includes the second digital current measurement data DIG 12 MEAS DATA. The digital measurement data input 118 of the microcontroller circuit 106 includes a second digital current measurement input 578 coupled with the second digital current measurement output 576.

In another example, the string of PV sub-modules 116 (e.g., FIG. 1) includes a positive DC power terminal 1714 (e.g., FIG. 17) coupled with a positive DC power line 1718 of a DC bus 1720 and a negative DC power terminal 1730 coupled with a negative DC power line 1732 of the DC bus 1720. In another example, the current sensor 556 (e.g., FIG. 5) includes positive and negative terminals. The positive current sense terminal 550 of the current measurement conditioning circuit 546 is coupled with the positive terminal and the negative current sense terminal 552 of the current measurement conditioning circuit 546 is coupled with the negative terminal. In this example, the method 900 also includes sensing current passing through the positive DC power line 1718 between the DC bus 1720 and the positive DC power terminal 1714 of the string of PV sub-modules 116 at the current sensor 556. The method 900 also includes generating the sensed current signal SENSED I at the current sensor 556 based on the sensed current. In another example, the second current sensor 570 includes second positive and negative terminals. The second positive current sense terminal 564 of the current measurement conditioning circuit 546 is coupled with the second positive terminal and the second negative current sense terminal 566 of the current measurement conditioning circuit 546 is coupled with the second negative terminal. In this example, the method 900 also includes sensing current passing through the negative DC power line 1732 between the negative DC power terminal 1730 of the string of PV sub-modules 116 and the DC bus 1720 at the second current sensor 570. The method 900 also includes generating the second sensed current signal SENSED 12 at the second current sensor 570 based on the sensed current.

In another example, the measurement conditioning circuit 104 (e.g., FIG. 1) also includes a temperature measurement conditioning circuit 580 (e.g., FIG. 5) and a second analog-to-digital converter circuit 582. In this example, the method 900 also includes receiving a sensed temperature signal SENSED T at a positive temperature sense terminal 584 of the temperature measurement conditioning circuit 580 from a temperature sensor 590 associated with the string of PV sub-modules 116. The method 900 also includes receiving a temperature reference signal at a negative temperature sense terminal 586 of the temperature measurement conditioning circuit 580 from the temperature sensor 590. The method 900 also includes generating an analog temperature signal ANALOG T at an analog temperature output 588 of the temperature measurement conditioning circuit 580 based on the sensed temperature signal SENSED T at the positive temperature sense terminal 584 in reference to the temperature reference signal at the negative temperature sense terminal 586. The method 900 also includes generating digital temperature measurement data DIG T MEAS DATA at a digital temperature measurement output 594 of the second analog-to-digital converter circuit 582 based on the analog temperature signal ANALOG T at an analog temperature input 592 such that the sensed temperature signal SENSED T is represented within the digital temperature measurement data DIG T MEAS DATA. The digital measurement data output 114 of the measurement conditioning circuit 104 includes the digital temperature measurement output 594 and the digital measurement data DIG MEAS DATA generated by the measurement conditioning circuit 104 includes the digital temperature measurement data DIG T MEAS DATA. The digital measurement data input 118 of the microcontroller circuit 106 includes a digital temperature measurement input 596 coupled with the digital temperature measurement output 594.

In another example, the method 900 also includes sensing a temperature associated with the PV module 100 (e.g., FIG. 1) at the temperature sensor 590 (e.g., FIG. 5). The method 900 also includes generating the sensed temperature signal SENSED T at the temperature sensor 590 based on the sensed temperature. The temperature sensor 590 includes positive and negative terminals. The positive temperature sense terminal 584 of the temperature measurement conditioning circuit 580 is coupled with the positive terminal and the negative temperature sense terminal 586 of the temperature measurement conditioning circuit 580 is coupled with the negative terminal.

Figure 15A:
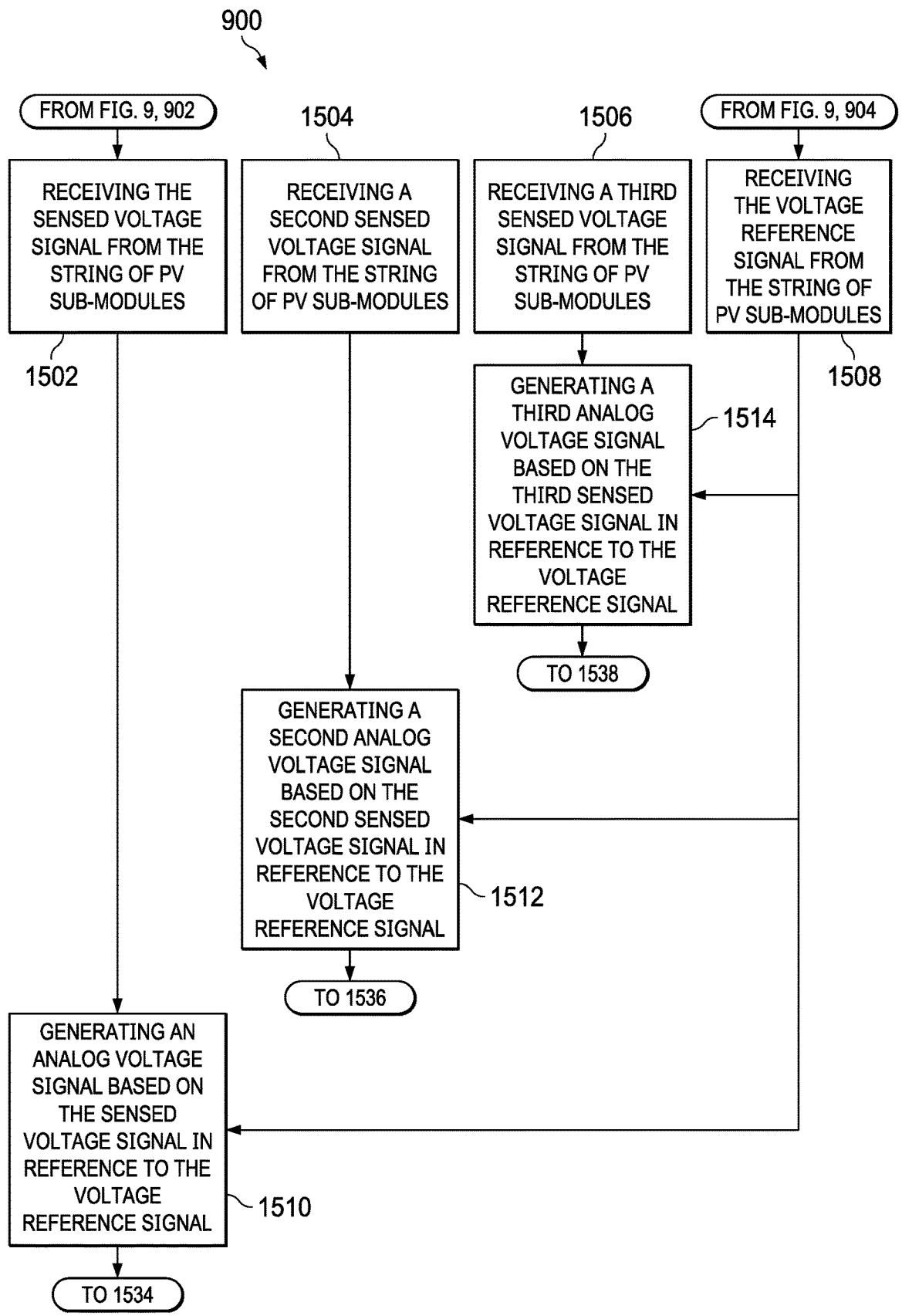
FIG. 15A-15C is a flow chart for another example of a method for monitoring a PV module.
Figure 15B:
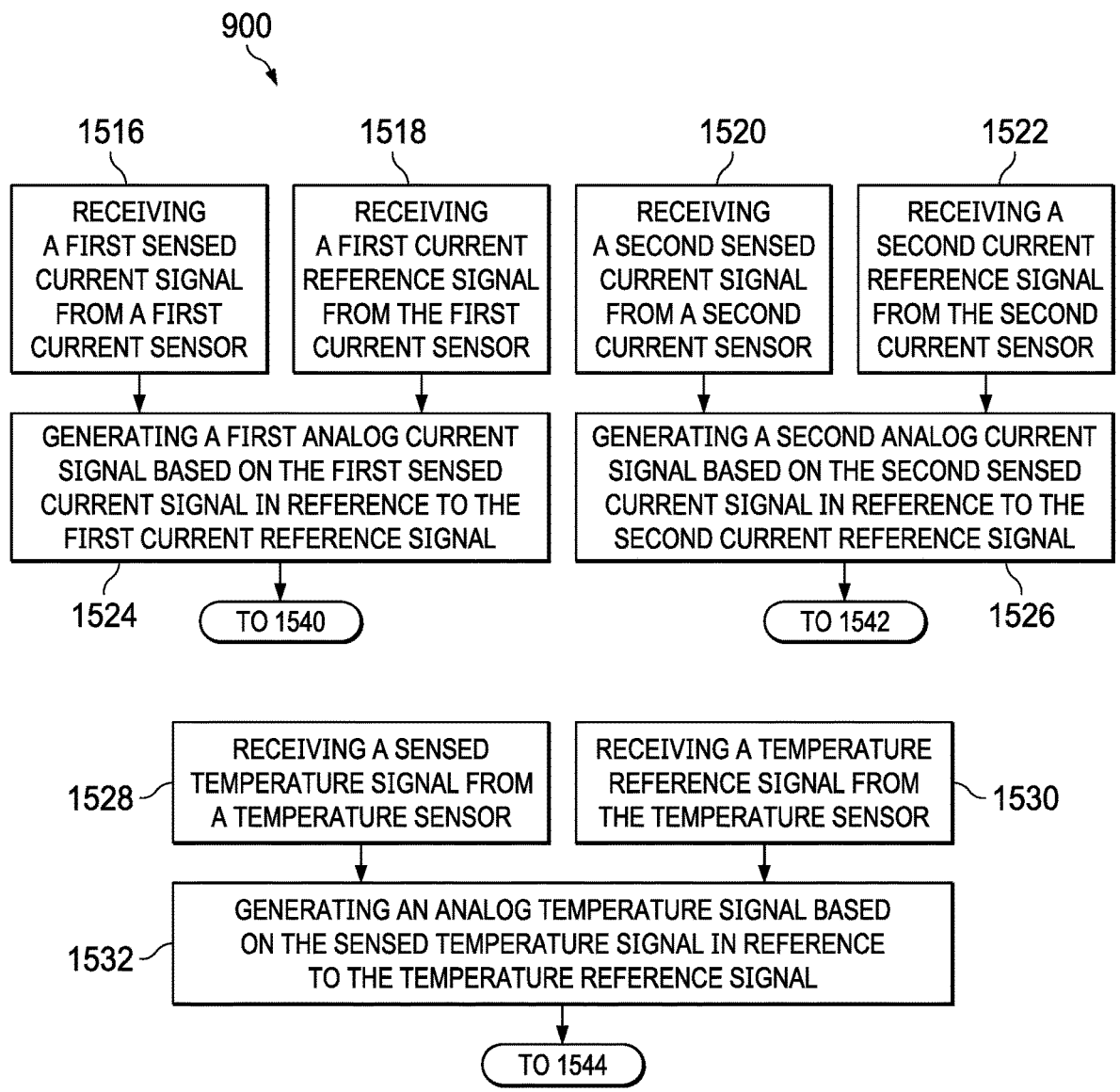
Figure 15C:
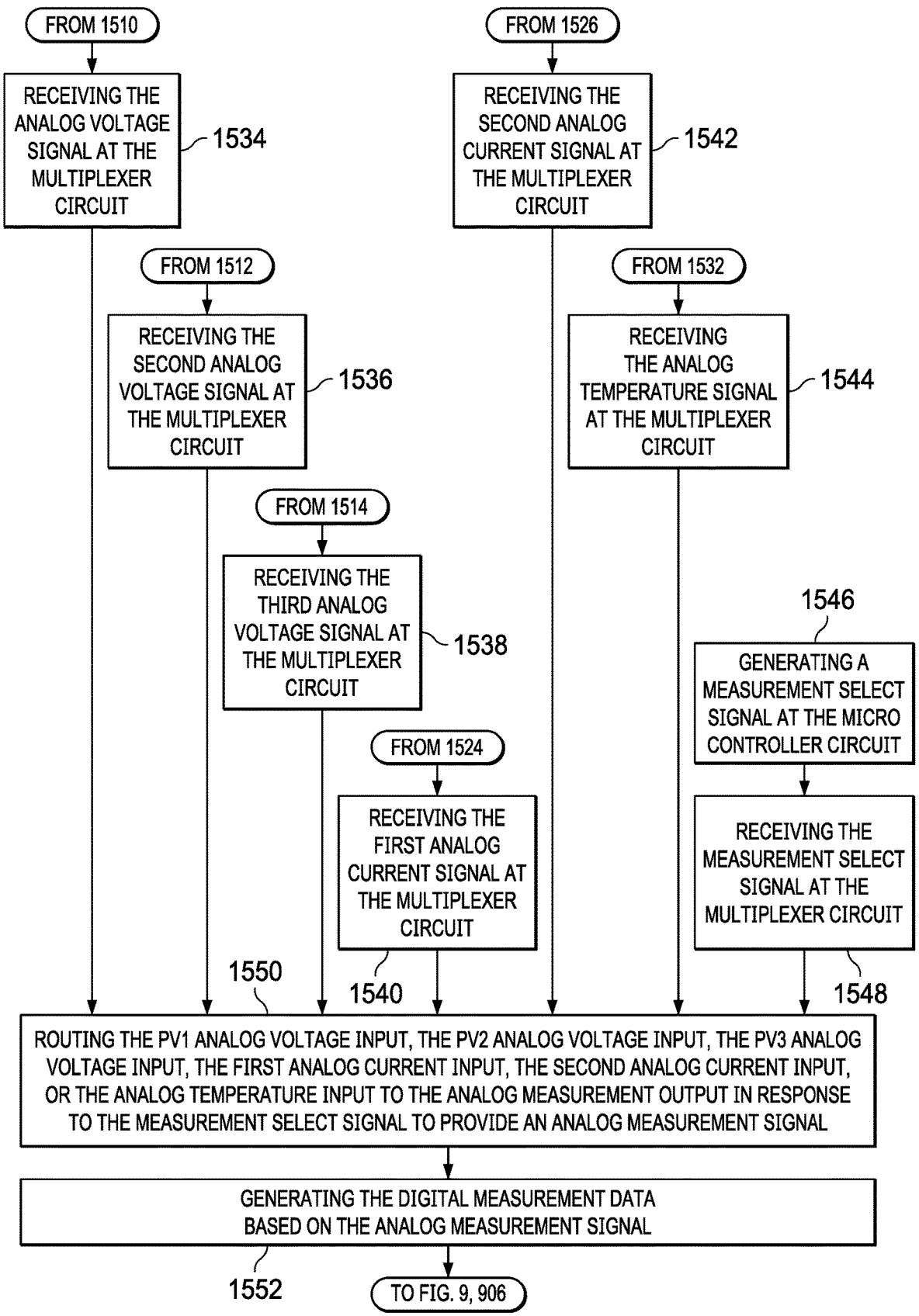

FIGS. 9 and 15 show another example of the method 900 in which measurement conditioning circuit 104 (e.g., FIG. 1) includes a voltage measurement conditioning circuit 510 (e.g., FIG. 5), a current measurement conditioning circuit 546, a temperature measurement conditioning circuit 580, a multiplexer circuit 710 (e.g., FIG. 7), and an analog-to-digital converter circuit 712. In this example, at 1502, the method 900 also includes receiving the sensed voltage signal SENSED V at a voltage sense terminal 110 of the voltage measurement conditioning circuit 510 from the string of PV sub-modules 116. At 1504; a second sensed voltage signal SENSED V2 is received at a second voltage sense terminal 522 of the voltage measurement conditioning circuit 510 from the string of PV sub-modules 116. At 1506, the method 900 also includes receiving a third sensed voltage signal SENSED V3 at a third voltage sense terminal 534 of the voltage measurement conditioning circuit 510 from the string of PV sub-modules 116. At 1508, the voltage reference signal is received at a voltage reference terminal 112 of the voltage measurement conditioning circuit 510 from the string of PV sub-modules 116. At 1510, the method 900 also includes generating an analog voltage signal ANALOG V at an analog voltage output 514 of the voltage measurement conditioning circuit 510 based on the sensed voltage signal SENSED V at the voltage sense terminal 110 in reference to the voltage reference signal at the voltage reference terminal 112. At 1512, a second analog voltage signal ANALOG V2 is generated at a second analog voltage output 524 of the voltage measurement conditioning circuit 510 based on the second sensed voltage signal SENSED V2 at the second voltage sense terminal 522 in reference to the voltage reference signal at the voltage reference terminal 112. At 1514, the method 900 also includes generating a third analog voltage signal ANALOG V3 at a third analog voltage output 536 of the voltage measurement conditioning circuit 510 based on the third sensed voltage signal SENSED V3 at the third voltage sense terminal 534 in reference to the voltage reference signal at the voltage reference terminal 112.

At 1516, a first sensed current signal SENSED I is received at a first positive current sense terminal 550 (e.g., FIG. 5) of the current measurement conditioning circuit 546 from a first current sensor 556 associated with the string of PV sub-modules 116 (e.g., FIG. 1). At 1518, the method 900 also includes receiving a first current reference signal at a first negative current sense terminal 552 of the current measurement conditioning circuit 546 from the first current sensor 556. At 1520, a second sensed current signal SENSED I2 is received at a second positive current sense terminal 564 of the current measurement conditioning circuit 546 from a second current sensor 570 associated with the string of PV sub-modules 116. At 1522, the method 900 also includes receiving a second current reference signal at a second negative current sense terminal 566 of the current measurement conditioning circuit 546 from the second current sensor 570. At 1524, a first analog current signal ANALOG I is generated at a first analog current output 554 of the current measurement conditioning circuit 546 based on the first sensed current signal SENSED I at the first positive current sense terminal 550 in reference to the first current reference signal at the first negative current sense terminal 552. At 1526, the method 900 also includes generating a second analog current signal ANALOG I2 at a second analog current output 568 of the current measurement conditioning circuit 546 based on the second sensed current signal SENSED I2 at the second positive current sense terminal 564 in reference to the second current reference signal at the second negative current sense terminal 566. At 1528, a sensed temperature signal SENSED T is received at a positive temperature sense terminal 584 of the temperature measurement conditioning circuit 580 from a temperature sensor 590 associated with the string of PV sub-modules 116. At 1530, the method 900 also includes receiving a temperature reference signal at a negative temperature sense terminal 586 of the temperature measurement conditioning circuit 580 from the temperature sensor 590. At 1532, an analog temperature signal ANALOG T is generated at an analog temperature output 588 of the temperature measurement conditioning circuit 580 based on the sensed temperature signal SENSED T at the positive temperature sense terminal 584 in reference to the temperature reference signal at the negative temperature sense terminal 586.

At 1534, the method 900 also includes receiving the analog voltage signal ANALOG V at an analog voltage input 714 (e.g., FIG. 7) of the multiplexer circuit 710. At 1536, the second analog voltage signal ANALOG V2 is received at a second analog voltage input 716 of the multiplexer circuit 710. At 1538, the method 900 also includes receiving the third analog voltage signal ANALOG V3 at a third analog voltage input 718 of the multiplexer circuit 710. At 1540, the first analog current signal ANALOG I is received at a first analog current input 720 of the multiplexer circuit 710. At 1542, the method 900 also includes receiving the second analog current signal ANALOG I2 at a second analog current input 722 of the multiplexer circuit 710. At 1544, the analog temperature signal ANALOG T is received at an analog temperature input 724 of the multiplexer circuit 710. At 1546, the method 900 also includes generating a measurement select signal MEAS SELECT at a measurement select output 728 of the microcontroller circuit 106 (e.g., FIG. 1) to enable selection of a select analog signal from multiple analog signals received at multiple analog inputs to the multiplexer circuit 710 for routing the select analog signal to an analog measurement output 730. At 1548, the measurement select signal MEAS SELECT is received at a measurement select input 726 of the multiplexer circuit 710. At 1550, the method 900 also includes routing the analog voltage input 714, the second analog voltage input 716, the third analog voltage input 718, the first analog current input 720, the second analog current input 722, or the analog temperature input 724 to the analog measurement output 730 in response to the measurement select signal MEAS SELECT at the measurement select input 726 to provide an analog measurement signal ANALOG MEAS to the analog measurement output 730. At 1552, the digital measurement data DIG MEAS DATA is generated at a digital measurement data output 114 of the analog-to-digital converter circuit 712 based on the analog measurement signal ANALOG MEAS at an analog measurement input 732.

In another example, the string of PV sub-modules 116 (e.g., FIG. 1) includes first, second, and third PV sub-modules 1702, 1704, 1706 (e.g., FIG. 17). In this example, the method 900 also includes receiving the sensed voltage signal SENSED V from a positive DC power terminal 1714 of the first PV sub-module 1702 at the voltage sense terminal 110 of the voltage measurement conditioning circuit 510 (e.g., FIG. 5). The method 900 also includes receiving the second sensed voltage signal SENSED V2 from a positive DC power terminal 1722 of the second PV sub-module 1704 at the second voltage sense terminal 522 of the voltage measurement conditioning circuit 510. The method 900 also includes receiving the third sensed voltage signal SENSED V3 from a positive DC power terminal 1728 of the third PV sub-module 1706 at the third voltage sense terminal 534 of the voltage measurement conditioning circuit 510. The method 900 also includes receiving the voltage reference signal from a negative DC power terminal 1730 of the third PV sub-module 1706 at the voltage reference terminal 112 of the voltage measurement conditioning circuit 510.

In another example, the method 900 also includes generating power measurement data associated with the string of PV sub-modules 116 (e.g., FIG. 1) at the microcontroller circuit 106 based on the digital measurement data DIG MEAS DATA associated with the sensed voltage signal SENSED V and the digital measurement data DIG MEAS DATA associated with the first sensed current signal SENSED I or the second sensed current signal SENSED I2. The measurement data stream MEAS DATA STREAM is also based on the power measurement data such that the power measurement data is represented within the measurement data stream MEAS DATA STREAM and the output communication signal COMM SIG OUT.

In another example, the string of PV sub-modules 116 (e.g., FIG. 1) includes a positive DC power terminal 1714 (e.g., FIG. 17) coupled with a positive DC power line 1718 of a DC bus 1720 and a negative DC power terminal 1730 coupled with a negative DC power line 1732 of the DC bus 1720. In one implementation, the first current sensor 556 (e.g., FIG. 5) includes positive and negative terminals. The first positive current sense terminal 550 of the current measurement conditioning circuit 546 is coupled with the positive terminal and the first negative current sense terminal 552 of the current measurement conditioning circuit 546 is coupled with the negative terminal. In this implementation, the method 900 also includes sensing current passing through the positive DC power line 1718 between the DC bus 1720 and the positive DC power terminal 1714 of the string of PV sub-modules 116 at the first current sensor 556. The method 900 also includes generating the first sensed current signal SENSED 1 at the first current sensor 556 based on the sensed current. In another implementation, the second current sensor 570 includes positive and negative terminals. The second positive current sense terminal 564 of the current measurement conditioning circuit 546 is coupled with the positive terminal and the second negative current sense terminal 566 of the current measurement conditioning circuit 546 is coupled with the negative terminal. In this implementation, the method 900 also includes sensing current passing through the negative DC power line 1732 between the negative DC power terminal 1730 of the string of PV sub-modules 116 and the DC bus 1720 at the second current sensor 570. The method 900 also includes generating the second sensed current signal SENSED I2 at the second current sensor 570 based on the sensed current.

In another example, the temperature sensor 590 (e.g., FIG. 5) includes positive and negative terminals. The positive temperature sense terminal 584 of the temperature measurement conditioning circuit 580 is coupled with the positive terminal and the negative temperature sense terminal 586 of the temperature measurement conditioning circuit 580 is coupled with the negative terminal. In this example, the method 900 also includes sensing a temperature associated with the PV module 100 (e.g., FIG. 1) at the temperature sensor 590. The method 900 also includes generating the sensed temperature signal SENSED T at the temperature sensor 590 based on the sensed temperature.

Figure 16:
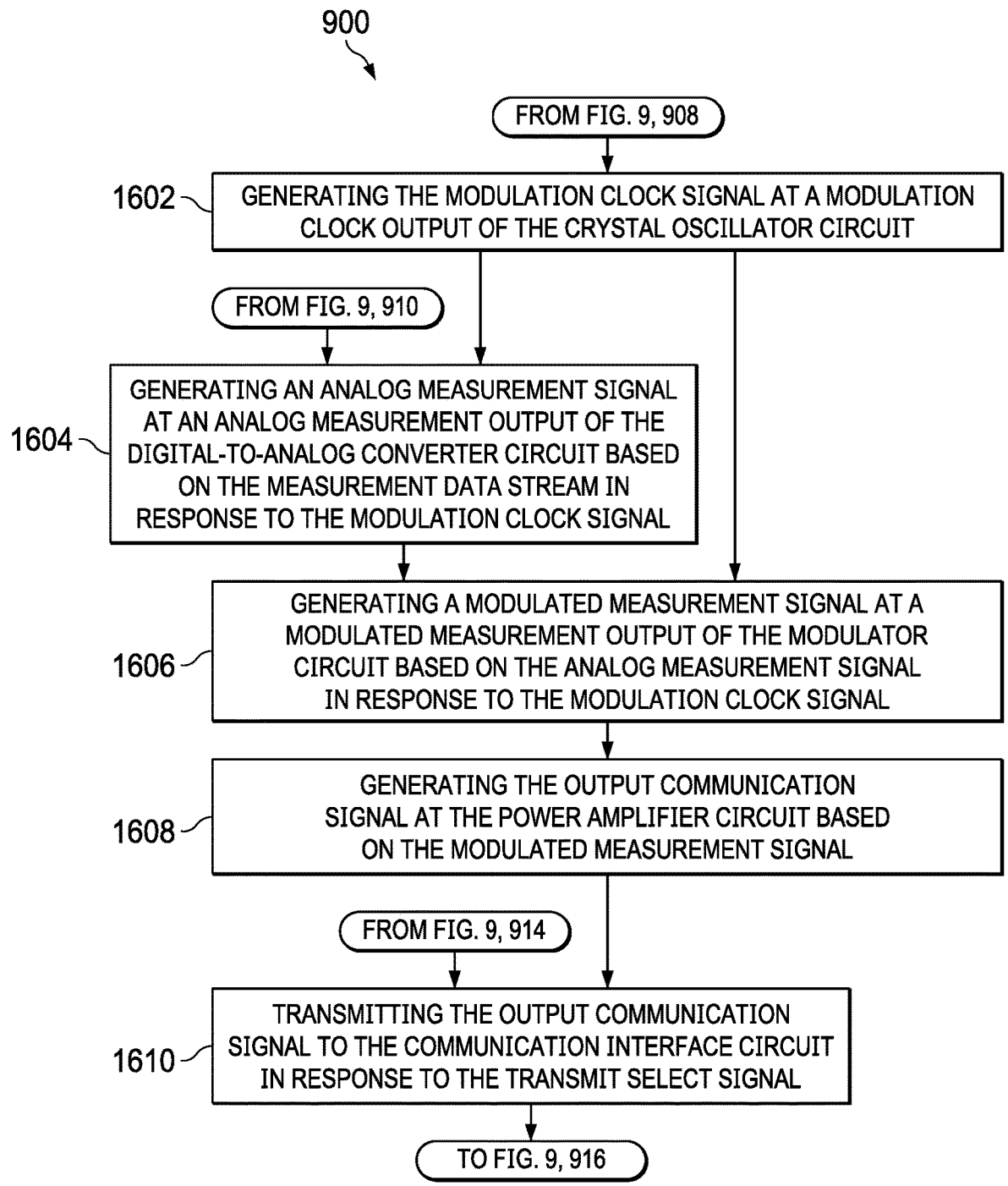
FIG. 16 is a flow chart for another example of a method for monitoring a PV module.

FIGS. 9 and 16 show another example of the method 900 in which the transmitter circuit 108 (e.g., FIG. 1) includes a crystal oscillator circuit 810 (e.g., FIG. 8), a digital-to-analog converter circuit 812, a modulator circuit 814, and a power amplifier circuit 816. In this example, at 1602, the method 900 also includes generating the modulation clock signal MOD CLK at a modulation clock output 128 of the crystal oscillator circuit 810. At 1604, an analog measurement signal ANALOG MEAS is generated at an analog measurement output 820 of the digital-to-analog converter circuit 812 based on the measurement data stream MEAS DATA STREAM at a measurement data stream input 126 in response to the modulation clock signal MOD CLK at a second modulation clock input 818. At 1606, the method 900 also includes generating a modulated measurement signal MOD MEAS at a modulated measurement output 826 of the modulator circuit 814 based on the analog measurement signal ANALOG MEAS at an analog measurement input 822 in response to the modulation clock signal MOD CLK at a modulation clock input 120. At 1608, the output communication signal COMM SIG OUT is generated at the power amplifier circuit 816 based on the modulated measurement signal MOD MEAS at a third modulated measurement input 828. At 1610, the method 900 also includes transmitting the output communication signal COMM SIG OUT to the communication interface circuit 136 via positive and negative output communication terminals 132, 134 of the power amplifier circuit 816 in response to the transmit select signal XMIT SELECT at a transmit select input 130. The modulation clock output 128 of the transmitter circuit 108 includes the modulation clock output 128 of the crystal oscillator circuit 810. The measurement data stream input 126 of the transmitter circuit 108 includes the measurement data stream input 126 of the digital-to-analog converter circuit 812. The positive and negative output communication terminals 132, 134 of the transmitter circuit 108 include the positive and negative output communication terminals 132, 134 of the power amplifier circuit 816. The transmit select input 130 of the transmitter circuit 108 includes the transmit select input 130 of the power amplifier circuit 816.

In another example; the communication interface circuit 136 (e.g., FIG. 1) includes a positive DC power terminal 1802 (e.g., FIG. 18) coupled with a positive DC power line 1718 (e.g., FIG. 17) of a DC bus 1720 and a negative DC power terminal 1804. The string of PV sub-modules 116 includes a positive DC power terminal 1714 coupled with the negative DC power terminal 1804 of the communication interface circuit 136 and a negative DC power terminal 1730 coupled with a negative DC power line 1732 of the DC bus 1720. The measurement data stream MEAS DATA STREAM, analog measurement signal ANALOG MEAS, and modulated measurement signal MOD MEAS are formed such that the output communication signal COMM SIG OUT is a power line communication signal. In this example, the method 900 also includes transmitting the PLC signal from the communication interface circuit 136 to a remote receiver circuit 1806 via the positive and negative DC power lines 1718, 1732 of the DC bus 1720 by applying the output communication signal COMM SIG OUT received from the power amplifier circuit 816 to the positive and negative DC power terminals 1802, 1804 of the communication interface circuit 136. In one implementation, the PLC signal is a spread frequency shift keying waveform. In one example, the S-FSK waveform is compliant with PLC protocol requirements of SunSpec Interoperability Specification, Communication Signal for Rapid Shutdown, Version 34. In this example, the method 900 also includes transmitting the output communication signal COMM SIG OUT from the power amplifier circuit 816 to the communication interface circuit 136 during a zero energy period of a repetitive data frame specified in the PLC protocol requirements of the SunSpec Interoperability Specification.

In another example, the communication interface circuit 136 (e.g., FIG. 1) includes an antenna 1902 (e.g., FIG. 19). In this example, the method 900 also includes generating a wireless communication signal at the communication interface circuit 136 based on the output communication signal COMM SIG OUT received from the power amplifier circuit 816. The method 900 also includes transmitting the wireless communication signal from the communication interface circuit 136 to a remote receiver circuit 1904 via the antenna 1902.

In another example, the method 900 also includes generating a wired control line communication signal at the communication interface circuit 136 (e.g., FIG. 1) based on the output communication signal COMM SIG OUT received from the power amplifier circuit 816 (e.g., FIG. 8). The method 900 also includes transmitting the wired control line communication signal from the communication interface circuit 136 to a remote receiver/transmitter circuit 2006 (e.g., FIG. 20) via wired transmission lines coupling the communication interface circuit 136 to the remote receiver/transmitter circuit 2006.

In another example, the method 900 also includes using the modulation clock signal MOD CLK to sample the measurement data stream MEAS DATA STREAM at the measurement data stream input 126 (e.g., FIG. 1) of the digital-to-analog converter circuit 812 (e.g., FIG. 8) of the transmitter circuit 108 to form the analog measurement signal ANALOG MEAS at the analog measurement output 820. In another example, the method 900 also includes using the modulation clock signal MOD CLK to sample the analog measurement signal ANALOG MEAS at the analog measurement input 822 of the modulator circuit 814 to form the modulated measurement signal MOD MEAS at the modulated measurement output 826.

FIG. 17 shows an example of a PV module 100 that includes a communication interface circuit 136, a second PV sub-module 1704, a third PV sub-module 1706, and a monitoring circuit 102. The communication interface circuit 136 includes positive and negative input communication terminals 1708, 1710 and an external interface 1712. The first PV sub-module 1702 includes positive and negative DC power terminals 1714, 1716. The second PV sub-module 1704 includes a positive DC power terminal 1722 coupled with the negative DC power terminal 1716 of the first PV sub-module 1702 and a negative DC power terminal 1724. The third PV sub-module 1706 includes a positive DC power terminal 1728 coupled with the negative DC power terminal 1724 of the second PV sub-module 1704 and a negative DC power terminal 1730. The monitoring circuit 102 includes positive and negative output communication terminals 132, 134 coupled with the positive and negative input communication terminals 1708, 1710, a voltage sense terminal 110 coupled with the positive DC power terminal 1714 of the first PV sub-module 1702, and a voltage reference terminal 112 coupled with the negative DC power terminal 1730 of the third PV sub-module 1706. . The communication interface circuit 136 routes an output communication signal COMM SIG OUT at the positive and negative input communication terminals 1708, 1710 to the external interface 1712. The first PV sub-module 1702 generates a first PV output voltage across the positive and negative DC power terminals 1714, 1716 in response to exposure to light. The first PV sub-module 1702 couples with a positive DC power line 1718 of a DC bus 1720 associated with the PV module 100 via the positive DC power terminal 1714. The second PV sub-module 1704 generates a second PV output voltage across the positive and negative DC power terminals 1722, 1724 in response to exposure to light. The third PV sub-module 1706 generates a third PV output voltage across the positive and negative DC power terminals 1728, 1730 in response to exposure to light. The third PV sub-module 1706 couples with a negative DC power line 1732 of the DC bus 1720 via the negative DC power terminal 1730. The monitoring circuit 102 generates digital measurement data DIG MEAS DATA based on a sensed voltage signal SENSED V at the voltage sense terminal 110 in reference to a voltage reference signal at the voltage reference terminal 112 such that the sensed voltage signal SENSED V is represented within the digital measurement data DIG MEAS DATA. The monitoring circuit 102 generates a measurement data stream MEAS DATA STREAM based on the digital measurement data DIG MEAS DATA such that the sensed voltage signal SENSED V is represented within the measurement data stream MEAS DATA STREAM. The monitoring circuit 102 generates a transmit select signal XMIT SELECT based on the measurement data stream MEAS DATA STREAM. The monitoring circuit 102 generates the output communication signal COMM SIG OUT based on the measurement data stream MEAS DATA STREAM such that the sensed voltage signal SENSED V is represented within the output communication signal COMM SIG OUT. The monitoring circuit 102 transmits the output communication signal COMM SIG OUT to the communication interface circuit 136 via the positive and negative output communication terminals 132, 134 in response to the transmit select signal XMIT SELECT.

In another example, the monitoring circuit 102 also includes a second voltage sense terminal 522 coupled with the positive DC power terminal 1722 of the second PV sub-module 1704. The digital measurement data DIG MEAS DATA is also based on a second sensed voltage signal SENSED V2 at the second voltage sense terminal 522 in reference to the voltage reference signal at the voltage reference terminal 112 such that the second sensed voltage signal SENSED V2 is represented within the digital measurement data DIG MEAS DATA, the measurement data stream MEAS DATA STREAM, and the output communication signal COMM SIG OUT. In another example, the monitoring circuit 102 also includes a third voltage sense terminal 534 coupled with the positive DC power terminal 1728 of the third PV sub-module 1706. The digital measurement data DIG MEAS DATA is also based on a third sensed voltage signal SENSED V3 at the third voltage sense terminal 534 in reference to the voltage reference signal at the voltage reference terminal 112 such that the third sensed voltage signal SENSED V3 is represented within the digital measurement data DIG MEAS DATA, the measurement data stream MEAS DATA STREAM, and the output communication signal COMM SIG OUT.

Figure 18:
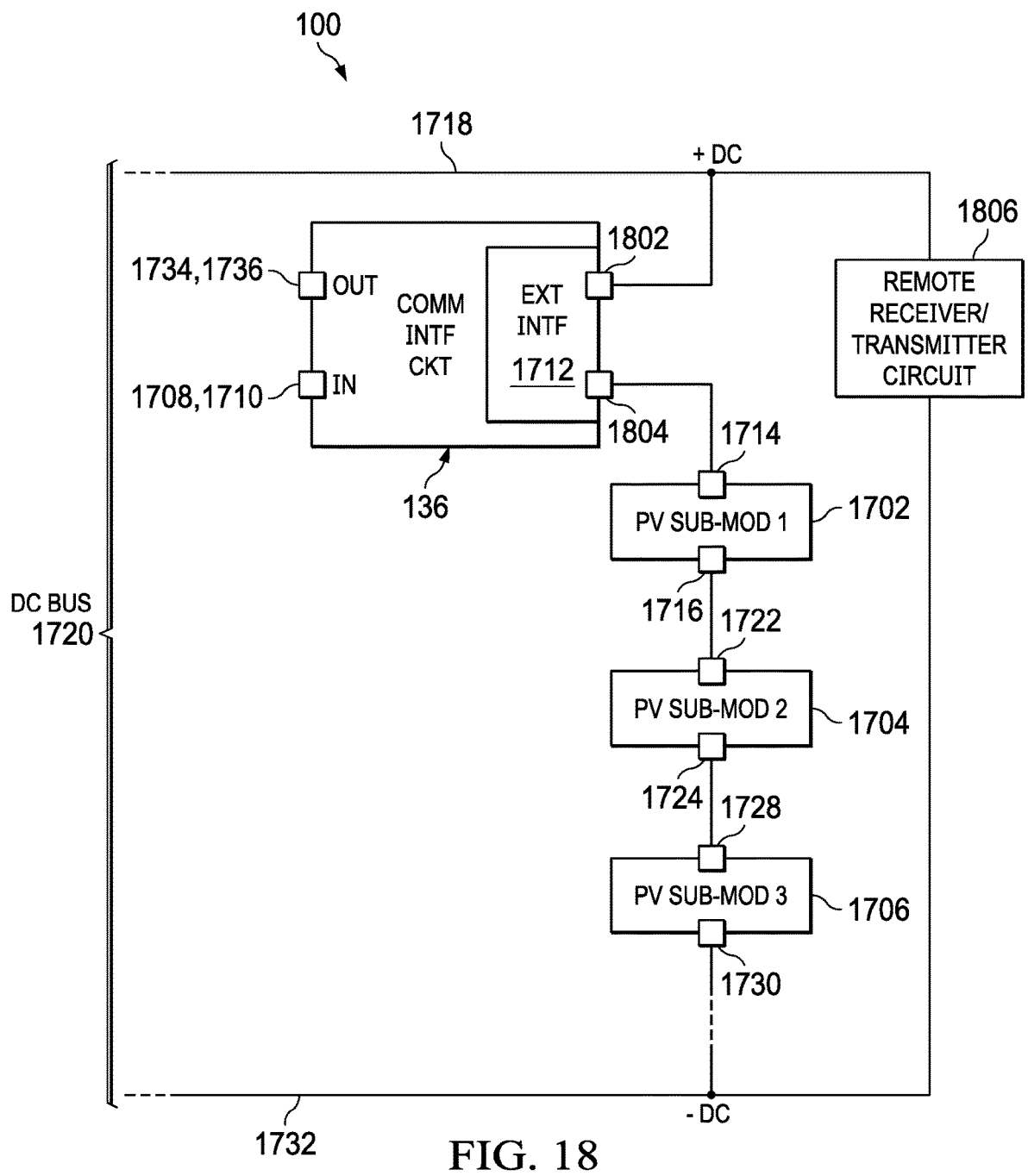
FIG. 18 is a schematic diagram of another example of a PV module.

FIG. 18 shows an example of the PV module 100 in which the output communication signal COMM SIG OUT at the communication interface circuit 136 is communicated externally via a power line communication signal. The external interface 1712 includes a positive DC power terminal 1802 coupled with the positive DC power line 1718 of the DC bus 1720 and a negative DC power terminal 1804 coupled with the positive DC power terminal 1714 of the first PV sub-module 1702. The communication interface circuit 136 routes the positive DC power line 1718 at the positive DC power terminal 1802 to the negative DC power terminal 1804. The communication interface circuit 1718 transmits the PLC signal to a remote receiver circuit 1806 via the positive and negative DC power lines 1718, 1732 of the DC bus 1720 by applying the output communication signal COMM SIG OUT at the positive and negative input communication terminals 1708, 1710 to the positive and negative DC power terminals 1802, 1804. In one implementation, the PLC signal is a spread frequency shift keying waveform.

FIG. 19 shows an example of the PV module 100 in which the output communication signal COMM SIG OUT at the communication interface circuit 136 is communicated externally via a wireless communication signal. The external interface 1712 includes an antenna 1902. The communication interface circuit 136 generates the wireless communication signal based on the output communication signal COMM SIG OUT at the positive and negative input communication terminals 1708, 1710. The communication interface circuit 136 transmits the wireless communication signal to a remote receiver circuit 1904 via the antenna 1902.

Figure 20:
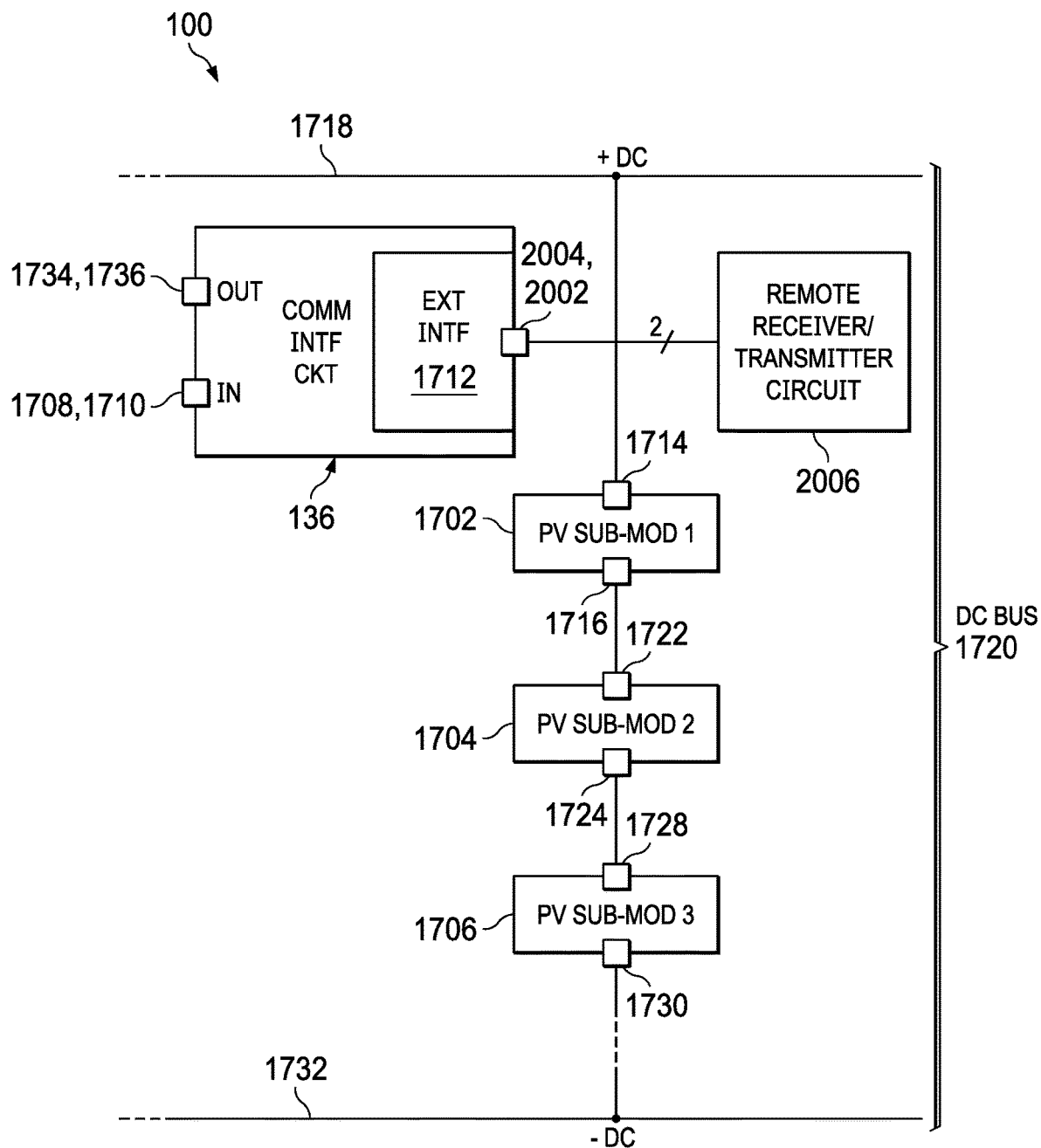
FIG. 20 is a schematic diagram of another example of a PV module.

FIG. 20 shows an example of the PV module 100 in which the output communication signal COMM SIG OUT at the communication interface circuit 136 is communicated externally via a wired control line communication signal. The communication interface circuit 136 generates the wired control line communication signal based on the output communication signal COMM SIG OUT at the positive and negative input communication terminals 1708, 1710. The external interface 1712 includes a positive control line terminal 2002 and a negative control line terminal 2004. The communication interface circuit 136 transmits the wired control line communication signal to a remote receiver/transmitter circuit 2006 via a wired control line between the external interface 1712 and the remote receiver/transmitter circuit 2006 by applying the wired control line communication signal to the positive and negative control line terminals 2002, 2004.

FIG. 17 also shows the PV module 100 receiving communication signals. The communication interface circuit 136 also includes positive and negative output communication terminals 1734, 1736. The communication interface circuit 136 routes an input communication signal COMM SIG IN at the external interface 1712 to the positive and negative output communication terminals 1734, 1736. The monitoring circuit 102 also includes positive and negative input communication terminals 144, 146 coupled with the positive and negative output communication terminals 1734, 1736 of the communication interface circuit 136. The monitoring circuit 102 generates an input communication data stream INPUT COMM DATA STREAM based on the input communication signal COMM SIG IN from the communication interface circuit 136 at the positive and negative input communication terminals 144, 146. The monitoring circuit 102 processes the input communication data stream INPUT COMM DATA STREAM to detect modulated data carried by the input communication signal COMM SIG IN and represented within the input communication data stream INPUT COMM DATA STREAM. The monitoring circuit 102 generates the transmit select signal XMIT SELECT in response to detecting, for a predetermined time, an absence of the modulated data in the input communication data stream INPUT COMM DATA STREAM representing the input communication signal COMM SIG IN.

FIG. 18 shows an example of the PV module 100 in which the input communication signal COMM SIG IN at the communication interface circuit 136 is based on a power line communication signal. The external interface 1712 includes a positive DC power terminal 1802 coupled with the positive DC power line 1718 of the DC bus 1720 and a negative DC power terminal 1804 coupled with the positive DC power terminal 1714 of the first PV sub-module 1702. The communication interface circuit 136 routes the positive DC power line 1718 at the positive DC power terminal 1802 to the negative DC power terminal 1804. The communication interface circuit 136 receives the PLC signal at the positive and negative DC power terminals 1802, 1804 from a remote transmitter circuit 1806 via the positive and negative DC power lines 1718, 1732 of the DC bus 1720. The communication interface circuit 136 generates the input communication signal COMM SIG IN at the positive and negative output communication terminals 1734, 1736 based on data carried by the PLC signal transmitted via the DC bus 1720. In one implementation, the PLC signal is a spread frequency shift keying waveform.

FIG. 19 shows an example of the PV module 100 in which the input communication signal COMM SIG IN at the communication interface circuit 136 is based on a wireless communication signal. The external interface 1712 includes an antenna 1902 that receives the wireless communication signal from a remote transmitter circuit 1904. The communication interface circuit 136 generates the input communication signal COMM SIG IN at the positive and negative output communication terminals 1734, 1736 based on data carried by the wireless communication signal.

FIG. 20 shows an example of the PV module 100 in which the input communication signal COMM SIG IN at the communication interface circuit 136 is based on a wired control line communication signal. The external interface 1712 includes positive and negative control line terminals 2002, 2004 that receive the wired control line communication signal from a remote receiver/transmitter circuit 2006 via a wired control line between the external interface 1712 and the remote receiver/transmitter circuit 2006. The communication interface circuit 136 generates the input communication signal COMM SIG IN at the positive and negative output communication terminals 1734, 1736 based on data carried by the wired control line communication signal.

FIG. 17 also shows an example of the PV module 100 with a current sensor 556/570. The current sensor 556/570 includes positive and negative terminals. In this example, the monitoring circuit 102 also includes a positive current sense terminal 550/564 coupled with the positive terminal and a negative current sense terminal 552/566 coupled with the negative terminal. The current sensor 556/570 senses current passing through the PV module 100 between the positive DC power line 1718 of the DC bus 1720 and the negative DC power line 1732 of the DC bus 1720. The current sensor 556/570 generates a sensed current signal SENSED I/SENSED 12 based on the sensed current. The digital measurement data DIG MEAS DATA is also based on the sensed current signal SENSED I/SENSED 12 at the positive current sense terminal 550/564 in reference to a current reference signal at the negative current sense terminal 552/566 such that the sensed current signal SENSED I/SENSED 12 is represented within the digital measurement data DIG MEAS DATA, the measurement data stream MEAS DATA STREAM, and the output communication signal COMM SIG OUT. In one implementation, the current sensor 556 senses current passing through the positive DC power line 1718 coupled with the positive DC power terminal 1714 of the first PV sub-module 1702. In another implementation, the current sensor 570 senses current passing through the negative DC power terminal 1730 of the of the third PV sub-module 1706 coupled with the negative DC power line 1732.

In another example, the monitoring circuit 102 generates power measurement data associated with the PV module 100 based on the digital measurement data DIG MEAS DATA associated with the sensed voltage signal SENSED V and the digital measurement data DIG MEAS DATA associated with the sensed current signal SENSED I/SENSED 12. The measurement data stream MEAS DATA STREAM is also based on the power measurement data such that the power measurement data is represented within the measurement data stream MEAS DATA STREAM and the output communication signal COMM SIG OUT.

In another example, the PV module 100 includes a temperature sensor 590. The temperature sensor 590 includes positive and negative terminals. In this example, the monitoring circuit 102 includes a positive temperature sense terminal 584 coupled with the positive terminal and a negative temperature sense terminal 586 coupled with the negative terminal. The temperature sensor 590 senses a temperature associated with the PV module 100 and generates a sensed temperature signal SENSED T based on the sensed temperature. The digital measurement data DIG MEAS DATA is also based on the sensed temperature signal SENSED T at the positive temperature sense terminal 584 in reference to a temperature reference signal at the negative temperature sense terminal 586 such that the sensed temperature signal SENSED T is represented within the digital measurement data DIG MEAS DATA, the measurement data stream MEAS DATA STREAM, and the output communication signal COMM SIG OUT.

Figure 21:
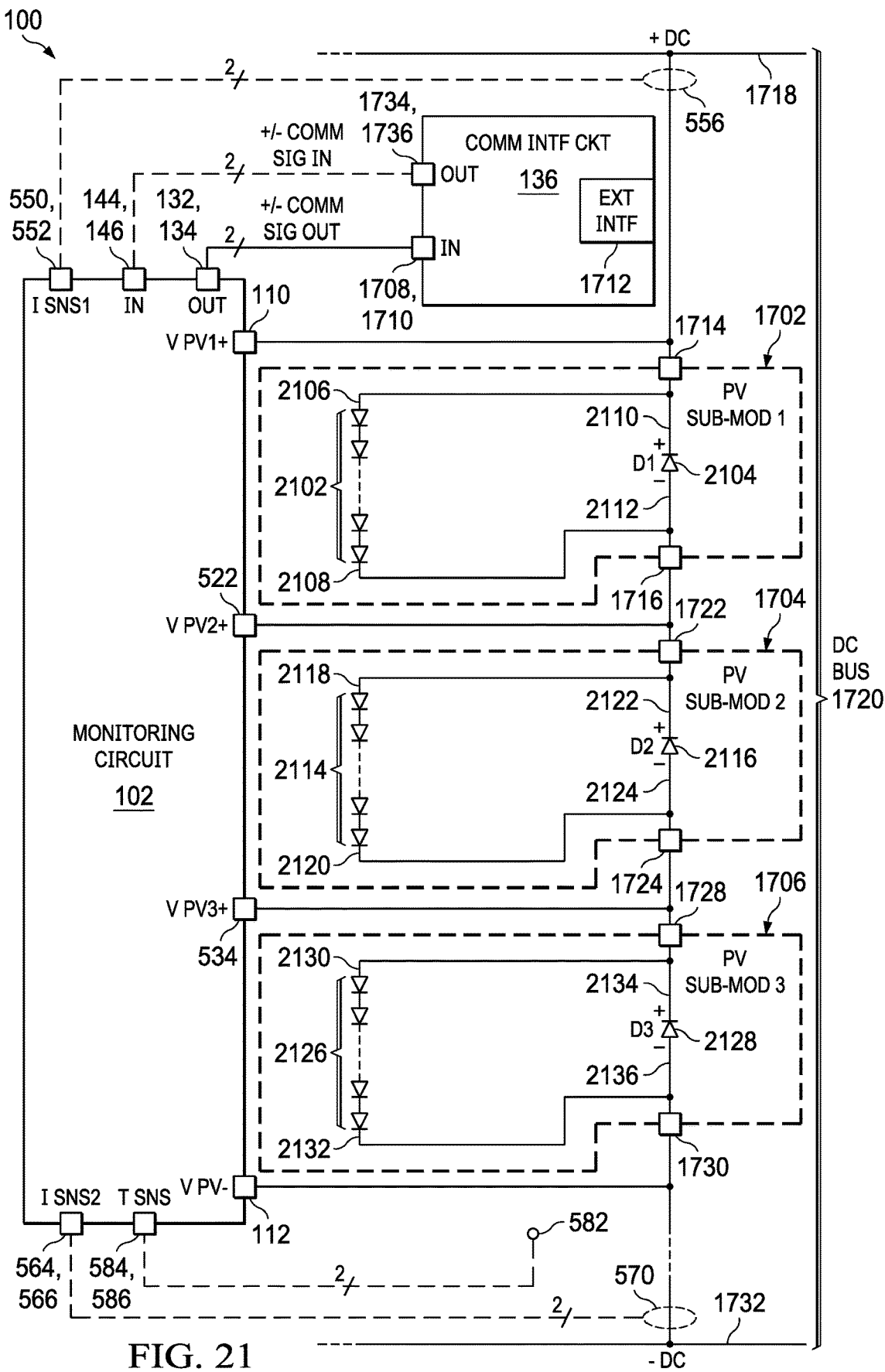
FIG. 21 is a schematic diagram of another example of a PV module.
Figure 22:
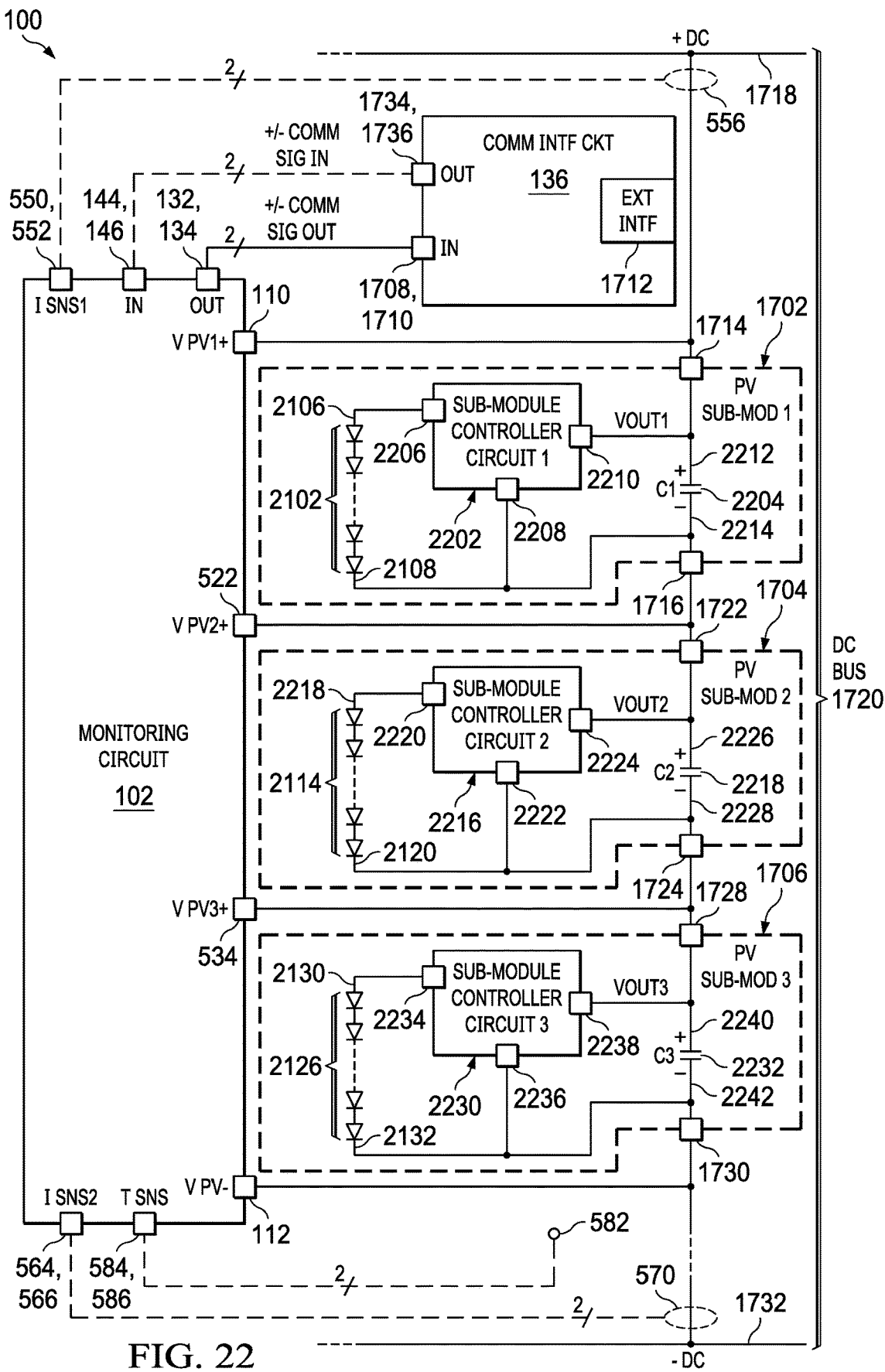
FIG. 22 is a schematic diagram of another example of a PV module.

FIG. 21 shows an example of a PV module 100 in which the first PV sub-module 1702 includes a first string of PV cells 2102 and a first bypass diode 2104. The first string of PV cells 2102 includes a positive terminal 2106 coupled with the positive DC power terminal 1714 of the first PV sub-module 1702 and a negative terminal 2108 coupled with the negative DC power terminal 1716 of the first PV sub-module 1702. The first string of PV cells 2102 generates the first PV output voltage across the positive and negative terminals 2106, 2108 in response to the exposure to the light. The first bypass diode 2104 includes a positive terminal 2110 coupled with the positive DC power terminal 1714 of the first PV sub-module 1702 and a negative terminal 2112 coupled with the negative DC power terminal 1716 of the first PV sub-module 1702. The first bypass diode 2104 bypasses the first string of PV cells 2102 when the first string of PV cells 2102 is exposed to the light and experiencing shaded conditions.

In another example, the second PV sub-module 1704 includes a second string of PV cells 2114 and a second bypass diode 2116. The second string of PV cells 2114 includes a positive terminal 2118 coupled with the positive DC power terminal 1722 of the second PV sub-module 1704 and a negative terminal 2120 coupled with the negative DC power terminal 1724 of the second PV sub-module 1704. The second string of PV cells 2114 generates the second PV output voltage across the positive and negative terminals 2118, 2120 in response to the exposure to the light. The second bypass diode 2116 includes a positive terminal 2122 coupled with the positive DC power terminal 1722 of the second PV sub-module 1704 and a negative terminal 2124 coupled with the negative DC power terminal 1724 of the second PV sub-module 1704. The second bypass diode 2116 bypasses the second string of PV cells 2114 when the second string of PV cells 2114 is exposed to the light and experiencing shaded conditions.

In another example, the third PV sub-module 1706 includes a third string of PV cells 2126 and a third bypass diode 2128. The third string of PV cells 2126 includes a positive terminal 2130 coupled with the positive DC power terminal 1728 of the third PV sub-module 1706 and a negative terminal 2132 coupled with the negative DC power terminal 1730 of the third PV sub-module 1706. The third string of PV cells 2126 generates the third PV output voltage across the positive and negative terminals 2130, 2132 in response to the exposure to the light. The third bypass diode 2128 includes a positive terminal 2134 coupled with the positive DC power terminal 1728 of the third PV sub-module 1706 and a negative terminal 2136 coupled with the negative DC power terminal 1730 of the third PV sub-module 1706. The third bypass diode 2128 bypasses the third string of PV cells 2126 when the third string of PV cells 2126 is exposed to the light and experiencing shaded conditions.

FIG. 21 shows an example of a PV module 100 in which the first PV sub-module 1702 includes a first string of PV cells 2102, a first PV sub-module controller circuit 2202, and a first capacitor 2204. The first string of PV cells 2102 includes a positive terminal 2106 and a negative terminal 2108 coupled with the negative DC power terminal 1716 of the first PV sub-module 1702. The first string of PV cells 2102 generates a first DC string voltage across the positive and negative terminals 2106, 2108 in response to exposure to the light. The first PV sub-module controller circuit 2202 includes a positive terminal 2206 coupled with the positive terminal 2106 of the first string of PV cells 2102, a negative terminal 2208 coupled with the negative terminal 2108 of the first string of PV cells 2102, and an output terminal 2210 coupled with the positive DC power terminal 1714 of the first PV sub-module 1702. The first PV sub-module controller circuit 2202 generates a first DC output voltage VOUT1 across the output and negative terminals 2210, 2208 based on the first DC string voltage across the positive and negative terminals 2106, 2108. The first capacitor 2204 includes a positive terminal 2212 coupled with the output terminal 2210 of the first PV sub-module controller circuit 2202 and a negative terminal 2214 coupled with the negative terminal 2208 of the first PV sub-module controller circuit 2202. The first capacitor 2204 charges when a first DC voltage across the positive and negative terminals 2212, 2214 is positive and discharges when the first DC voltage across the positive and negative terminals 2212, 2214 is negative.

In another example, the second PV sub-module 1704 includes a second string of PV cells 2114, a second PV sub-module controller circuit 2216, and a second capacitor 2218. The second string of PV cells 2114 includes a positive terminal 2118 and a negative terminal 2120 coupled with the negative DC power terminal 1724 of the second PV sub-module 1704. The second string of PV cells 2114 generates a second DC string voltage across the positive and negative terminals 2118, 2120 in response to exposure to the light. The second PV sub-module controller circuit 2216 includes a positive terminal 2220 coupled with the positive terminal 2118 of the second string of PV cells 2114, a negative terminal 2222 coupled with the negative terminal 2120 of the second string of PV cells 2114, and an output terminal 2224 coupled with the positive DC power terminal 1722 of the second PV sub-module 1704. The second PV sub-module controller circuit 2216 generates a second DC output voltage VOUT2 across the output and negative terminals 2224, 2222 based on the second DC string voltage across the positive and negative terminals 2118, 2120. The second capacitor 2218 includes a positive terminal 2226 coupled with the output terminal 2224 of the second PV sub-module controller circuit 2216 and a negative terminal 2228 coupled with the negative terminal 2222 of the second PV sub-module controller circuit 2216. The second capacitor 2218 charges when a second DC voltage across the positive and negative terminals 2226, 2228 is positive and discharges when the second DC voltage across the positive and negative terminals 2226, 2228 is negative.

In another example, the third PV sub-module 1706 includes a third string of PV cells 2126, a third PV sub-module controller circuit 2230, and a third capacitor 2232. The third string of PV cells 2126 includes a positive terminal 2130 and a negative terminal 2132 coupled with the negative DC power terminal 1730 of the third PV sub-module 1706. The third string of PV cells 2126 generates a third DC string voltage across the positive and negative terminals 2130, 2132 in response to exposure to the light. The third PV sub-module controller circuit 2230 includes a positive terminal 2234 coupled with the positive terminal 2130 of the third string of PV cells 2126, a negative terminal 2236 coupled with the negative terminal 2132 of the third string of PV cells 2126, and an output terminal 2238 coupled with the positive DC power terminal 1728 of the third PV sub-module 1706. The third PV sub-module controller circuit 2230 generates a third DC output voltage VOUT3 across the output and negative terminals 2238, 2236 based on the third DC string voltage across the positive and negative terminals 2130, 2132. The third capacitor 2232 includes a positive terminal 2240 coupled with the output terminal 2238 of the third PV sub-module controller circuit 2230 and a negative terminal 2242 coupled with the negative terminal 2236 of the third PV sub-module controller circuit 2230. The third capacitor 2232 charges when a third DC voltage across the positive and negative terminals 2240, 2242 is positive and discharges when the third DC voltage across the positive and negative terminals 2240, 2242 is negative.

Modifications are possible in the described examples, and other examples are possible, within the scope of the claims. The various circuits described above can be implemented using any suitable combination of discrete components, ICs, processors, memory, storage devices, and firmware.

The following is claimed:

1. A monitoring circuit for a photovoltaic (PV) module, comprising:
    a measurement conditioning circuit having a voltage sense terminal, a voltage reference terminal, and a digital measurement data output;
    a microcontroller circuit, having a digital measurement data input coupled with the digital measurement data output and having a modulation clock input, an input communication data stream input, a measurement data stream output, and a transmit select output; and
    a transmitter circuit having a measurement data stream input coupled with the measurement data stream output, having a modulation clock output coupled with the modulation clock input, having a transmit select input coupled with the transmit select output, and having positive and negative output communication terminals.

2. The monitoring circuit of claim 1, wherein the measurement conditioning circuit, microcontroller circuit, and transmitter circuit are included in an integrated circuit (IC).

3. The monitoring circuit of claim 1, wherein the microcontroller circuit has a demodulation clock input, the monitoring circuit further comprising:
    a receiver circuit, having positive and negative input communication terminals, having an input communication data stream output coupled with the input communication data stream input, and having a demodulation clock output coupled with the demodulation clock input.

4. The monitoring circuit of claim 1, the measurement conditioning circuit further comprising:
    a voltage measurement conditioning circuit having the voltage sense terminal of the measurement conditioning circuit, having the voltage reference terminal of the measurement conditioning circuit, and having an analog voltage output.

5. The monitoring circuit of claim 1, the measurement conditioning circuit further comprising:
    a current measurement conditioning circuit having first positive and negative current sense terminals, second positive and negative current sense terminals, a first analog current output, and a second analog current output;
    a temperature measurement conditioning circuit having positive and negative temperature sense terminals and an analog temperature output; and
    an analog-to-digital converter circuit having an analog measurement input and having the digital measurement data output of the measurement conditioning circuit coupled with the digital measurement data input.

6. The monitoring circuit of claim 1, the transmitter circuit further comprising:

a crystal oscillator circuit having the modulation clock output of the transmitter circuit coupled with the modulation clock input of the microcontroller circuit;

a digital-to-analog converter circuit having the measurement data stream input of the transmitter circuit coupled with the measurement data stream output, having a second modulation clock input coupled with the modulation clock output, and having an analog measurement output.

7. A method for monitoring a photovoltaic (PV) module, comprising:

receiving a sensed voltage signal at a voltage sense terminal of a measurement conditioning circuit from a string of PV sub-modules associated with the PV module;

receiving a voltage reference signal at a voltage reference terminal of the measurement conditioning circuit from the string of PV sub-modules;

generating digital measurement data at a digital measurement data output of the measurement conditioning circuit based on the sensed voltage signal in reference to the voltage reference signal;

generating a modulation clock signal at a modulation clock output of a transmitter circuit;

generating a measurement data stream at a measurement data stream output of a microcontroller circuit based on the digital measurement data at a digital measurement data input and the modulation clock signal at a modulation clock input;

generating an output communication signal at the transmitter circuit based on the modulation clock signal and the measurement data stream at a measurement data stream input;

generating a transmit select signal at a transmit select output of the microcontroller circuit based on the measurement data stream; and transmitting the output communication signal from the transmitter circuit to a communication interface circuit.

8. The method of claim 7, further comprising:

receiving the input communication signal at positive and negative input communication terminals of a receiver circuit from the communication interface circuit;

generating a demodulation clock signal at a demodulation clock output of the receiver circuit;

generating the input communication data stream at an input communication data stream output of the receiver circuit based on the input communication signal at the positive and negative input communication terminals and the demodulation clock signal.

9. The method of claim 7, wherein the measurement conditioning circuit includes a voltage measurement conditioning circuit and an analog-to-digital converter circuit, the method further comprising:

receiving the sensed voltage signal at a voltage sense terminal of the voltage measurement conditioning circuit from the string of PV sub-modules;

receiving the voltage reference signal at a voltage reference terminal of the voltage measurement conditioning circuit from the string of PV sub-modules;

generating an analog voltage signal at an analog voltage output of the voltage measurement conditioning circuit based on the sensed voltage signal at the voltage sense terminal in reference to the voltage reference signal at the voltage reference terminal; and generating digital voltage measurement data at a digital voltage measurement output of the analog-to-digital converter circuit based on the analog voltage signal at an analog voltage input.

10. The method of claim 7, wherein the transmitter circuit includes a crystal oscillator circuit, a digital-to-analog converter circuit, a modulator circuit, and a power amplifier circuit, the method further comprising:

generating the modulation clock signal at a modulation clock output of the crystal oscillator circuit;

generating an analog measurement signal at an analog measurement output of the digital-to-analog converter circuit based on the measurement data stream at a measurement data stream input in response to the modulation clock signal at a second modulation clock input;

generating a modulated measurement signal at a modulated measurement output of the modulator circuit based on the analog measurement signal at an analog measurement input in response to the modulation clock signal at a modulation clock input;

generating the output communication signal at the power amplifier circuit based on the modulated measurement signal at a third modulated measurement input; and transmitting the output communication signal to the communication interface circuit via positive and negative output communication terminals of the power amplifier circuit in response to the transmit select signal at a transmit select input.

11. A photovoltaic (PV) module, comprising:

a communication interface circuit having positive and negative input communication terminals and an external interface;

a first PV sub-module having positive and negative DC power terminals;

a second PV sub-module having a positive DC power terminal coupled with the negative DC power terminal of the first PV sub-module and having a negative DC power terminal;

a third PV sub-module having a positive DC power terminal coupled with the negative DC power terminal of the second PV sub-module and having a negative DC power terminal; and a monitoring circuit having positive and negative output communication terminals coupled with the positive and negative input communication terminals, having a voltage sense terminal coupled with the positive DC power terminal of the first PV sub-module, having a voltage reference terminal coupled with the negative DC power terminal of the third PV sub-module and having a transmit select input and an input communication data stream input.

12. The PV module of claim 11, wherein the monitoring circuit also has a second voltage sense terminal coupled with the positive DC power terminal of the second PV sub-module, wherein the monitoring circuit also has a third voltage sense terminal coupled with the positive DC power terminal of the third PV sub-module.

13. The PV module of claim 11, further comprising:

a current sensor having positive and negative terminals;

wherein the monitoring circuit has a positive current sense terminal coupled with the positive terminal and has a negative current sense terminal coupled with the negative terminal.

14. The PV module of claim 11, further comprising:

a temperature sensor having positive and negative terminals;

wherein the monitoring circuit has a positive temperature sense terminal coupled with the positive terminal and has a negative temperature sense terminal coupled with the negative terminal.

* * * * *